United States Patent
Tamaura et al.

(10) Patent No.: US 8,359,861 B2
(45) Date of Patent: Jan. 29, 2013

(54) SOLAR HEAT COLLECTOR, SUNLIGHT COLLECTING REFLECTOR, SUNLIGHT COLLECTING SYSTEM AND SOLAR ENERGY UTILIZATION SYSTEM

(75) Inventors: Yutaka Tamaura, Tokyo (JP); Yoshio Yoshizawa, Tokyo (JP); Motoaki Utamura, Tokyo (JP); Hiroshi Hasuike, Tokyo (JP); Hideyuki Ishihara, Tokyo (JP); Tadahiko Takamatsu, Tokyo (JP)

(73) Assignee: Tokyo Institute of Technology, Tokyo (JP)

( * ) Notice: Subject to any disclaimer, the term of this patent is extended or adjusted under 35 U.S.C. 154(b) by 868 days.

(21) Appl. No.: 11/574,220
(22) PCT Filed: Aug. 31, 2005
(86) PCT No.: PCT/JP2005/015908
§ 371 (c)(1), (2), (4) Date: Oct. 27, 2008
(87) PCT Pub. No.: WO2006/025449
PCT Pub. Date: Mar. 9, 2006

(65) Prior Publication Data
US 2009/0173337 A1 Jul. 9, 2009

(30) Foreign Application Priority Data

Aug. 31, 2004 (JP) ................................. 2004-253499
Nov. 10, 2004 (JP) ................................. 2004-326788
Mar. 3, 2005 (JP) ................................. 2005-059744

(51) Int. Cl.
- *F03G 7/00* (2006.01)
- *F03G 6/00* (2006.01)
- *B60K 16/00* (2006.01)
- *F24J 2/18* (2006.01)

(52) U.S. Cl. ................. 60/641.15; 60/641.8; 60/641.11; 126/685
(58) Field of Classification Search .............. 60/641.8, 60/641.11, 641.13, 641.14, 641.15; 126/569, 126/572–608, 634–677, 683–700
See application file for complete search history.

(56) References Cited

U.S. PATENT DOCUMENTS 3,927,659 A * 12/1975 Blake et al. .................... 126/643
4,034,737 A * 7/1977 Kume ........................... 126/603
(Continued)

FOREIGN PATENT DOCUMENTS

JP 50-122945 A 9/1975
JP 54-035433 A 3/1979
(Continued)

OTHER PUBLICATIONS

Schramek et al, Multi-tower solar array, Jul. 17, 2003, Solar Energy 75, 249-260.*

(Continued)

*Primary Examiner* — Kenneth Bomberg
*Assistant Examiner* — Christopher Jetton
(74) *Attorney, Agent, or Firm* — Fenwick & West LLP

(57) ABSTRACT

A sunlight collecting system and a solar energy utilization system which collects sunlight with the sunlight collecting system are provided, a sunlight collecting system including a solar heat collector which includes a heat collecting element which is formed by a helically wound heat exchange medium circulation pipe inside which the heat exchange medium flows, in such a way to have an incurved light receiving surface which narrows and converges towards the sunlight inlet and a sunlight collecting reflector which includes a reflector group which includes a plurality of reflector segments each of which includes a reflecting surface which makes sunlight converge on a heat collector, a sunlight collecting system in which a plurality of heliostats Bm are arranged in places which are irradiated by the sunlight between a plurality of heliostats An, in which each of the heliostats An and the heliostats Bm reflect light in a direction to a light collecting point of a heliostat group in which the heliostat is included.

6 Claims, 37 Drawing Sheets

U.S. PATENT DOCUMENTS

| | | | | |
|---|---|---|---|---|
| 4,084,581 A | * | 4/1978 | Vigoureux | 126/600 |
| 4,103,674 A | * | 8/1978 | Robinson et al. | 126/641 |
| 4,249,515 A | | 2/1981 | Page | |
| 4,452,047 A | * | 6/1984 | Hunt et al. | 60/641.15 |
| 4,815,443 A | * | 3/1989 | Vrolyk et al. | 126/697 |
| 4,947,825 A | * | 8/1990 | Moriarty | 126/685 |
| 5,002,379 A | * | 3/1991 | Murtha | 359/853 |
| 5,578,140 A | * | 11/1996 | Yogev et al. | 136/246 |
| 5,899,199 A | * | 5/1999 | Mills | 126/577 |
| 6,131,565 A | * | 10/2000 | Mills | 126/577 |
| 6,620,995 B2 | * | 9/2003 | Vasylyev et al. | 136/246 |
| 7,607,429 B2 | * | 10/2009 | Vasylyev et al. | 126/692 |

FOREIGN PATENT DOCUMENTS

| | | |
|---|---|---|
| JP | 56-157760 A | 12/1981 |
| JP | 02-022522 A | 1/1990 |
| JP | 11-051497 A | 2/1999 |
| JP | 2002-250566 A | 9/2001 |

OTHER PUBLICATIONS

Schramek et al, Philipp; Multi-tower solar array; Feb. 26, 2002; University of Sydney, Dept of Applied Physics, p. 249-260.*

Epstein, E., et al., "A molten sald system with a ground base-integrated solar receiver storage tank," Journal De Physique IV France, 1999, p. 95-104, vol. 9.

Pacheco., J.E., et al., "Overview of Recent Results of the Solar Two Test and Evaluations Program," Proceedings of the 1999 ASME International Solar Energy Conference: Renewable and Advanced Energy Systems for $21^{st}$ Century, 1999.

Schramek, P., et al., "Multi-tower solar array," Solar Energy, 2003, p. 249-260, vol. 75.

Sinai, J., et al., "Adaptation and modification of gas turbines for solar energy applications," Proceedings of GT2005, ASME Turbo Expo 2005: Power for Land, Sea and Air, Jun. 6-9, 2005, 7 Pages.

* cited by examiner

FIG.2
(a)
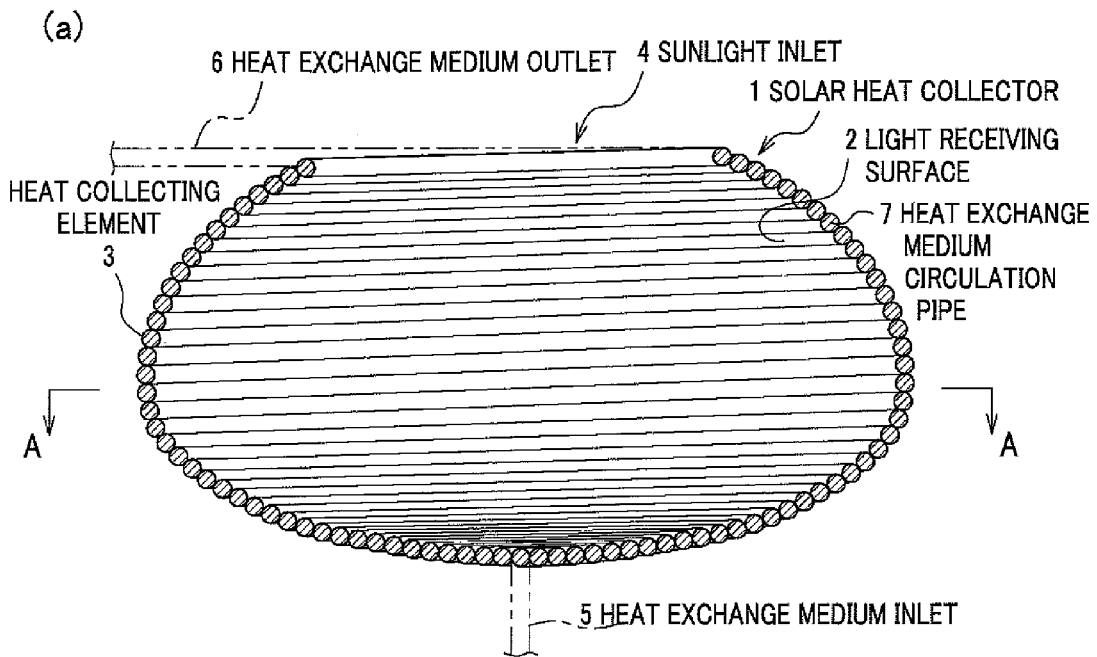
(b)
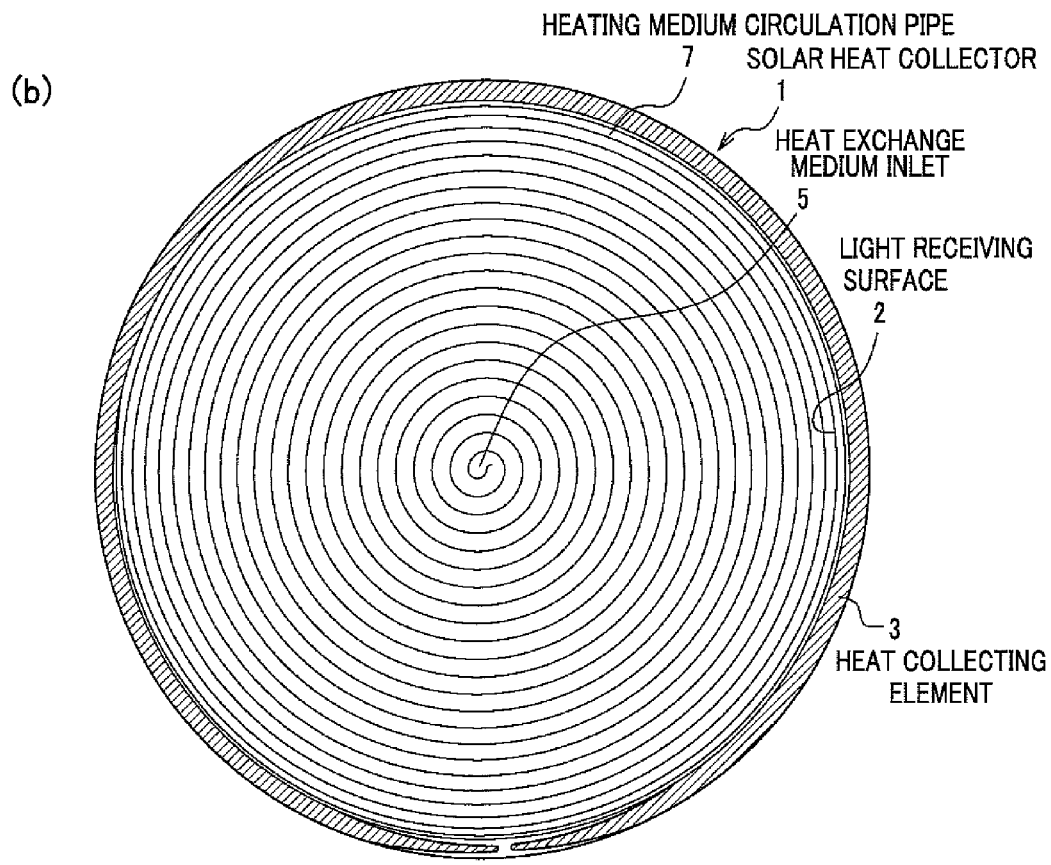

FIG. 7
(a)
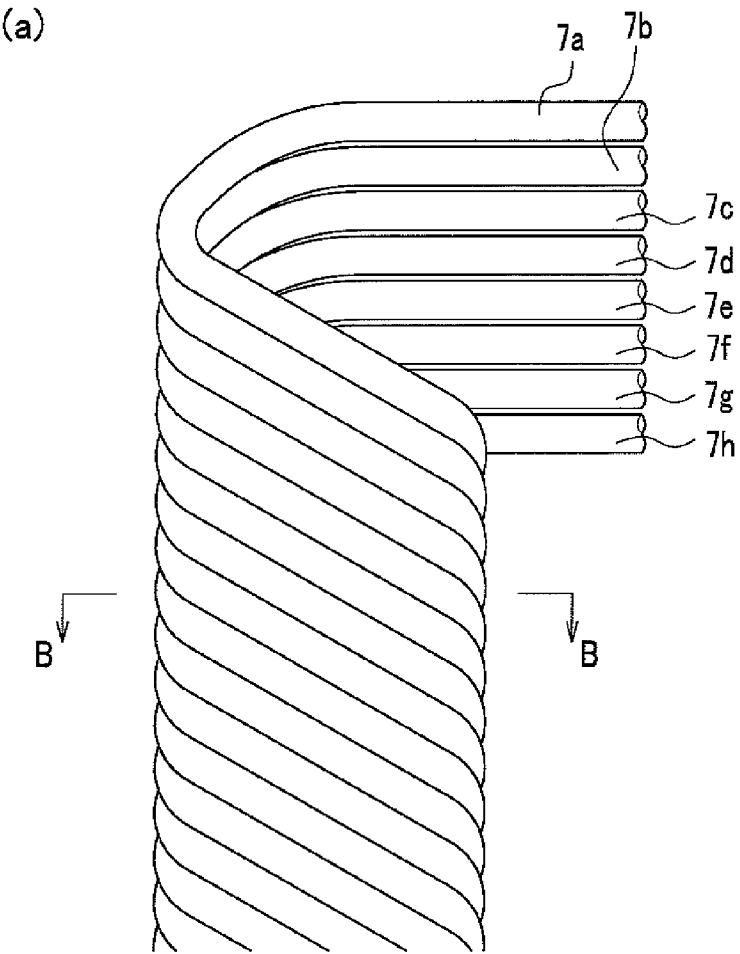
7a 7b 7c 7d 7e 7f 7g 7h
B          B
(b)
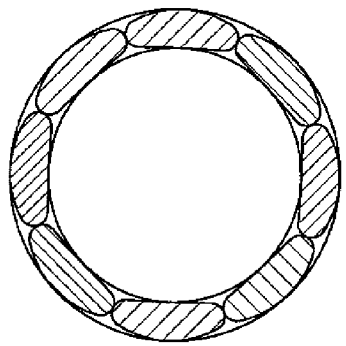

FIG.10
(a)
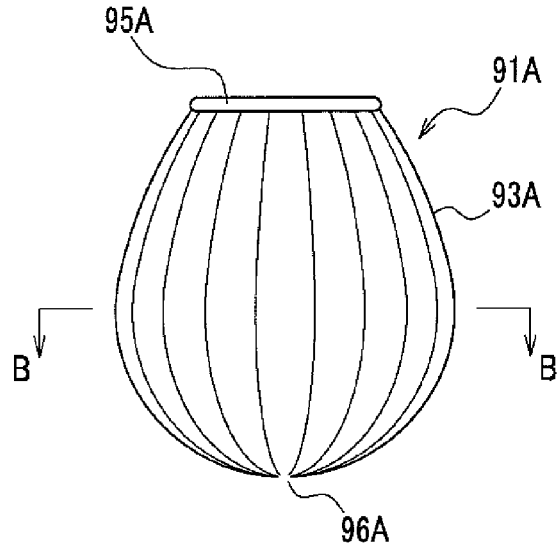
(b)
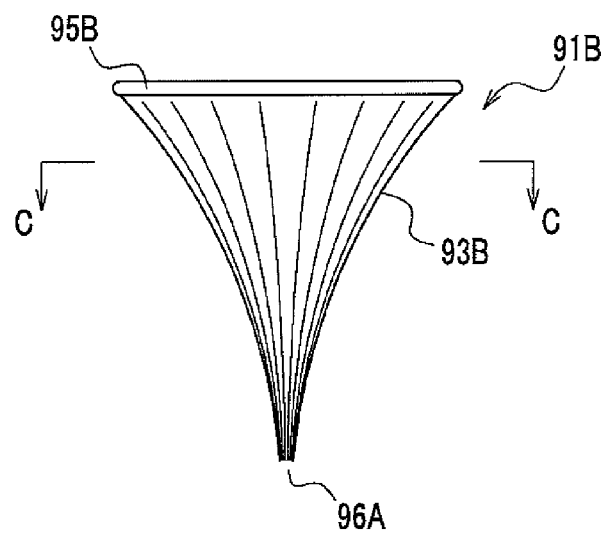
(c)
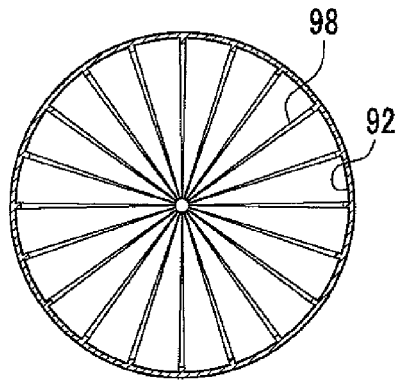

FIG.22
(a)
(b)
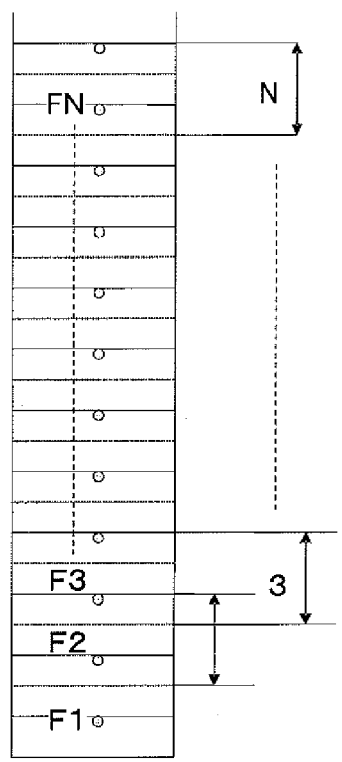
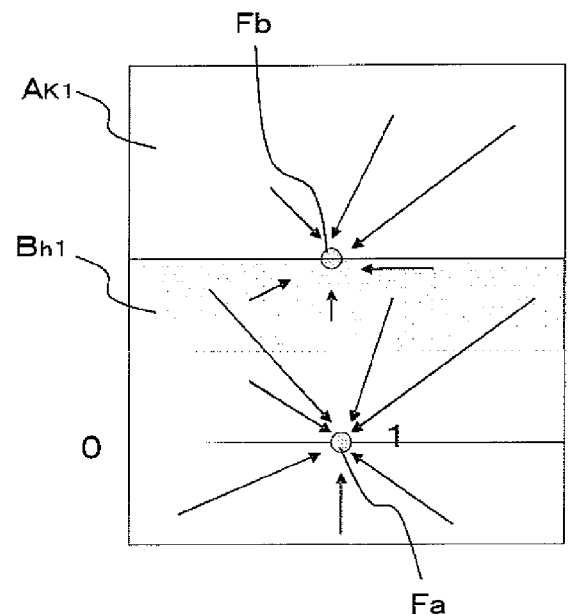
WHEN L = H,
COMPLETE COVERING
CAN BE ACHIEVED
(ALL QUANTITY OF LIGHT
CAN BE COLLECTED)
WITH SMALLEST NUMBER OF
HELIOSTATS.
NORTH FIG.23
(a)
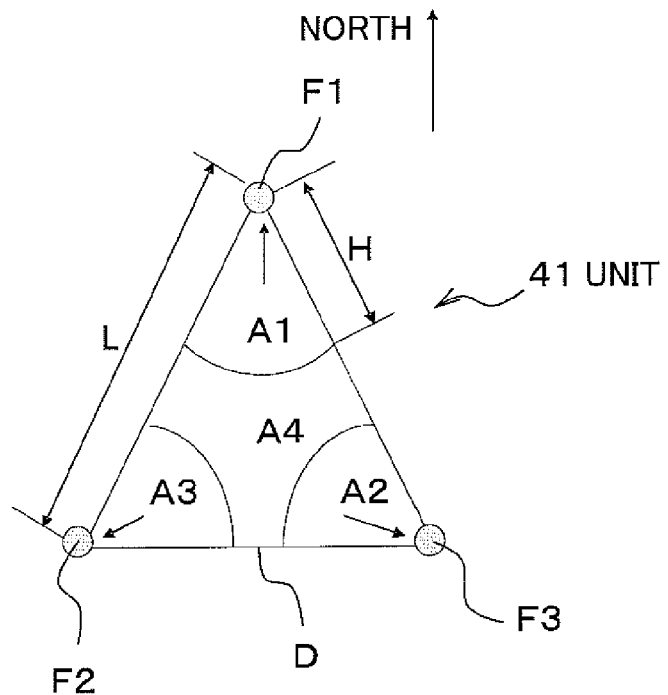
(b)
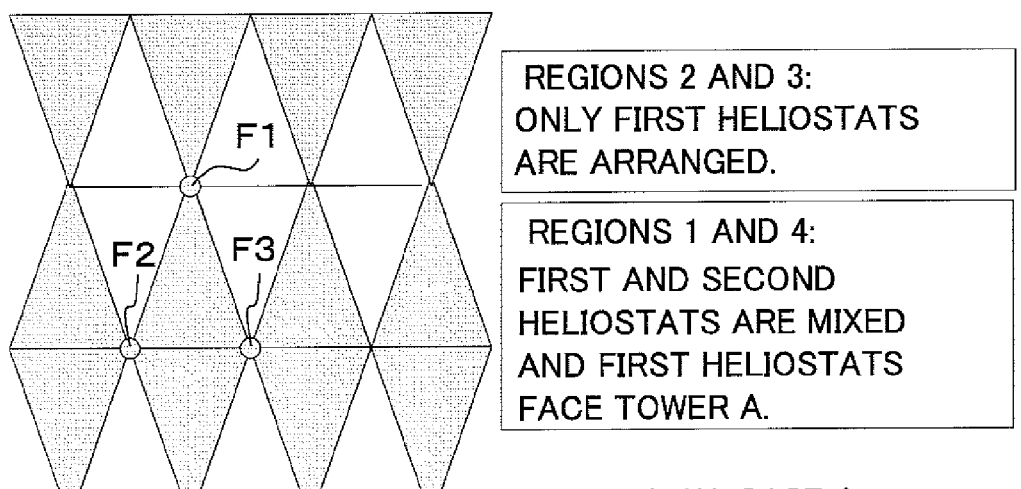
REGIONS 2 AND 3:
ONLY FIRST HELIOSTATS ARE ARRANGED.
REGIONS 1 AND 4:
FIRST AND SECOND HELIOSTATS ARE MIXED AND FIRST HELIOSTATS FACE TOWER A.
WHEN L > 2H, CASE 4
WHEN L ≤ 2H, CASE 3

POSITION IN FIELD IN NORTH-SOUTH DIRECTION (ORIGIN IS AT FIRST TOWER) m

—— LIGHT COLLECTION DENSITY
(SOUTH-FACING HELIOSTATS)

---- NUMBER DENSITY OF HELIOSTATS
(SOUTH-FACING HELIOSTATS)

—·— NUMBER DENSITY OF HELIOSTATS (TOTAL)

—··— LIGHT COLLECTION DENSITY (TOTAL)

SOLAR HEAT COLLECTOR, SUNLIGHT COLLECTING REFLECTOR, SUNLIGHT COLLECTING SYSTEM AND SOLAR ENERGY UTILIZATION SYSTEM

RELATED APPLICATIONS

This application claims the benefit under 35 U.S.C. §119 and 365 of the application No. PCT/JP2005/015908 filed on Aug. 31, 2005 with priority benefit from Japan patent application No. 2004-253499 filed on Aug. 31, 2004, and Japan patent application No. 2004-326788 filed on Nov. 10, 2004, and Japan patent application No. 2005-059744 filed on Mar. 3, 2005, the subject matter of which applications are incorporated herein in the entireties by this reference thereto.

TECHNICAL FIELD

The invention relates to a solar heat collector, a sunlight collecting reflector, a sunlight collecting system, and a solar energy utilization system, and more specifically, to a solar heat collector and a sunlight collecting reflector which efficiently use solar energy, a sunlight collecting system which efficiently collects sunlight, and a solar energy utilization system which efficiently uses thermal energy of collected sunlight.

BACKGROUND ART

In recent years, development and practical utilization are being promoted for a solar heat collector, a sunlight collecting system, and a solar energy utilization system which uses thermal energy of collected sunlight, as an apparatus or a system which uses thermal energy obtained from collected sunlight as a heat source for various kinds of systems and processes such as a power generation system and a chemical reaction process. For instance, there was a demonstration test of a light collecting system (in a tower method) which uses a lot of reflectors (referred to as "heliostat", hereafter) placed on the ground to collect reflected sunlight to a heat collector placed on a top of a tower with a height of approximately 100 m, in the Solar II project conducted by the U.S. Department of Energy. In the light collecting system, a plurality of pipes are arranged in parallel in positions where the sunlight is collected by the heat collector. Thus, molten salt which circulates through the pipes is indirectly heated by thermal energy of the collected sunlight. Then, it was examined that steam generated by heat of the heated molten salt is supplied to a steam turbine to generate electric power (refer to Non-Patent Document 1).

However, in an apparatus used in the Solar II project, a light receiving surface to receive sunlight, that is, an outer peripheral side of the pipe is exposed to the outside air. Thus, the light receiving surface is deprived of a great quantity of heat by wind, and sunlight reflected on the light receiving surface and thermal radiation from the light receiving surface disperse into the surroundings. Accordingly, a ratio of thermal energy actually used to heat the molten salt with respect to energy of incident sunlight becomes small. Therefore, an efficiency of sunlight utilization is limited.

Moreover, in Non-Patent Documentation 2, as shown in FIG. 40, a sunlight collecting system (in a beam-down method) is disclosed, in which a light collecting reflector 62 is placed in a high place a little downward from a light collecting point F of light reflected by a plurality of heliostats 61 placed on the ground. Thus, sunlight is reflected downward to the ground by the light collecting reflector 62 to be collected to the heat collector 63 near the ground. Moreover, as a heat collector used in the sunlight collecting system, an apparatus is disclosed in which molten salt poured in a circular flow path formed in a space between double nested heat collecting containers in truncated cone shapes. Then, the sunlight irradiates an inside of the heat collecting container to indirectly heat the molten salt.

However, in Non-Patent Documentation 2, there is no discussion about optimizing the shape of the heat collector. In addition, in the heat collector, the molten salt flows slowly inside the circular flow path so as to have a longer response time to control a temperature corresponding to changes in a temperature of the molten salt in an outlet of the heat collecting container when a quantity of solar radiation changes. Therefore, it is difficult to finely control the temperature by flow control. In addition, it is difficult to produce a large-scale apparatus in such a complicated shape as double truncated cones so that it is difficult to achieve practical and commercial utilization.

In addition, in the beam-down sunlight collecting system shown in FIG. 40, an efficiency of sunlight utilization is further improved. However, in a light collecting system in which heliostats are installed within an area of 100 m in radius, a radius of the light collecting reflector 62 is several tens meters or more, and installation height is approximately 100 m. In this case, the reflector is subject to a high wind pressure. Therefore, a pulse of the wind displaces the position of the reflector or transforms the reflector itself so as to cause an accuracy of light collection to decrease. Moreover, a structure to support the reflector needs to be firmly constructed to stand against the strong wind during stormy weather, so as to cause a construction cost to increase. To solve such a problem, countermeasures are devised, in which the reflector is divided into small segments and the segments are placed in such a way that there is a space between adjacent segments or segments are thinned out at a predetermined rate so that gaps are made through which the wind passes. However, in these methods, it is impossible to use the sunlight which is collected by the heliostats and reaches in portions of the spaces between the reflectors. As a result, a light collection efficiency decreases. In addition, 1) the sunlight is reflected on the reflector so that a light path length becomes long; accordingly, the focus becomes relatively wider on the light receiving surface (the focal plane) so as to cause the heat collector 63 to be large. Moreover, 2) due to shortage of light collection caused by above-mentioned 1), when the molten salt collects heat in the heat collector 63, a temperature of the molten salt rises insufficiently. 3) When the heat collector 63 is placed near the ground, the light collecting reflector 62 is formed along a hyperboloid of revolution so that incident light heat fluxes are more densely distributed near the focus on the light receiving surface. This feature is not preferable to be applied to a system such as a reforming reactor or the like, where it is more advantageous that the incident heat fluxes are equal. To equalize density of the heat fluxes is also a problem to be solved by the beam-down light collection method.

Next, in the sunlight collecting systems disclosed in Non-Patent Documents 1 and 2, the heat collector or the light collecting reflector is provided at a light collecting point formed by a plurality of heliostats.

However, these sunlight collecting systems are systems still in experimental phases, in which a quantity of collected light is comparatively small. Therefore, to construct a large-scale light collecting system which can collect a sufficient quantity of light to be used in a commercial scale, the systems cannot cope with the problems which occur as the systems are enlarged. For instance, height where the heat collector or the reflector is installed is actually limited caused by influence of the wind pressure to which the heat collector or the reflector is subject.

Moreover, in Non-Patent Document 3, a light collecting system in which a plurality of towers are placed is proposed. However, in the light collecting system, all heliostats are made to belong to and collect light to a nearest tower. Therefore, when the light collecting system is installed in the northern hemisphere for instance, the number density of the heliostats is large on a south side of the tower causes the light collecting system to be inefficient (, that is, the number of heliostats required to obtain the same quantity of light increases).

By the way, in conventionally experimented or proposed sunlight collecting systems, light is interfered between a remote heliostat placed far from the tower and its adjacent heliostats. To prevent this, the heliostats need to be sparsely distributed. In other words, a lot of heliostats are placed on the ground with proper intervals between each other so as to avoid the light interference. However, in a position far from the tower, long intervals are required to avoid the interference of the reflected light (referred to as "blocking", hereafter) between the adjacent heliostats. Accordingly, the reflectors need to be sparsely distributed. As a result, there are the following problems (a) and (b).

(a) There are unused sunny ground irradiated by the sunlight, in which the heliostats to reflect the sunlight cannot be placed. Therefore, only a part of the sunlight which irradiates the ground is used. For instance, in the conventional light collecting system, the efficiency of sunlight utilization at noon on an equinox in the latitude of Japan is estimated at about 40%. Moreover, the efficiency decreases as the light collecting system enlarges to increase a quantity of collected light.

(b) Lengths of light paths of the reflected light from the heliostats to the heat collector or the light collecting reflector become long. Therefore, a focus on a reflecting surface (a focal plane) becomes relatively wide. As a result, the following problems also occur.

(b-1) The heat collector or the light collecting reflector needs to be so large that the light collecting power decreases.

(b-2) Since the light collecting power decreases, a temperature of heat exchange medium in the heat collector which collects thermal energy of the collected sunlight decreases. This remarkably influences a beam-down light collecting system shown in FIG. 33.

Such a problem that the efficiencies of the sunlight collection and utilization decrease as the light collecting system enlarges is more prominent in an enlarged light collecting system where the heliostats are distributed in a wider area, and a bottleneck to construct a large-scale light collecting system.

Non-Patent Document 1: J. E. Pacheco and R. Gilbert, "Overview of Recent Results for the Solar Two Test and Evaluations Program." Proceedings of the 1999 ASME International Solar Energy Conference: Renewable and Advanced Energy Systems for 21st Century, Maui, Hi. (1999).

Non-Patent Document 2: E. Epstein, A. Segal and A. Yogev, "A molten salt system with a ground base-integrated solar receiver storage tank." J. Phys. IV France 9, 95-104 (1999).

Non-Patent Document 3: Phillipp Schramek, David R. Mills, "Multi-tower solar array", Solar Energy 75 (2003) 249-260.

DISCLOSURE OF THE INVENTION

Problem to be Solved by the Invention

In view of the above, it is the first object of the invention to provide a solar heat collector which collects and stores thermal energy of sunlight in heat exchange medium with high efficiency and quality.

Moreover, it is the second object of the invention to provide a system which efficiently uses the thermal energy of the sunlight stored in the heat exchange medium by the solar heat collector.

It is the third object of the invention to provide a sunlight collecting reflector which prevent a focus on a light receiving surface (a focal plane) in the heat collector from spreading and controls incident light heat fluxes on the light receiving surface and whose wind resistant design is simple.

Moreover, it is the fourth object of the invention to provide a solar energy utilization system which efficiently uses the thermal energy of the sunlight collected by the sunlight collecting reflector.

It is the fifth object of the invention to provide a sunlight collecting system which can highly efficiently collect sunlight.

Moreover, it is the sixth object of the invention to provide a solar energy utilization system which efficiently uses thermal energy of the sunlight collected by the sunlight collecting system.

Means for Solving Problem

According to a first aspect A of the present invention, to accomplish the first object, there is provided a solar heat collector including a heat collecting element whose inner surface constitutes a light receiving surface to receive sunlight, a sunlight inlet which is opened at an end of the heat collecting element, a heat exchange medium inlet through which heat exchange medium is introduced into the heat collecting element, and a heat exchange medium outlet through which the heat exchange medium heated by the sunlight introduced through the sunlight inlet is sent out, the solar heat collector in which the heat collecting element is formed by a helically wound heat exchange medium circulation pipe inside which the heat exchange medium flows, in such a way to have an incurved light receiving surface which narrows and converges towards the sunlight inlet.

In the solar heat collector according to the first aspect A of the present invention, the heat collecting element is formed by a helically wound heat exchange medium circulation pipe inside which the heat exchange medium flows, in such a way to have an incurved light receiving surface which narrows and converges towards the sunlight inlet. In the heat collecting element, the heat exchange medium which flows inside the heat exchange medium circulation pipe is heated by the sunlight which is introduced through the sunlight inlet and irradiates the light receiving surface, and sent out through the heat exchange medium outlet. Then, thermal energy stored in the heat exchange medium is used. In this case, since the heat collecting element is formed in such a way to have an incurved light receiving surface which narrows and converges towards the sunlight inlet, it is possible to reduce a quantity of reflected light which disperses from the sunlight inlet to the outside. Therefore, it is possible to improve an efficiency (a ratio of the sunlight which is converted into thermal energy) of the sunlight utilization. Moreover, it is similarly possible to reduce a quantity of thermal radiation, which is generated from a light receiving surface with a high temperature and disperses to the outside. Consequently, it is possible to reduce heat loss caused by the thermal radiation, as well as heat loss accompanied by a flow of the air such as wind.

According to the present invention, to accomplish the first object, as a first aspect B of the present invention, there is provided a solar heat collector including a heat collecting element which has a light receiving surface on an inner surface to receive sunlight, a sunlight inlet which is opened at an end of the heat collecting element, a heat exchange medium inlet which is provided on a top of the heat collecting element, and a heat exchange medium outlet which is provided at a bottom of the heat collecting element and through which the heat exchange medium heated by the sunlight introduced through the sunlight inlet is sent out, the solar heat collector in which the heat collecting element causes the heat exchange medium to gravitationally flow down as a liquid film along the light receiving surface from the heat exchange medium inlet and sends out the heat exchange medium through the heat exchange medium outlet in such a way that the sunlight directly irradiates and heats the heat exchange medium.

In the solar heat collector according to the first aspect B of the present invention, the heat collecting element causes the heat exchange medium to gravitationally flow down as a liquid film along the light receiving surface from the heat exchange medium inlet and sends out the heat exchange medium through the heat exchange medium outlet. In such a heat collecting element, sunlight which is introduced from the sunlight inlet to irradiate the light receiving surface directly irradiates and heats the heat exchange medium which gravitationally flows down as a liquid film along the light receiving surface. The heat exchange medium is sent out through the heat exchange medium outlet. Thus, heat is stored in the heat exchange medium to be used. In this case, the sunlight directly heats the heat exchange medium while the structural materials of the heat collecting element are indirectly heated through the liquid film. Therefore, it is possible to prevent a temperature from becoming so high that heat resistance design can be simple and the heat collecting element can be downsized.

Moreover, according to a second aspect of the present invention, to accomplish the second object, there is provided a solar energy utilization system including the solar heat collector of the first aspect A or B of the present invention.

In the solar energy utilization system, thermal energy stored in the heat exchange medium which is sent out from the solar heat collector can be used as a heat source for processes in power generation systems, various kinds of systems of chemical reaction processes, seawater desalination facilities, and so on. In this case, the solar heat collector according to the first or second aspect of the present invention is used to construct a system highly efficient to use sunlight as thermal energy.

Moreover, according to a third aspect of the present invention, to accomplish the second object, there is provided a sunlight collecting reflector which reflects sunlight collected to a light collecting point by a plurality of first reflectors and makes the reflected sunlight converge on a heat collector, including a reflector group including a plurality of reflector segments, in which each of the reflector segments includes a reflecting surface which makes the sunlight converge on the heat collector.

In the sunlight collecting reflector according to the third aspect of the present invention, the reflector group including a plurality of the reflector segments can make the sunlight which is collected by the first reflector efficiently converge on the heat collector. In addition, each of the reflector segments can be downsized so that wind resistant design becomes simple.

In the sunlight collecting reflector, reflecting surfaces of each of the reflector segments included in the reflector group are arranged along quadrics of revolution whose confocus is located at the light collecting point of the sunlight and whose curvature radiuses are different.

Accordingly, since the reflecting surface of each of the reflector segments included in the reflector group are arranged along quadrics of revolution whose confocus is located at the light collecting point of the sunlight and whose curvature radiuses are different, convergence of the light increases. Therefore, it is possible to prevent the light receiving surface from spreading so that the solar energy can be collected to a heat collector which is smaller than conventional one.

Moreover, in the sunlight collecting reflector, the reflector group includes a number n (n is an integer greater than or equal to 2) of the reflector segments which are arranged along a direction from the light collecting point to the heat collector. In addition, there is a relationship of $R_k < R_{k+1}$ between a curvature radius $R_k$ of a quadric of revolution along which a reflecting surface of a k-th (k is an integer and $1 < k \leq n-1$) nearest reflector segment $S_k$ to the light collecting point F1 is placed and a curvature radius $R_{k+1}$ of a quadric of revolution along which a reflecting surface of a k+1-th nearest reflector segment $S_{k+1}$ is placed.

Accordingly, since in the sunlight collecting reflector, the reflector group includes the number n (n is an integer greater than or equal to 2) of the reflector segments which are arranged along the direction from the light collecting point to the heat collector, and in the reflector group, there is the relationship of $R_k < R_{k+1}$ between the curvature radius $R_k$ of the quadric of revolution along which the reflecting surface of the k-th (k is an integer and $1 < k \leq n-1$) nearest reflector segment $S_k$ to the light collecting point F1 is placed and the curvature radius $R_{k+1}$ of the quadric of revolution along which the reflecting surface of the k+1-th nearest reflector segment $S_{k+1}$ is placed, the sunlight collected to the light collecting point by the plurality of the first reflectors can be reflected by each of the reflector segments so as to converge on the heat collector.

In addition, in the sunlight collecting reflector, the reflecting surface of the reflector segment is formed by a portion of the quadric of revolution.

Accordingly, the sunlight collected to the light collecting point by the plurality of the first reflectors can be reflected by the reflecting surface of each of the reflector segments which is formed by a portion of the quadric of revolution, so as to converge on the heat collector.

Moreover, in the sunlight collecting reflector, the reflecting surface of the reflector segment is formed by a tangential plane of the quadric of revolution.

Accordingly, since the reflecting surface of the reflector segment is formed by a tangential plane of the quadric of revolution, it is possible to control incident light heat fluxes on the light receiving surface of the heat collector so as to equalize energy with equal heat fluxes.

Moreover, in the sunlight collecting reflector, the reflecting surface of the reflector segment includes a set of reflector units each of which is formed by a portion or a tangential plane of the quadric of revolution.

Accordingly, since the reflector segment has the reflecting surface including the set of the reflector units formed by the portion or the tangential plane of the quadric of revolution, the sunlight collected to the light collecting point by the plurality of the first reflectors can be reflected by the reflecting surface including the set of the reflector units, so as to converge on the heat collector, and a form of the reflecting surface in each of the reflector segments can be adjusted by the reflector unit.

Moreover, in the sunlight collecting reflector, the quadric of revolution is at least one kind of curved surface selected from a hyperboloid of revolution and an ellipsoid of revolution.

Accordingly, since the quadric of revolution is at least a kind of curved surface selected from the hyperboloid of revolution and the ellipsoid of revolution, the sunlight collected to the light collecting point by the plurality of the first reflectors can be reflected by the reflecting surface of each of the reflector segments, so as to converge on the heat collector.

Moreover, in the sunlight collecting reflector, a plurality of the reflector segments are arranged without overlapping between light paths of the sunlight collected to the light collecting point by the plurality of the first reflectors and the reflected sunlight.

Accordingly, since the plurality of the reflector segments are arranged without overlapping between light paths of the sunlight collected to the light collecting point by the plurality of the first reflectors and the reflected sunlight, the sunlight collected to the light collecting point by the plurality of the first reflectors can be reflected by the reflecting surface of each of the reflector segments, so as to efficiently converge on the heat collector.

In addition, in the sunlight collecting reflector, the reflecting surface of the reflector segment is preferably formed in a ring shape around a central axis which is a center line connecting the light collecting point of the sunlight with a center of a light collecting surface of the heat collector, along the quadric of revolution. The ring may include a circular ring and a circular arc, and the shape is optimally determined depending on how the plurality of the first reflectors are arranged.

Accordingly, since the reflecting surface of the reflector segment is formed in the ring around the central axis which is the center line connecting the light collecting point of the sunlight with the center of the light collecting surface of the heat collector, along the quadric of revolution, the sunlight collected to the light collecting point by the plurality of the first reflectors can be reflected by the reflecting surface of each of the reflector segments, so as to converge on the heat collector.

Moreover, to accomplish the fourth object, as a fourth aspect of the present invention, there is provided a solar energy utilization system including the sunlight collecting reflector.

In the solar energy utilization system, thermal energy of sunlight which is made efficiently converge on a heat collector by the sunlight collecting reflector can be used as a thermal energy source for power generation, synthetic fuel manufacture, various kinds of chemical processes, or seawater desalination facilities.

Moreover, in the solar energy utilization system, the heat collector is preferably a solar heat collector including a heat collecting element whose inner surface constitutes a light receiving surface to receive sunlight, a sunlight inlet which is opened at an end of the heat collecting element, a heat exchange medium inlet through which heat exchange medium is introduced into the heat collecting element, and a heat exchange medium outlet through which the heat exchange medium heated by the sunlight is sent out, the solar heat collector in which the heat collecting element is formed by a helically wound heat exchange medium circulation pipe inside which the heat exchange medium flows, in such a way to have an incurved light receiving surface which narrows and converges towards the sunlight inlet.

In the solar energy utilization system, the sunlight collecting reflector can make the sunlight collected by the first reflector efficiently converge on the heat collector. In addition, heat loss caused by radiation, as well as heat loss caused by a flow of the air such as wind is reduced so that thermal energy of converging sunlight stored in the heat exchange medium can be efficiently used.

Moreover, in the solar energy utilization system, the heat collector is preferably a solar heat collector including a heat collecting element whose inner surface constitutes a light receiving surface to receive sunlight, a sunlight inlet which is opened at an end of the heat collecting element, a heat exchange medium inlet which is provided on a top of the heat collecting element, and a heat exchange medium outlet which is provided at a bottom of the heat collecting element and through which the heat exchange medium heated by the sunlight introduced through the sunlight inlet is sent out, the solar heat collector in which the heat collecting element causes the heat exchange medium to gravitationally flow down as a liquid film along the light receiving surface from the heat exchange medium inlet and sends out the heat exchange medium through the heat exchange medium outlet, in such a way that the sunlight directly irradiates and heats the heat exchange medium.

In the solar energy utilization system, the sunlight collecting reflector can make the sunlight collected by the first reflector efficiently converge on the heat collector. In addition, thermal energy of converging sunlight is stored in the heat exchange medium which gravitationally flows down as a liquid film, so as to be efficiently used. At this time, the sunlight directly heats the heat exchange medium. Therefore, it is possible to prevent a temperature from increasing to simplify heat resistance design and downsize the heat collecting element.

Moreover, according to a fifth aspect of the present invention, to accomplish the fifth object, there is provided a sunlight collecting system including a plurality of heliostat groups in each of which a plurality of heliostats included in the heliostat group forms a light collecting point of sunlight, the sunlight collecting system in which among spaces adjacent to a plurality of heliostats An (n is an integer greater than or equal to 2) included in a heliostat group A which collects sunlight to one light collecting point Fa, a plurality of heliostats Bm (m is an integer greater than or equal to 2) included in a heliostat group B which collects sunlight to another light collecting point Fb are arranged in places where the sunlight irradiates the ground, and in which the heliostats An and the heliostats Bm are arranged in such a way that a light path of light reflected by each of the heliostats An and the heliostats Bm is formed in a direction to the light collecting point of the heliostat group in which the heliostat is included.

In the sunlight collecting system, the plurality of heliostats Bm (m is an integer greater than or equal to 2) included in the heliostat group B which collects sunlight to the light collecting point Fb are arranged in places which are irradiated by unused sunlight due to blocking between the plurality of heliostats An (n is an integer greater than or equal to 2) included in the heliostat group A which collects sunlight to the light collecting point Fa. Then, the heliostats An and the heliostats Bm are arranged in such a way that the light path of the light reflected by each of the heliostats An and the heliostats Bm is formed in a direction to the light collecting point of the heliostat group in which the heliostat is included. Thus, there are no more regions where the ground is irradiated by the sunlight which is unused due to the blocking. Consequently, almost all the sunlight which irradiates a region where the heliostats are arranged can be collected to a plurality of the light collecting points so that energy of the collected sunlight can be further collected. As a result, a field efficiency, which is a ratio of a light quantity of the sunlight which can be used as energy, becomes almost 100% with respect to a total light quantity of the sunlight which irradiates the region where the heliostats are arranged.

In the sunlight collecting system, the heliostat An and the heliostat Bm preferably have identical or different forms.

When the heliostat An and the heliostat Bm have the identical form, a plurality of the heliostats are arranged to form a heliostat group to form one light collecting point, at first. Then, another plurality of heliostats are arranged in places which are irradiated by sunlight between the arranged heliostats to form a heliostat group facing to a direction different from the arranged heliostats. Thus, another light collecting point is formed so that a light collection efficiency can be improved.

Moreover, in this case, there is an advantage that productions, installation positions, and so on of the heliostats are simple. On the other hand, when the heliostat An and the heliostat Bm have different forms, a plurality of the heliostats which have either one of the forms are arranged to form one light collecting point. Then, heliostats which have another form are arranged in places irradiated by the sunlight between the arranged heliostats. Thus, another light collecting point is formed so that a light collection efficiency can be improved. In this case, the heliostats which are included in either one of the heliostat groups have a form appropriate to the places which are irradiated by the sunlight between the arranged heliostats. The form corresponds to shapes, forms, and so on of the heliostats which form the other heliostat group. Thus, there is an advantage that a light collection efficiency can be improved.

Moreover, in the sunlight collecting system, the heliostat group A and the heliostat group B are preferably arranged in such a way that the another light collecting point Fb is formed on a north side of the one light collecting point Fa in a northern hemisphere and on a south side of the one light collecting point Fa in a southern hemisphere.

Hereafter, the north or the south is described in accordance with cases in the northern hemisphere unless otherwise specified. In a case of the southern hemisphere, the north and the south are to be swapped. In other words, the south should be replaced with the north, and the north should be replaced with the south.

The heliostat groups A and the heliostat groups B are arranged in such a way that a required number of light collecting points are formed with almost equal intervals so that the another light collecting points Fb are formed on the north side of the one light collecting points Fa in the northern hemisphere and on the south side of the one collection point Fa in the southern hemisphere. Thus, a required quantity of sunlight can be efficiently collected even in a long and slender region regardless of an area of a region where the heliostats are arranged.

Moreover, in the sunlight collecting system, the heliostat group A preferably includes a plurality of first heliostats. And, the heliostat group B preferably includes a plurality of second heliostats. The light collecting point Fb of the heliostat group B is preferably formed on the north side or the south side of the light collecting point Fa formed by the heliostat group A depending on whether the light collecting system is located in a region in the northern hemisphere or the southern hemisphere. In addition, the first heliostats are preferably arranged in such ways that the reflecting surfaces are directed to face the sun and the light collecting point Fa. The second heliostats are preferably arranged in places which are irradiated by the sunlight between the plurality of the first heliostats An (n is an integer greater than or equal to 2) included in the heliostat group A and nearer to the ground than the first heliostats in such a way that the reflecting surfaces are directed to face the sun and the light collecting point Fb.

In the sunlight collecting system, the plurality of the second heliostats included in the heliostat group B which collects the sunlight to the other light collecting point Fb are arranged in the places which are irradiated by sunlight which is unused due to the blocking between the plurality of the first heliostats included in the heliostat group A. Moreover, the first heliostats are arranged in such ways that the reflecting surfaces are directed to face the sun and the light collecting point Fa. And, the second heliostats are arranged in such ways that the reflecting surfaces are directed to face the sun and the light collecting point Fb. In addition, the second heliostats are arranged in the places which are irradiated by the sunlight between the plurality of the first heliostats An (n is an integer greater than or equal to 2) included in the heliostat group A and nearer to the ground than the first heliostats. Therefore, light paths of light reflected by the first heliostats and the second heliostats are directed to the light collecting points Fa or Fb of the heliostat group to which each of the heliostats belongs. As a result, there are no more regions where the ground is irradiated by sunlight which is unused due to the blocking. Consequently, it is possible to collect almost all of the sunlight which irradiates the region where the heliostats are arranged to a plurality of light collecting points to collect energy of the collected sunlight.

Moreover, in the sunlight collecting system, it is preferred that the second heliostat can change a position and move the reflecting surface of the second heliostat itself to follow the sun in accordance with a time during a daytime and a season, in such a way to receive the maximum sunlight on the reflecting surface.

In the sunlight collecting system, since the second heliostat can change a position and move the reflecting surface of the second heliostat itself to follow the sun in accordance with a time during a daytime and a season, in such a way to receive the maximum sunlight, the second heliostat can move to a position to avoid shadows which are formed by the first heliostats and hourly change with changes in elevation of the sun during a day and seasonally. As a result, the light collection efficiency can be improved.

Moreover, in the sunlight collecting system, it is preferred that the heliostat groups A and the heliostat groups B are alternately arranged in a north-south direction. And, a heliostat group $B_{h1}$ (h1 is an integer greater than or equal to 1) and a next heliostat group $A_{k1}$ (k1 is an integer greater than or equal to 2) preferably form one light collecting point.

In the sunlight collecting system, since the heliostat groups A and the heliostat groups B are alternately arranged in the north-south direction and since the heliostat group $B_{h1}$ (h1 is an integer greater than or equal to 1) and the next heliostat group $A_{k1}$ (k1 is an integer greater than or equal to 2) form one light collecting point, a required number of light collecting points can be formed in series in the north-south direction with almost equal intervals in such a way that the other light collecting point Fb is formed on the north side of the one light collecting point Fa. Therefore, a required quantity of sunlight can be efficiently collected even in a long and slender region regardless of an area of the region where the heliostats are arranged.

Moreover, the sunlight collecting system preferably includes a unit including three heliostat groups. The heliostat groups are preferably arranged in such a way that three light collecting points respectively formed by the heliostat groups included in the unit are located at vertices of a triangle whose base is directed in an east-west direction.

Since the sunlight collecting system includes the unit including the three heliostat groups and the heliostat groups are arranged in such a way that the three light collecting points respectively formed by the heliostat groups included in the unit are located on the vertices of the triangle whose base is directed in the east-west direction, the first heliostats are arranged in such a way to select a light collecting point to maximize a quantity of collected light. Moreover, the second heliostats are arranged in the regions where the blocking occurs. Accordingly, light can be collected to the light collecting point which maximizes the quantity of the collected light on the north side of the heliostats. As a result, the second heliostats can form an optimal light collecting point at any time in accordance with changes during a day and seasonal changes in an irradiation angle of the sunlight. Consequently, the quantity of the collected light in a year can be maximized comparing with the light collecting system in which heliostats are fixed.

Moreover, in the sunlight collecting system, the triangle is preferably an isosceles triangle whose base is directed in the east-west direction and whose apex is located on a north side of the base in the northern hemisphere or on a south side of the base in the southern hemisphere.

In the sunlight collecting system, since the triangle is the isosceles triangle whose base is directed in the east-west direction, the light collection efficiency can be further improved.

Moreover, in the sunlight collecting system, the units are preferably arranged in a triangular lattice in the east-west direction and the north-south direction.

In the sunlight collecting system, since the units are arranged in a triangular lattice in the east-west direction and a north-south direction, a light collection efficiency can be improved in any shape of field. Moreover, when the towers are arranged to be staggered every row, influence of the shadows can be reduced.

Moreover, according to a sixth aspect of the present invention, to accomplish the sixth object, there is provided a solar energy utilization system in which a heat collector is placed at each of the light collecting points respectively formed by a plurality of heliostat groups in the sunlight collecting system to collect energy of the collected sunlight.

In the solar energy utilization system, since the heat collector is placed at each of the light collecting points respectively formed by the plurality of the heliostat groups in the sunlight collecting system to collect energy of the collected sunlight, the sunlight which irradiates the region where the heliostats are arranged is collected with a high field efficiency so that thermal energy of the collected sunlight can be efficiently used.

Moreover, according to the present invention, there is provided a solar energy utilization system in which a reflector which has a reflecting surface formed along a quadric of revolution is placed at each of the light collecting points respectively formed by the plurality of heliostat groups in the sunlight collecting system to collect the sunlight and the thermal energy of the collected sunlight to the heat collector which is placed under the reflector.

In the solar energy utilization system, since the reflector which has a reflecting surface formed along the quadric of revolution is placed at each of the light collecting points respectively formed by the plurality of heliostat groups in the sunlight collecting system to collect the sunlight and the thermal energy of the collected sunlight to the heat collector which is placed under the reflector, the sunlight which irradiates the region where the heliostats are arranged is collected with a high field efficiency so that thermal energy of the collected sunlight can be efficiently used.

Moreover, according to the present invention, there is provided a solar energy utilization system in which the thermal energy of the sunlight collected by the sunlight collecting system is used for power generation or industrial processes.

In the solar energy utilization system, since the thermal energy of the sunlight highly efficiently collected by the sunlight collecting system is used for the power generation or the industrial process, the sunlight which irradiates the region where the heliostats are arranged is collected with a high field efficiency so that thermal energy of the collected sunlight can be efficiently used.

Moreover, in the solar energy utilization system, the heat collector is preferably a solar heat collector including a heat collecting element whose inner surface constitutes a light receiving surface to receive sunlight, a sunlight inlet which is opened at an end of the heat collecting element, a heat exchange medium inlet through which heat exchange medium is introduced into the heat collecting element, and a heat exchange medium outlet through which the heat exchange medium heated by the sunlight is sent out, the solar heat collector in which the heat collecting element is formed by a helically wound heat exchange medium circulation pipe inside which the heat exchange medium flows, in such a way to have an incurved light receiving surface which narrows and converges towards the sunlight inlet.

In the solar energy utilization system, the solar heat collector according to the first aspect A of the present invention is used as a heat collector, so as to make sunlight collected by a first reflector efficiently converge on the heat collector. In addition, energy of the converging sunlight can be highly efficiently stored in the heat exchange medium so that the stored thermal energy can be used.

Moreover, in the solar energy utilization system, the heat collector is preferably a solar heat collector including a heat collecting element whose inner surface constitutes a light receiving surface to receive sunlight, a sunlight inlet which is opened at an end of the heat collecting element, a heat exchange medium inlet which is provided on a top of the heat collecting element, and a heat exchange medium outlet which is provided at a bottom of the heat collecting element and through which the heat exchange medium heated by the sunlight introduced through the sunlight inlet is sent out, the solar heat collector in which the heat collecting element causes the heat exchange medium to gravitationally flow down as a liquid film along the light receiving surface from the heat exchange medium inlet and sends out the heat exchange medium through the heat exchange medium outlet.

In the solar energy utilization system, the plurality of the heliostat groups collect the sunlight with a high field efficiency and the heat collector placed at each of the light collecting points stores the energy of the collected sunlight in the heat exchange medium which gravitationally flows down as a liquid film and efficiently collects the energy so that the thermal energy of the sunlight can be efficiently used.

Moreover, in the solar energy utilization system, the reflector is preferably a sunlight collecting reflector which reflects sunlight collected to a light collecting point by a plurality of first reflectors and makes the reflected sunlight converge on the heat collector, including a reflector group including a plurality of reflector segments, in which each of the reflector segments has a reflecting surface which makes the sunlight converge on the heat collector.

In the solar energy utilization system, the plurality of the heliostat groups collect the sunlight with a high field efficiency and the sunlight collecting reflector makes the energy of the collected sunlight efficiently converge on the heat collector so that the thermal energy of the sunlight can be efficiently used.

In addition, in the solar energy utilization system, the heat collector is preferably a solar heat collector including a heat collecting element whose inner surface constitutes a light receiving surface to receive sunlight, a sunlight inlet which is opened at an end of the heat collecting element, a heat exchange medium inlet through which heat exchange medium is introduced into the heat collecting element, and a heat exchange medium outlet through which the heat exchange medium heated by the sunlight is sent out, the solar heat collector in which the heat collecting element is formed by a helically wound heat exchange medium circulation pipe inside which the heat exchange medium flows, in such a way to have an incurved light receiving surface which narrows and converges towards the sunlight inlet, and the reflector is preferably a sunlight collecting reflector which reflects sunlight collected to a light collecting point by a plurality of first reflectors and makes the reflected sunlight converge on the heat collector, including a reflector group including a plurality of reflector segments, in which each of the reflector segments has a reflecting surface which makes the sunlight converge on the heat collector.

In the solar energy utilization system, the sunlight collecting reflector can efficiently collect the sunlight reflected to the light collecting point by the plurality of the first reflectors. In addition, the collected sunlight can be made converge on the solar heat collector according to the first aspect A of the present invention. Then, energy of the converging sunlight can be highly efficiently stored in the heat exchange medium, and the stored thermal energy can be used.

Moreover, in the solar energy utilization system, the heat collector is preferably a solar heat collector including a heat collecting element whose inner surface constitutes a light receiving surface to receive sunlight, a sunlight inlet which is opened at an end of the heat collecting element, a heat exchange medium inlet which is provided on a top of the heat collecting element, and a heat exchange medium outlet which is provided at a bottom of the heat collecting element and through which the heat exchange medium heated by the sunlight introduced through the sunlight inlet is sent out, the solar heat collector in which the heat collecting element causes the heat exchange medium to gravitationally flow down as a liquid film along the light receiving surface from the heat exchange medium inlet and sends out the heat exchange medium through the heat exchange medium outlet, and in which the reflector is preferably a sunlight collecting reflector which reflects sunlight collected to a light collecting point by a plurality of first reflectors and makes the reflected sunlight converge on the heat collector, including a reflector group including a plurality of reflector segments, in which each of the reflector segments has a reflecting surface which makes the sunlight converge on the heat collector.

In the solar energy utilization system, the sunlight collecting reflector can efficiently collect the sunlight reflected to the light collecting point by the plurality of the first reflectors. In addition, the collected sunlight can be made converge on the solar heat collector according to the first aspect B of the present invention. Then, energy of the converging sunlight can be stored in the heat exchange medium which gravitationally flows down as a liquid film so that the stored thermal energy can be efficiently used.

BRIEF DESCRIPTION OF THE DRAWINGS

FIG. 2($a$) is a schematic cross section of the solar heat collector shown in FIG. 1. FIG. 2($b$) is a cross section taken along an A-A line shown in FIG. 2($a$).

FIG. 7($a$) is a perspective view showing an example of a heat exchange medium circulation pipe which is included in the heat collecting element and formed by eight thread rolls. FIG. 7($b$) is a cross section taken along a line B-B shown in FIG. 7($a$).

FIG. 9($b$) is a schematic diagram showing a modified example. FIG. 9($c$) is a cross section taken along lines B-B and C-C shown in FIGS. 9($a$) and 9($b$).

FIGS. 10($a$) and 10($b$) are schematic cross sections showing preferable forms of FIGS. 9($a$) and 9($b$) respectively. FIG. 10($c$) is a cross section taken along a line B-B or C-C shown in FIG. 10($a$) or 10($b$).

FIG. 18($b$) is a schematic diagram showing a second heliostat. FIG. 18($c$) is a diagram showing an installation example of the second heliostat.

FIG. 22(a) is a schematic diagram showing a state of sunlight collection in a case where two heliostat groups are arranged in series in the north-south direction. FIG. 22(b) is a schematic diagram showing a structure in which a plurality of heliostat groups are arranged in series in the north-south direction.

FIG. 23(a) is a schematic diagram showing the light collecting system which forms the light collecting points in a triangular lattice. FIG. 23(b) is a schematic diagram showing a unit included in the light collecting system shown in (a).

BEST MODE FOR CARRYING OUT THE INVENTION

Here will be described embodiments of the present invention in detail, referring to the accompanying drawings as needed.

First Embodiment

Figure 1:
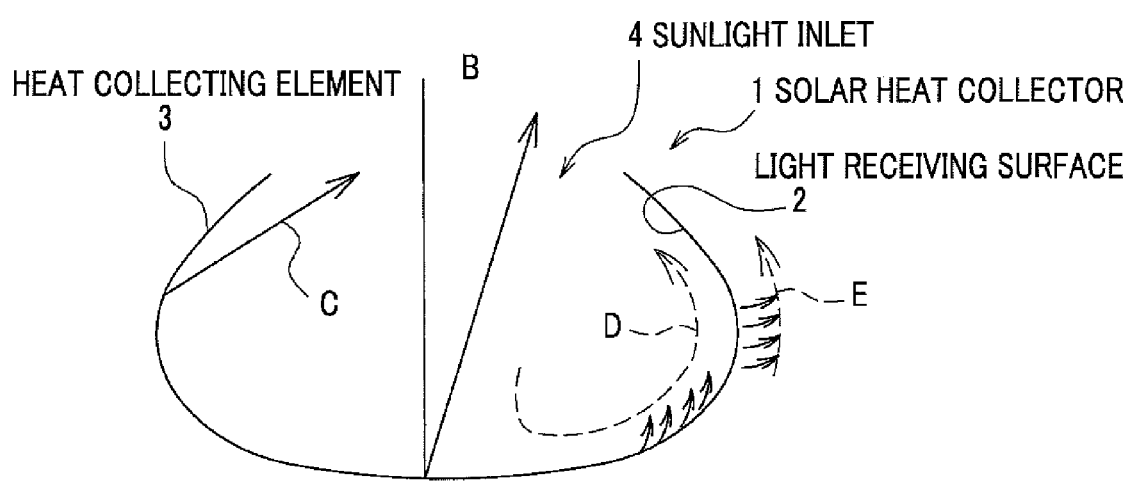
FIG. 1 is a schematic diagram showing an outline of a solar heat collector according to a first embodiment of the invention.

FIG. 1 is a schematic diagram showing an example of a solar heat collector according to a first embodiment of the invention.

The solar heat collector 1 whose outline is shown in FIG. 1 includes a heat collecting element 3, a sunlight inlet 4 which is opened at an end of the heat collecting element 3, a heat exchange medium inlet 5 through which heat exchange medium is introduced into the heat collecting element 3, and a heat exchange medium outlet 6 as shown in FIG. 2(a).

The heat collecting element 3 is formed by a helically wound circulating heat exchange medium circulation pipe 7 inside which the heat exchange medium flows. Thus, a light receiving surface 2 is constituted of an outer peripheral side of the heat exchange medium circulation pipe 7 which is exposed inside the heat collecting element 3. Then, the light receiving surface 2 is incurved to narrow towards the sunlight inlet 4 which is opened at the end of the heat collecting element 3. The incurved shape of the light receiving surface 2 is optimally formed by the wound heat exchange medium circulation pipe 7 in accordance with heat flux distribution of collected sunlight SB and the like as described later. For instance, the shape is optimally formed in a cavity shape having a cross section which is narrow in the upper portion (on a side of the sunlight inlet 4) and wide in the lower portion (on a side of the heat exchange medium inlet 5) as a whole as shown in a schematic cross section of FIG. 2(a).

A pipe whose cross-sectional shape is any of a circle, a rectangular, and so on may be used as a heat exchange medium circulation pipe 7 included in the heat collecting element 3. In particular, when the heat exchange medium circulation pipe 7 is wound to form the heat collecting element 3, a pipe with a circular cross-sectional shape is advantageous since a smaller number of parts are welded in producing a flow path. Austenitic stainless steel is advantageous in view of corrosion resistance, heat resistance, a price, and so on as a material of the heat exchange medium circulation pipe 7, in a case where mixed molten salt of $NaNO_3$ and $KNO_3$ or mixed molten salt of $NaNO_3$, $KNO_3$, and $NaNO_2$ is used as the heat exchange medium. Moreover, thickness of the pipe is determined as needed in accordance with a pressure of the molten salt, required high-temperature strength, and so on.

Moreover, the light receiving surface 2 of the heat exchange medium circulation pipe 7 is preferably processed for light absorbance and heat resistance. As the process for the light absorbance and the heat resistance, paint excellent for the light absorbance and the heat resistance is painted on the light receiving surface 2, or a chemical surface treatment excellent for the light absorbance and the heat resistance is applied. In the invention, "light absorbance" means that absorption coefficient of light elements with a wavelength bandwidth of 0.2-2.5 μm among sunlight elements is 80% or more.

For instance, Pyromark Paint produced by B.J.Wolfe Enterprise, and the like may be used as the paint excellent for the light absorbance and the heat resistance.

In addition, an insulating portion (not shown) is preferably provided outside the heat collecting element 3. Accordingly, heat radiation from the peripheral wall of the heat collecting element 3 to the outside is blocked so as to efficiently prevent loss of the thermal energy of the heat exchange medium. For instance, the insulating portion which is made of ceramic fiber insulation material whose principal components are alumina, silica, and so on, may be formed outside the heat collecting element 3.

The sunlight inlet 4 is opened at one end of the heat collecting element 3 so that the collected sunlight is introduced through the sunlight inlet 4. Then, the introduced sunlight SB irradiates the light receiving surface 2 so as to indirectly heat the heat exchange medium which circulates inside the heat exchange medium circulation pipe 7 which forms the light receiving surface 2. The sunlight inlet 4 may be opened also at a lower end of the heat collecting element 3. Moreover, the heat exchange medium inlet 5 and the heat exchange medium outlet 6 may be also respectively provided at the upper end and the lower end of the heat collecting element 3. In addition, the sunlight inlet 4, the heat exchange medium inlet 5, and the heat exchange medium outlet 6 are not necessarily arranged in this way, but may be arranged in various ways. For instance, when the sunlight enters from the upper side, the opening is preferably provided in the upper portion. And, when the sunlight enters from the lower side, the opening is preferably provided in the lower portion.

As shown in FIG. 2(b), the heat exchange medium inlet 5 in the bottom center of the heat collecting element 3 is connected with the heat exchange medium circulation pipe 7 which forms the heat collecting element 3. Thus, the heat exchange medium which is pushed out by a sender such as a pump (not shown) is introduced into the heat exchange medium circulation pipe 7. A flow quantity controller such as a valve may be provided in the heat exchange medium inlet 5 to control flow rate of the heat exchange medium which circulates inside the heat exchange medium circulation pipe 7.

As shown in FIG. 2(a), the heat exchange medium outlet 6 on the top of the heat collecting element 3 is connected with the heat exchange medium circulation pipe 7 which forms the heat collecting element 3. Thus, the heat exchange medium, which circulates inside the heat exchange medium circulation pipe 7 and is heated by the sunlight, is sent out through the heat exchange medium outlet 6.

Here, the heat exchange medium inlet 5 and the heat exchange medium outlet 6 are not necessarily arranged as shown in FIGS. 1 and 2(a), but may be arranged respectively on the top and in the bottom center of the heat collecting element 3. Particularly, this arrangement is advantageous when first incident light of the sunlight converges on the upper portion of the heat collecting element 3.

Any heat exchange medium whose heat resistant temperature is greater than or equal to 500° C. may be used with no special limitation. For instance, mixed molten salt of $NaNO_3$ and $KNO_3$ or mixed molten salt of $NaNO_3$, $KNO_3$, and $NaNO_2$ may be used. The molten salt or the mixed molten salt is used to provide temperature and energy which promote chemical reaction of fuel conversion (for instance, reforming reaction of natural gas), thermal energy for steam turbine power generation, or a heat source for a seawater desalination facility.

Figure 3:
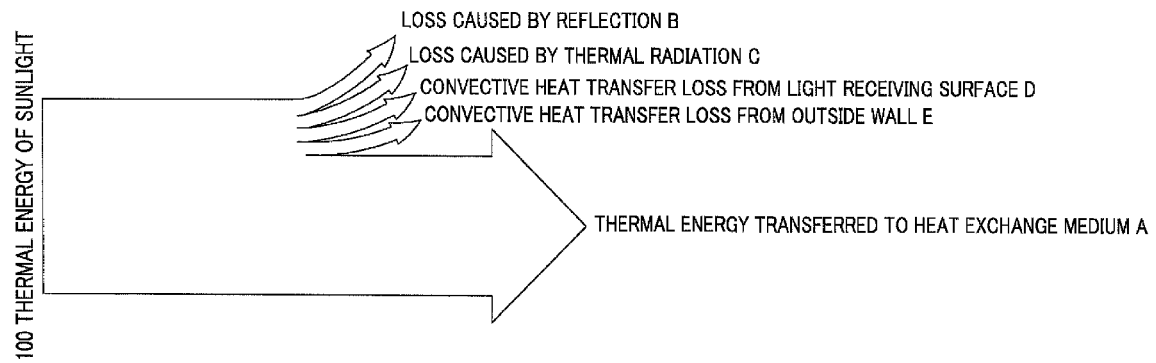
FIG. 3 is a diagram illustrating heat balance in the solar heat collector.
Figure 4:
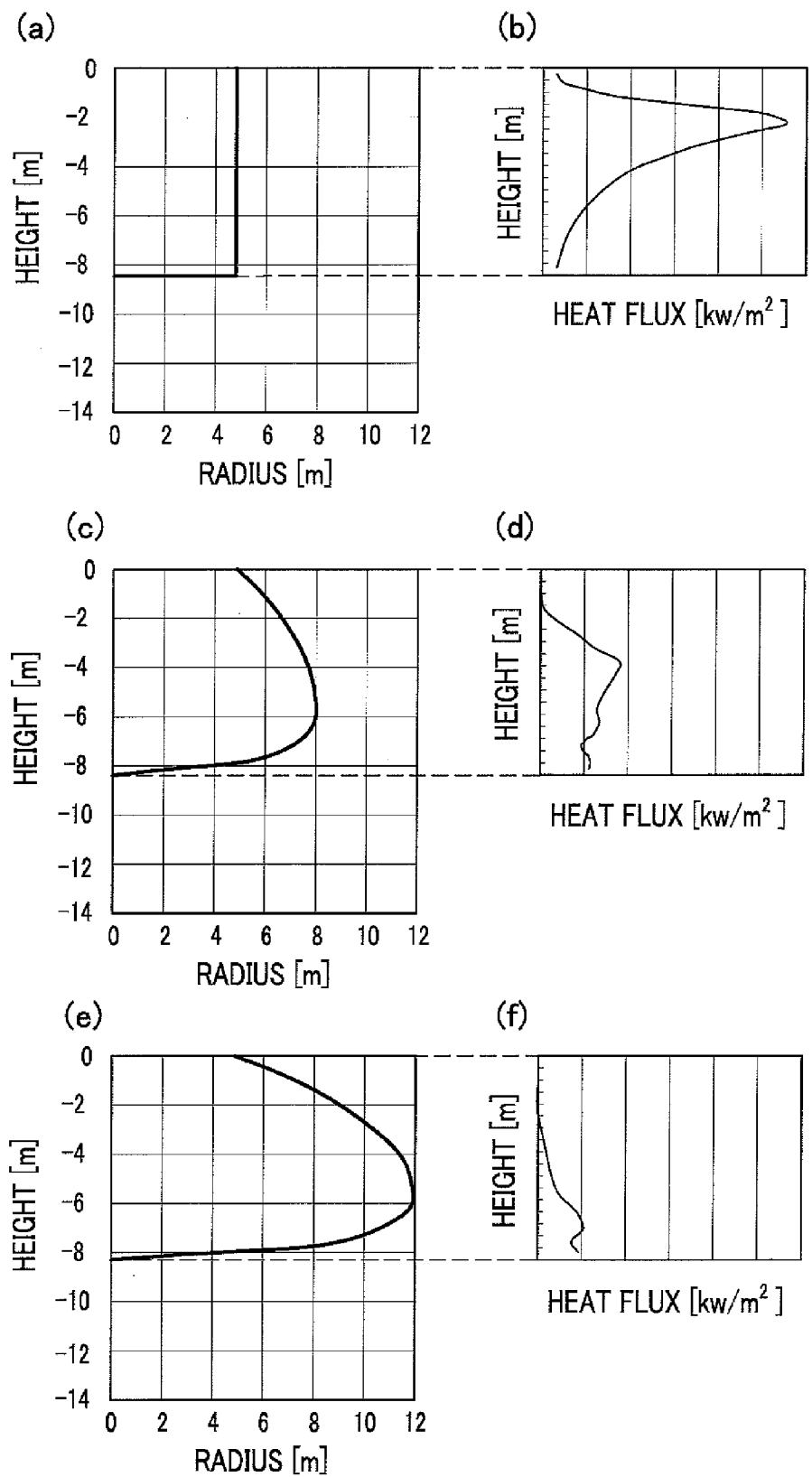
FIG. 4 are diagrams showing cross-sectional shapes of the solar heat collectors and simulation results about distribution of heat fluxes in light receiving surfaces.

Shape of the heat collecting element 3 in the solar heat collector 1 is optimized in consideration of a temperature of the light receiving surface 2 which is irradiated by the sunlight, heat transfer from the light receiving surface 2 to the heat exchange medium, distribution of heat fluxes of the introduced sunlight (thermal energy per unit area of the light receiving surface), and so on. The shape of the heat collecting element 3 includes an opening diameter and an opening shape of the sunlight inlet 4, and the incurved shape of the light receiving surface which is formed by the wound heat exchange medium circulation pipe 7. Here, heat balance in heat collecting element 3 is defined as shown in FIGS. 1 and 3. More specifically, incident energy, that is, thermal energy of the sunlight SB introduced through the sunlight inlet 4 is assumed to be 100. Moreover, net thermal energy transferred to the heat exchange medium is denoted by A, loss caused by reflection of the sunlight inside the heat collecting element 3 is denoted by B, loss caused by thermal radiation from the light receiving surface 2 is denoted by C, loss caused by convective heat transfer from the light receiving surface 2 is denoted by D, and loss caused by convective heat transfer from the outside wall of the heat collecting element 3 is denoted by E. Thus, results of calculating distribution of heat fluxes on the light receiving surface 2 corresponding to cross-sectional shapes of the heat collecting element 3 are shown in FIGS. 4(a)-4(f). As a result, FIG. 4(b) shows heat flux distribution in which heat fluxes concentrate on the upper portion in a case of the heat collecting element 3 with a quadrangle cross section shown FIG. 4(a). Moreover, FIG. 4(d) shows heat flux distribution which is almost averaged except a peak in the center of the heat collecting element 3 in the case of the heat collecting element 3 with a cross-sectional shape shown in FIG. 4C. In addition, FIG. 4(f) shows distribution of heat fluxes which are averaged in the height direction of the heat collecting element 3 in a case of the heat collecting element 3 with a cross-sectional shape shown in FIG. 4(e).

Figure 5:
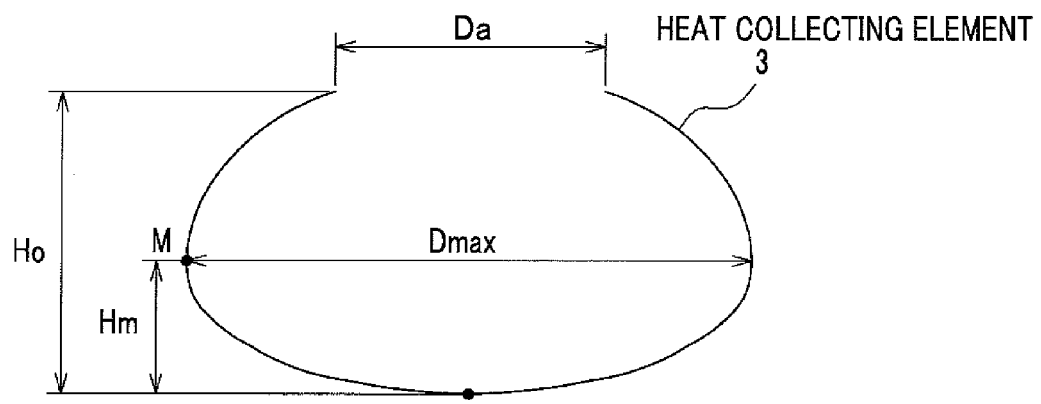
FIG. 5 is a schematic diagram showing an example of a shape of a heat collecting element.

As a result of considering the heat balance in such heat collecting elements 3, it is understood that a shape of the heat collecting element 3 shown in FIG. 5 is effective to optimize the heat flux distribution on the light receiving surface 2 and to improve an efficiency of sunlight utilization in the solar heat collector 1, that is, A/100. The shape is a cavity shape with a cross section which is narrow in the upper portion and wide in the lower portion as a whole, having a relationship expressed by the following formulas (1) and (2). Here, an opening diameter of the sunlight inlet 4 is denoted by Da, height of the heat collecting element 3 is denoted by Ho, height of the most expanded portion M measured from the opposite side of the opening of the heat collecting element 3 is denoted by Hm, and the diameter of the most expanded portion M is denoted by Dmax.

$$1 \leq Dmax/Da < 3 \tag{1}$$

$$0 \leq Hm/Ho < 0.8 \tag{2}$$

Figure 6:
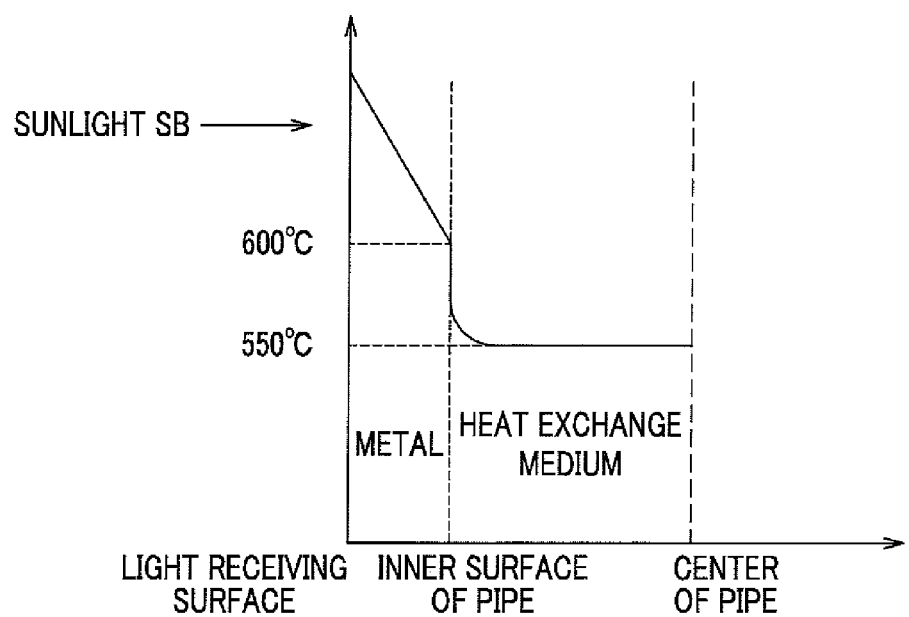
FIG. 6 is a diagram showing simulation results of distribution of temperatures in a light receiving surface of the solar heat collector of the first embodiment.

Moreover, internal diameter of the heat exchange medium circulation pipe 7 (the pipe) which forms the light receiving surface 2 is determined by an upper limit temperature of the heat exchange medium for use and an upper limit temperature of an inner surface of the heat exchange medium circulation pipe 7 which contacts with the heat exchange medium. In addition, an upper limit of pressure loss in the heat exchange medium circulation pipe 7 is determined by restriction of the maximum discharge pressure of the pump which sends the heat exchange medium. Therefore, the whole shape of the heat collecting element 3 and the internal diameter of the heat exchange medium circulation pipe 7 can be determined to meet these two restrictive conditions. By the way, as shown in FIG. 6, a surface temperature on a heat exchange medium side of the light receiving surface 2 which is irradiated and heated by the sunlight SB is assumed to be 600° C., and a magnitude of the heat fluxes to the inside from the outside of the heat exchange medium circulation pipe 7 is assumed to be 300 kW/m$^2$. Then, a temperature of the heat exchange medium which circulates inside the heat exchange medium circulation pipe (the pipe) 7 made of SUS316 stainless steel with a thickness of 5 mm is approximately 550° C. Therefore, a thickness, a material, an internal diameter, and so on of the heat exchange medium circulation pipe 7 can be determined as needed in consideration of such a temperature distribution.

In the solar heat collector 1, the heat exchange medium is introduced through the heat exchange medium inlet 5 to circulate inside the heat exchange medium circulation pipe 7. Thus, the heat exchange medium is heated through the light receiving surface 2 irradiated by the sunlight which is introduced through the sunlight inlet 4. The heated heat exchange medium is sent out through the heat exchange medium outlet 6 and supplied as a heat source for various systems and processes such as a power generation system and a chemical reaction process. In this case, in operating the solar heat collector 1 in a case where mixed molten salt of $NaNO_3$ and $KNO_3$ is used as the heat exchange medium, a flow rate, a flow velocity, and so on of the heat exchange medium are controlled so as to keep a temperature of the mixed molten salt which circulates inside the heat exchange medium circulation pipe 7, within a range between two temperatures of a melting point (220° C.) of the mixed molten salt and the upper limit temperature (600° C.) of the mixed molten salt for use.

In the solar heat collector 1, a part of the sunlight which irradiates the light receiving surface 2 is reflected. However, most of the reflected light re-irradiates the other part of the light receiving surface in the solar heat collector 1 so that the reflected light which disperses outside through the sunlight inlet 4 decreases. Accordingly, the solar heat collector 1 is effective to improve the efficiency (the ratio of the irradiated sunlight which is converted into heat) of the irradiated sunlight utilization. Moreover, it is similarly possible to reduce a quantity of thermal radiation, which is generated from a light receiving surface with a high temperature and disperses to the outside, so as to reduce heat loss caused by the thermal radiation. In addition, as shown in FIG. 1, the heat collecting element is formed in the cavity-shape with the narrow upper cross section so as to reduce the heat loss caused by the heat convection.

Moreover, as for a size of the solar heat collector 1, both of a diameter and a height are approximately 10-20 m in a case where a thermal power is 100 MW. In the heat collecting element 3 with such a size, a structure in which a pipe is helically bent to form a furnace is more advantageous in structural strength and can be easily produced since thermal stress can be smaller, comparing with a structure in which metal plates are combined to form a flow path.

In addition, the solar heat collector 1 may include a mechanism which insulates and blocks the sunlight SB in the sunlight inlet 5. In an emergency case such as where the heat collecting element 3 has lost cooling ability, the mechanism protects the heat collecting element 3. The solar heat collector 1 of the first embodiment described above is formed by a so-called one thread roll which is formed by one wound heat exchange medium circulation pipe 7. However, the solar heat collector 1 of the invention may be formed by a plurality of wound heat exchange medium circulation pipes 7. For instance, as shown in FIGS. 7(*a*) and 7(*b*), eight heat exchange medium circulation pipes 7*a*, 7*b*, 7*c*, 7*d*, 7*e*, 7*f*, 7*g*, and 7*h* may be wound to form the solar heat collector 1. In this case, the heat exchange medium inlet 5 and the heat exchange medium outlet 6 may include headers with branch inlet and outlet pipes which is branched and connected to the eight heat exchange medium circulation pipes 7*a*, 7*b*, 7*c*, 7*d*, 7*e*, 7*f*, 7*g*, and 7*h*.

Second Embodiment

Figure 8:
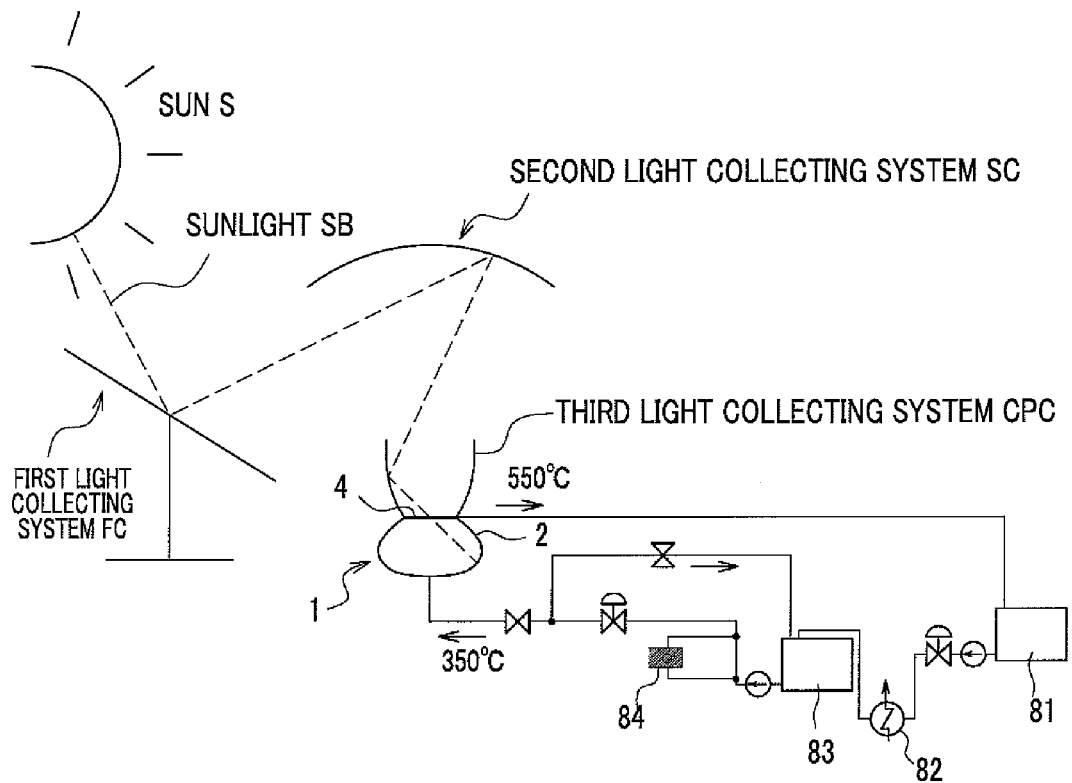
FIG. 8 is a schematic diagram showing a solar energy utilization system according to a second embodiment of the invention.

Next, FIG. 8 is a schematic diagram showing an example of a solar energy utilization system according to a second embodiment, which uses the solar heat collector 1 according to the first embodiment of the invention.

The solar energy utilization system shown in FIG. 8 includes a first light collecting system FC, a second light collecting system SC, a third light collecting system CPC, a solar heat collector 1, a high-temperature heat exchange medium tank 81, a heat exchanger 82, a low-temperature heat exchange medium tank 83, and a heat exchange medium purification system 84. Moreover, the solar heat collector 1, the high-temperature heat exchange medium tank 81, the heat exchanger 82, the low-temperature heat exchange medium tank 83, and the heat exchange medium purification system 84 are connected with each other by flow paths through which heat exchange medium circulates. In addition, valves, and so on are arranged in places.

A solar heat collector 1 similar to the solar heat collector according to the first embodiment is used.

Moreover, the high-temperature heat exchange medium tank 81, the heat exchanger 82, the low-temperature heat exchange medium tank 83, and the heat exchange medium purification system 84 are not limited specially and can be selected in accordance with heat exchange medium to be used, capacity, purity requirement of the heat exchange medium, and so on, as needed.

In the solar energy utilization system, the sunlight SB from the sun S is collected by the first light collecting system FC and the second light collecting system SC which include the reflectors, and so on. In addition, the collected sunlight SB is further collected by the third light collecting system CPC above the solar heat collector 1 and introduced through the sunlight inlet 4 of the solar heat collector 1. The introduced sunlight SB irradiates the light receiving surface 2 of the solar heat collector 1. Thus, the heat exchange medium, which is introduced through the heat exchange medium inlet 5 and circulates inside the heat exchange medium circulation pipe 7, is heated through the light receiving surface 2. Then, the heated heat exchange medium which stores thermal energy is sent out through the heat exchange medium outlet 6 (refer to FIGS. 1 and 2). The heat exchange medium sent out through the heat exchange medium outlet 6 is sent to the high-temperature heat exchange medium tank 81 through the flow path. Then, the heat exchange medium sent to the high-temperature heat exchange medium tank 81 is supplied to the heat exchanger 82 and supplies the thermal energy to a heat utilization facility which is connected with the heat exchanger 82. For instance, the heat utilization facility performs steam turbine power generation, pyrolysis of hydrocarbon, production of liquid fuel from natural gas and coals, or the like.

A part of the thermal energy of the heat exchange medium is exchanged by the heat exchanger 82 so that a temperature of the heat exchange medium lowers. Then, the heat exchange medium is sent to and temporarily stored in the low-temperature heat exchange medium tank 83. And, the heat exchange medium with a low temperature which is temporarily stored in the low-temperature heat exchange medium tank 83 is purified by the heat exchange medium purification system 84 and supplied to the heat exchange medium inlet 5 of the solar heat collector 1, again. The heat exchange medium purification system 84 prevents the circulating heat exchange medium and the piping material from corroding and degrading to block the heat exchange medium circulation pipe 7, and the like, or prevents thermal capacity of the heat exchange medium from decreasing to decrease an efficiency of sunlight energy utilization. Therefore, the heat exchange medium purification system 84 purifies the heat exchange medium to remove corrosion products from the heat exchange medium so that the solar heat collector 91 can operate stably for a long-term. Moreover, when the purification of the heat exchange medium is not necessary, the heat exchange medium can be supplied to the solar heat collector 1 not through the heat exchange medium purification system 84 but through a by-pass in the heat exchange medium purification system 84 without being purified.

Moreover, the high-temperature heat exchange medium tank 81 stores the heat exchange medium and supplies the heat exchange medium to the heat exchanger 82 in accordance with required thermal energy in the heat utilization facility. For instance, in a case where the heat utilization facility is a power plant, it is possible to control supplying the heat exchange medium in accordance with changes in a quantity of power to be generated.

Thus, a plant can continuously operate with a constant output power for 24 hours.

Third Embodiment

Figure 9:
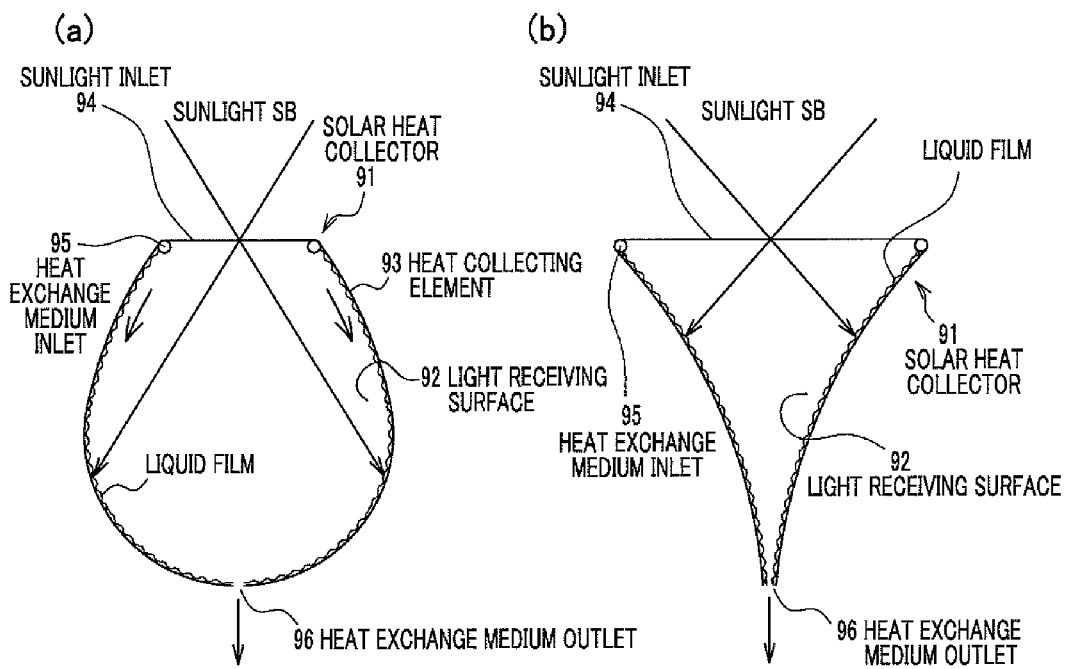
FIG. 9($a$) is a schematic diagram showing an outline of a solar heat collector according to a third embodiment of the invention.

Next, FIG. 9(a) is a schematic cross section showing a solar heat collector 91 according to a third embodiment of the invention.

The solar heat collector 91 shown in FIG. 9A includes a heat collecting element 93 whose inner surface constitutes a light receiving surface 92 where heat exchange medium gravitationally flows down as a liquid film, a sunlight inlet 94 which is opened on an upper end of the heat collecting element 93, a heat exchange medium inlet 95 through which the heat exchange medium is introduced into the heat collecting element 93, and a heat exchange medium outlet 96.

In the heat collecting element 93, thin plates are combined to form the light receiving surface 92 which receives sunlight SB on the inner surface and on which the heat exchange medium gravitationally flows down as a liquid film. Moreover, the light receiving surface 92 is incurved and narrows and converges towards the sunlight inlet 94 which is opened on the upper end of the heat collecting element 93. Similarly to the first embodiment, the incurved shape of the light receiving surface 92 is optimized in accordance with heat flux distribution of collected sunlight SB, a viscosity, a flow rate, a thermal conductivity, a liquid film thickness, and so on of the heat exchange medium which gravitationally flows down as a liquid film along the light receiving surface 92. For instance, as shown in the schematic cross section in FIG. 9(a), a concrete example is a substantial barrel-shape which, as a whole, narrows in an upper portion (on a side of the sunlight inlet 94), widens midway, and has a focus at an end.

Moreover, a shape of the solar heat collector of the third embodiment is not limited to a shape with a cross-sectional shape shown in FIG. 9(a). As shown in FIG. 9(b), the receiving surface 92 may be formed in a substantial trumpet-shape which tapers from the sunlight inlet 94 opened on the upper end of the heat collecting element 93 towards the heat exchange medium outlet 96. Moreover, the heat collecting element 93 formed by a hyperboloid of revolution which has a focus near an end is also a candidate. In addition, the heat collecting element 3 may be formed in a cylindrical shape. The heat collecting element 93 with the cross-section of the trumpet-shape is advantageous since a small surface area of the heat exchange medium in a region (a lower portion of the heat collecting element 3) where a temperature of the heat exchange medium is high on the light receiving surface 92 can reduce loss caused by thermal radiation on the light receiving surface 92.

As shown in FIGS. 10(a) and 10(b), in the heat collecting elements 93 respectively shown in FIGS. 9(a) and 9(b), flow guidelines 98 shown in FIG. 10C are preferably protruded on the light receiving surfaces. The flow guidelines 98 prevent flows on the light receiving surface 92 from deviating to keep liquid film gravity flow of the heat exchange medium in a good state. Moreover, the flow guidelines are effective to improve structural strength of the heat collecting element 3.

Moreover, the light receiving surface 92 of the heat collecting element 93 is preferably processed for light absorbance and heat resistance. As the process for the light absorbance and the heat resistance, paint excellent for the light absorbance and the heat resistance is painted on the light receiving surface 2, or a chemical surface treatment excellent for the light absorbance and the heat resistance is applied. The paint or the chemical surface treatment excellent for the light absorbance and the heat resistance are similar to those in the first embodiment, and not discussed, here.

In addition, an insulating portion (not shown) is also preferably provided outside the heat collecting element 93, similar to that in the first embodiment, and not discussed, here.

In the embodiment, the sunlight inlet 94 is opened on an upper end of the heat collecting element 93. Thus, the collected sunlight is introduced through the sunlight inlet 94. Then, the introduced sunlight SB irradiates the light receiving surface 2 to directly heat the heat exchange medium which gravitationally flows down as a liquid film along the light receiving surface 2. The sunlight inlet 94 may be opened on a lower end of the heat collecting element 93.

As shown in FIG. 9(a) or 9(b), the heat exchange medium inlet 95 is provided on the top of the heat collecting element 93. Thus, the heat exchange medium inlet 95 includes a distributor which spurts the heat exchange medium pushed out by a sender such as a pump (not shown), along the light receiving surface 92 which is an inner surface of the heat collecting element 93. The heat exchange medium spurted from the heat exchange medium inlet 95 forms a liquid film and gravitationally flows down along the light receiving surface. A flow quantity controller such as a valve may be provided in the heat exchange medium inlet 95 to control flow rate of the heat exchange medium which gravitationally flows down as a liquid film along the light receiving surface 92. As a result, the heat exchange medium can be sent out with a constant temperature at any time in spite of changes in incident light energy so that energy with high quality can be collected.

As shown in FIG. 9(a) or 9(b), the heat exchange medium outlet 96 is provided at the bottom of the heat collecting element 3. Thus, the heat exchange medium which gravitationally flows down as a liquid film along the light receiving surface 92 and is heated by the sunlight, is sent out through the heat exchange medium outlet 96.

Any heat exchange medium which is viscous enough to gravitationally flow down as a liquid film along the light receiving surface 92 may be used with no special limitation. For instance, mixed molten salt of $NaNO_3$ and $KNO_3$ or mixed molten salt of $NaNO_3$, $KNO_3$, and $NaNO_2$ may be used. The molten salt or the mixed molten salt can be used to provide temperature and energy which promote chemical reaction of fuel conversion. In particular, the heat exchange medium used in the solar heat collector 91 of the third embodiment needs to form a liquid film. Therefore, the heat exchange medium preferably has good wettability with a structure (particularly, the light receiving surface 92 of the heat collecting element 93). Moreover, the light receiving surface 92 may be processed into a shape or may have a structure which has good affinity with the heat exchange medium.

A thickness of a liquid film of the heat exchange medium which gravitationally flows down as a liquid film along the light receiving surface 92 is preferably approximately 1-7 mm so as to secure an appropriate flow rate and prevent the liquid film from separating from the light receiving surface 92.

Figure 11:
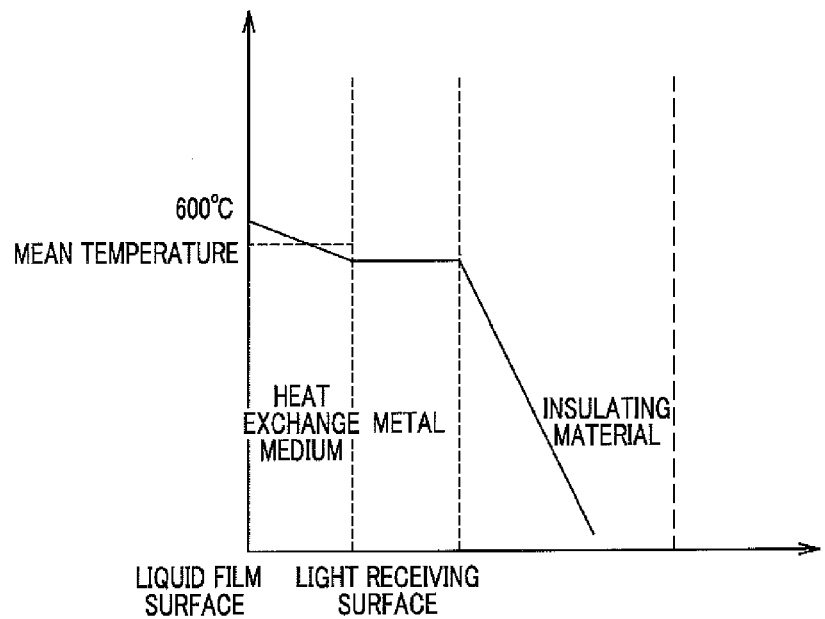
FIG. 11 is a diagram showing results of simulating distribution of temperatures inside and outside the heat collecting element when mixed molten salt colored black is used as heat exchange medium.
Figure 12:
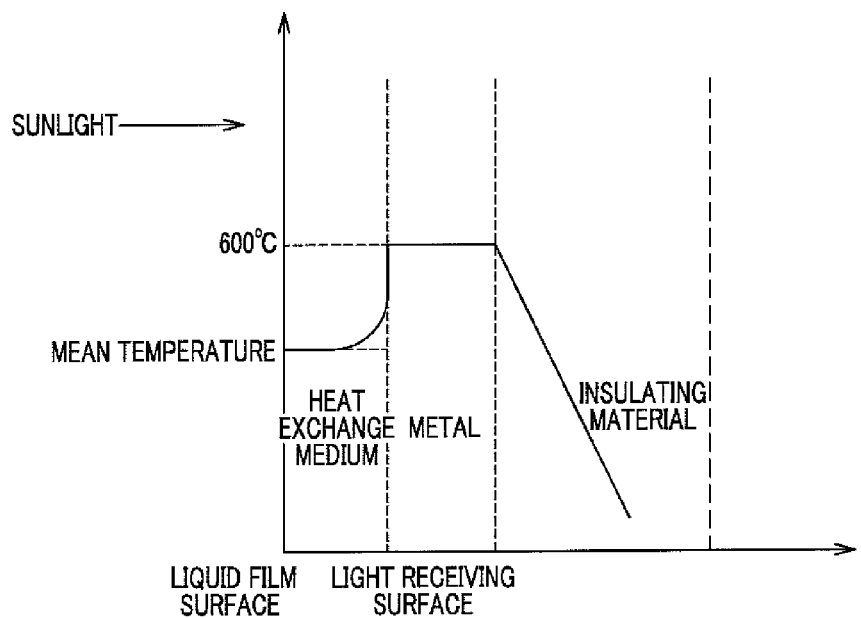
FIG. 12 is a diagram showing results of simulating distribution of temperatures inside and outside the heat collecting element when transparent heat exchange medium is used.

Moreover, the heat exchange medium preferably includes heat absorber to improve an absorption coefficient of the thermal energy from the sunlight SB. For instance, the heat absorber includes a small quantity of colored metal salt such as cobalt nitrate and nickel nitrate. For instance, mixture of $Fe(NO_3)_3 9H_2O$ and $CoCl_2 6H_2O$ by weight ratio of 1:1 is added to mixed molten salt of $KNO_3$ and $NaNO_3$ by 5% to turn the mixed molten salt black. FIGS. 11 and 12 show results of simulating distribution of temperatures inside and outside the heat collecting element 93 in a case of using as the heat exchange medium the turned black mixed molten salt of $KNO_3$ and $NaNO_2$ added by these metal salts and in a case of using transparent heat exchange medium consisting of the mixed molten salt of $KNO_3$ and $NaNO_2$, respectively. As shown in the FIG. 11, in a case where the heat exchange medium which gravitationally flows down as a liquid film along a surface of the light receiving surface 92 of the heat collecting element 93 is black, a temperature on the liquid film surface of the heat exchange medium becomes highest. A temperature of the heat collecting element is lower than the highest temperature of the heat exchange medium which is assumed to be 600° C. On the other hand, in a case (FIG. 12) of using the transparent heat exchange medium, the sunlight SB penetrates the heat exchange medium to reach the light receiving surface 92 where most of the sunlight SB is absorbed and changed into heat. The heat exchange medium is heated by convective heat transfer from the light receiving surface 92. At this time, the highest temperature of the heat exchange medium is equal to the temperature of the light receiving surface 92.

Therefore, a shape of the heat collecting element 93, a flow velocity of the liquid film, a flow rate of the heat exchange medium, a thickness of the liquid film, and so on can be determined as needed in consideration of such a distribution of temperatures.

In the solar heat collector 91, a glass window made of quartz or sapphire may be provided to the sunlight inlet 95. The window prevents dusts, sands, and so on in the air from entering the heat collector 91, and mixing with the heat exchange medium. In the solar heat collector 91, the heat exchange medium is introduced through the heat exchange medium inlet 95, gravitationally flows down as a liquid film along the light receiving surface 92, and is heated by the sunlight SB introduced through the sunlight inlet 94. The heated heat exchange medium is sent out through the heat exchange medium outlet 96 and supplied as a heat source for various systems and processes such as power generation systems and chemical reaction processes.

In the solar heat collector 91 of the third embodiment, the heat exchange medium gravitationally flows down as a liquid film along the light receiving surface 92 of the heat collecting element 93 from the heat exchange medium inlet 95 in the upper portion. Thus, the heat exchange medium is directly heated so that allowable heat load per unit area on the light receiving surface 92 can increase. Therefore, it is possible to further downsize the heat collecting element 93. Moreover, the flow rate of the heat exchange medium is controlled in accordance with a quantity of solar radiation so that the heat exchange medium with a constant temperature can be obtained at any time.

Fourth Embodiment

Figure 13:
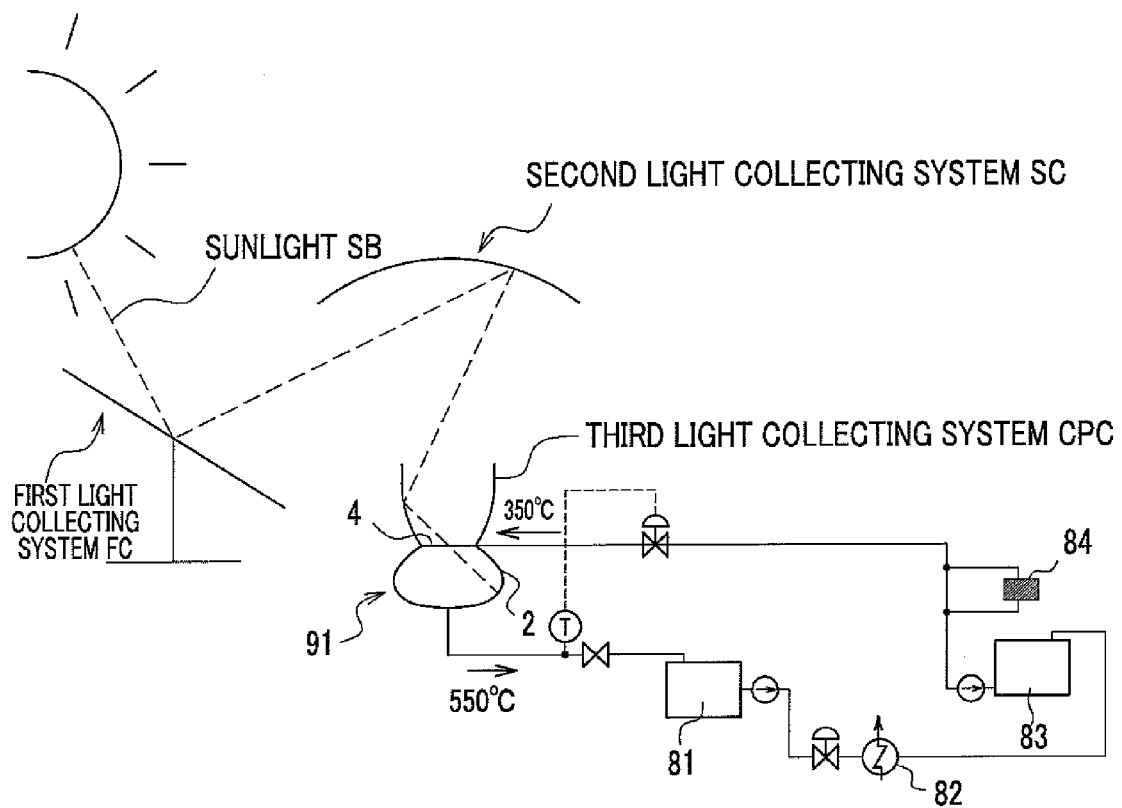
FIG. 13 is a schematic diagram showing a solar energy utilization system according to a fourth embodiment of the invention.

Next, FIG. 13 is a schematic diagram showing an example of a solar energy utilization system according to a fourth embodiment, which uses the solar heat collector 91 according to the third embodiment of the invention.

The solar energy utilization system shown in FIG. 13 includes a first light collecting system FC, a second light collecting system SC, a third light collecting system CPC, a solar heat collector 91, a high-temperature heat exchange medium tank 81, a heat exchanger 82, a low-temperature heat exchange medium tank 83, a heat exchange medium purification system 84. Moreover, the solar heat collector 91, the high-temperature heat exchange medium tank 81, the heat exchanger 82, the low-temperature heat exchange medium tank 83, and the heat exchange medium purification system 84 are connected with each other by flow paths through which heat exchange medium circulates. In addition, valves, pumps, and so on are arranged in places.

As the solar heat collector 91, a solar heat collector similar to the solar heat collector according to the third embodiment is used.

Moreover, the high-temperature heat exchange medium tank 81, the heat exchanger 82, the low-temperature heat exchange medium tank 83, and the heat exchange medium purification system 84 are not especially limited and can be selected in accordance with heat exchange medium to be used, capacity, purity requirement of the heat exchange medium, and so on, as needed.

In the solar energy utilization system, the sunlight SB from the sun S is collected by the first light collecting system FC and the second light collecting system SC which include reflectors, and so on. The collected sunlight SB is further collected by the third light collecting system CPC above the solar heat collector 91 and introduced through the sunlight inlet 94 of the solar heat collector 91. The introduced sunlight SB irradiates the light receiving surface 92 of the solar heat collector 91. Thus, the heat exchange medium, which gravitationally flows down as a liquid film along the light receiving surface 92 from the heat exchange medium inlet 95, is heated. Then, the heated heat exchange medium which stores thermal energy is sent out through the heat exchange medium outlet 96 in the lower portion of the heat collecting element 93 (refer to FIG. 9). The heat exchange medium sent out through the heat exchange medium outlet 96 is sent to the high-temperature heat exchange medium tank 81 through the flow path. Then, the heat exchange medium sent to the high-temperature heat exchange medium tank 81 is supplied to the heat exchanger 82 to supply the thermal energy to a heat utilization facility which is connected with the heat exchanger 82. For instance, the heat utilization facility performs steam turbine power generation, pyrolysis of hydrocarbon, production of liquid fuel from natural gas and coals, or the like.

A part of the thermal energy of the heat exchange medium is exchanged by the heat exchanger 82 to decrease a temperature of the heat exchange medium. Then, the heat exchange medium is sent to and temporarily stored in the low-temperature heat exchange medium tank 83. And, the heat exchange medium with a low temperature which is temporarily stored in the low-temperature heat exchange medium tank 83 is purified by the heat exchange medium purification system 84 and supplied into the heat exchange medium inlet 95 of the solar heat collector 91, again. The circulating heat exchange medium might corrode and degrade caused by contact with outside air on the light receiving surface 92 of the heat collecting element 93. In addition, the heat collecting element 93 also might corrode and degrade. The corroded and degraded heat exchange medium and the corrosion and degradation of the heat collecting element 93 block the heat exchange medium circulation pipe 7, and so on. Therefore, the heat exchange medium purification system 84 purifies the heat exchange medium to remove corrosion products from the heat exchange medium so that the solar heat collector 91a can operate stably for a long-term. Moreover, when the purification of the heat exchange medium is not necessary, the heat exchange medium can be supplied to the solar heat collector 1 not through the heat exchange medium purification system 84 but through a by-pass in the heat exchange medium purification system 84 without being purified.

Moreover, the high-temperature heat exchange medium tank 81 stores the heat exchange medium and supplies the heat exchange medium to the heat exchanger 82 in accordance with required thermal energy in the heat utilization facility. For instance, in a case where the heat utilization facility is a power plant, it is possible to control to supply the heat exchange medium in accordance with changes in a quantity of power to be generated.

In the solar energy utilization system shown in FIG. 13, in a case where the solar heat collector 91 is placed on the ground, first, the heat exchange medium may be supplied to an inner surface of the third light collecting system CPC to gravitationally flow down as a liquid film. Then, the heat exchange medium may be lead to the solar heat collector 91 placed under CPC. As a result, heat collecting by the heat exchange medium decreases heat radiation loss in CPC while cleaning of the heat exchange medium prevents dirt caused by adhesion of dusts on a specular surface, so that a reflection efficiency can be improved.

Moreover, when heat collection rate in CPC is high, CPC itself may be used as the solar heat collector so that the solar heat collector 91 can be omitted.

In the solar energy utilization system, it is possible to control flow rate of the heat exchange medium to be supplied to the heat exchange medium inlet 95 in the solar heat collector 91 using the high-temperature heat exchange medium tank 81, the low-temperature heat exchange medium tank 83, the heat exchange medium purification system 84, the valves and the pumps in places, and so on. Thus, flow rate of the heat exchange medium which gravitationally flows down as a liquid film along the light receiving surface 92 can be controlled. For instance, a temperature of the heat exchange medium with a high temperature which is sent out through the heat exchange medium outlet 96 and a temperature of the heat exchange medium with a low temperature which is supplied to the heat exchange medium inlet 95 are measured. Then, a quantity of the heat exchange medium to be supplied is controlled based on results of measuring the temperature so that an adjustable range of recirculation flow rate extends and an operational efficiency improves. Moreover, it is possible to increase or decrease the flow rate of the heat exchange medium which gravitationally flows down as a liquid film along the light receiving surface 92, in accordance with a quantity of thermal energy required from the heat utilization facility. Furthermore, it is possible to control a circulation flow rate of the heat exchange medium in accordance with a quantity of solar radiation so that the heat exchange medium with a constant temperature can be obtained and supplied to a thermal facility, at any time.

Fifth Embodiment

Figure 14:
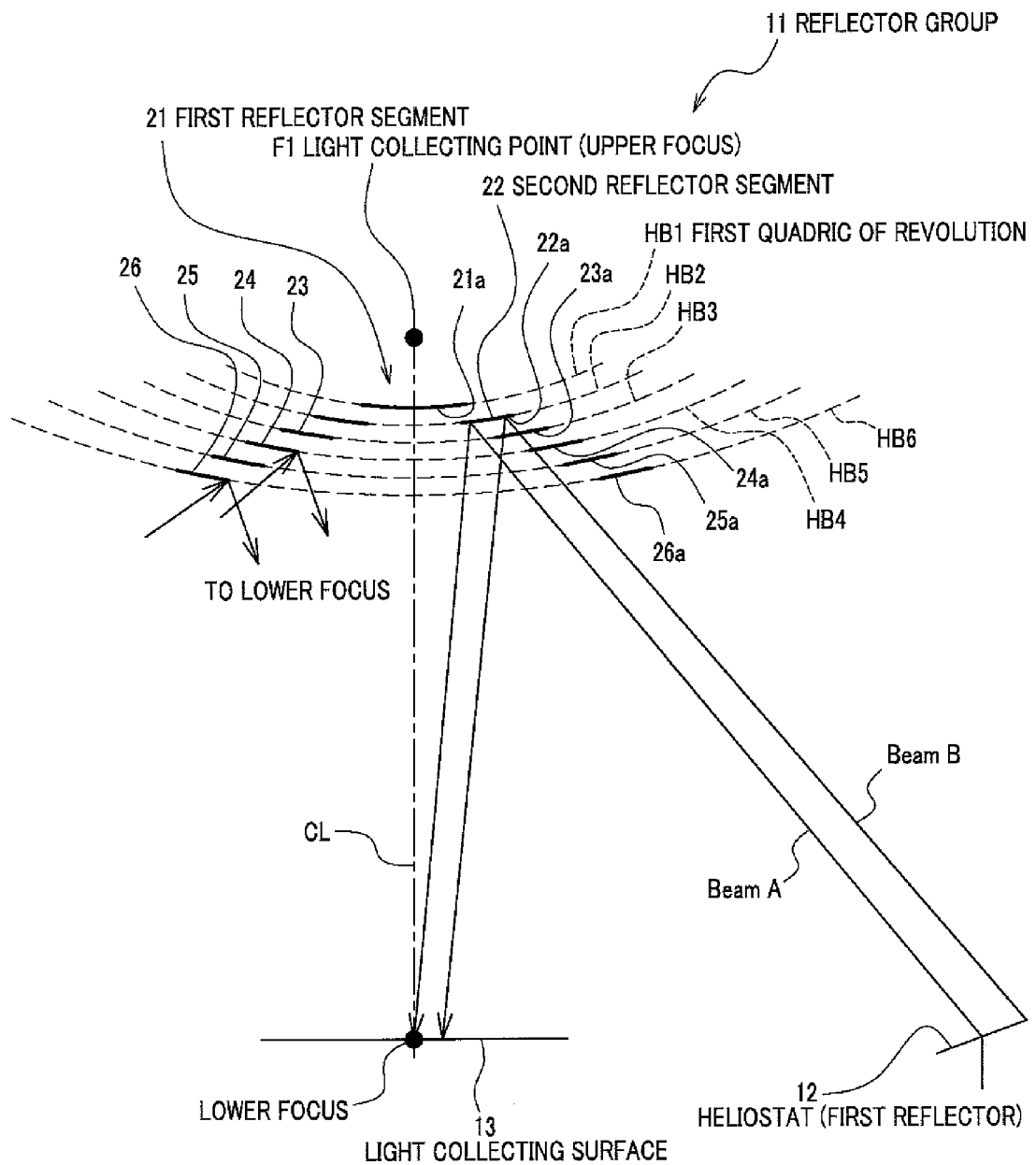
FIG. 14 is a diagram illustrating a sunlight collecting reflector according to a fifth embodiment of the invention.

Next, a fifth embodiment of the invention will be described in detail referring to the drawings as needed. FIG. 14 is a schematic diagram illustrating a structure of a sunlight collecting reflector according to the fifth embodiment of the invention.

FIG. 14 shows a reflector group 11 which includes a sunlight collecting reflector, a heliostat (a first reflector) 12 to collect the sunlight to the reflector group 11, and a light collecting surface (a heat collector) 13 of the sunlight which the reflector group 11 makes converge. Here, in FIG. 14, an only heliostat 12 is representatively shown. However, a plurality of heliostats 12 are arranged to encircle the heat collector in the center similarly to a sunlight collecting system shown in FIG. 33. Moreover, each of the heliostats reflects the sunlight and collects the reflected sunlight to a light collecting point F1.

The reflector group 11 includes a first reflector segment 21 and five reflector segments of a second reflector segment 22, a third reflector segment 23, a fourth reflector segment 24, a fifth reflector segment 25, and a sixth reflector segment 26 which are arranged below the first reflector segment 21.

The first reflector segment 21 has a reflecting surface 21a which includes a portion of a first quadric of revolution HB1 whose focus (an upper focus) is located at the light collecting point F1 of the sunlight collected by the plurality of the heliostats 12.

A reflecting surface 21a of the first reflector segment 21 may be formed in a shape of a disc which is centered at a center line CL and cut out from the first quadric of revolution HB1, or a shape which is a portion cut out of the disc. In addition, the first reflector segment 21 may be formed in a shape of a ring in which a region including the center line CL is opened. For instance, the first reflector segment 21 may be formed in a shape of a circular ring or an arc which is a portion cut out from the circular ring.

Moreover, the second reflector segment 22, the third reflector segment 23, the fourth reflector segment 24, the fifth reflector segment 25, and the sixth reflector segment 26 respectively have reflecting surfaces 22a, 23a, 24a, 25a, and 26a placed along quadrics of revolution HB2, HB3, HB4, HB5, and HB6 which have the same focus with the first quadric of revolution HB1, that is, a confocus, at the light collecting point F1 and whose curvature radius are different from each other.

Moreover, among the reflector segments which are arranged in a direction from the light collecting point F1 to the light collecting surface 13, the nearer the reflector segment is to the light collecting surface 13, the larger curvature radius the quadric of revolution HB1, HB2, HB3, HB4, HB5, or HB6 has. In other words, for instance, the reflector group includes a number n (n is an integer greater than or equal to 2) of the reflector segments which are arranged along a direction from the light collecting point to the heat collector. In this case, there is a relationship of $R_k < R_{k+1}$ between a curvature radius $R_k$ of a quadric of revolution on which a reflecting surface of the k-th (k is an integer and $1 < k \leq n-1$) nearest reflector segment $S_k$ to the light collecting point F1 is placed and a curvature radius $R_{k+1}$ of a quadric of revolution on which a reflecting surface of the k+1-th nearest reflector segment $S_{k+1}$ is placed.

Moreover, in the second reflector segment 22, the third reflector segment 23, the fourth reflector segment 24, the fifth reflector segment 25, and the sixth reflector segment 26, the reflecting surfaces 22a, 23a, 24a, 25a, and 26a may be formed in a shape of a circular ring having as a center axis the center line CL which connects the light collecting point F1 with the center of the light collecting surface 13 of the heat collector, or a shape which is a portion cut out of the circular ring. For instance, the reflecting surfaces may be formed in a shape of a circular ring or an arc which is a portion cut out of the circular ring.

Figure 15:
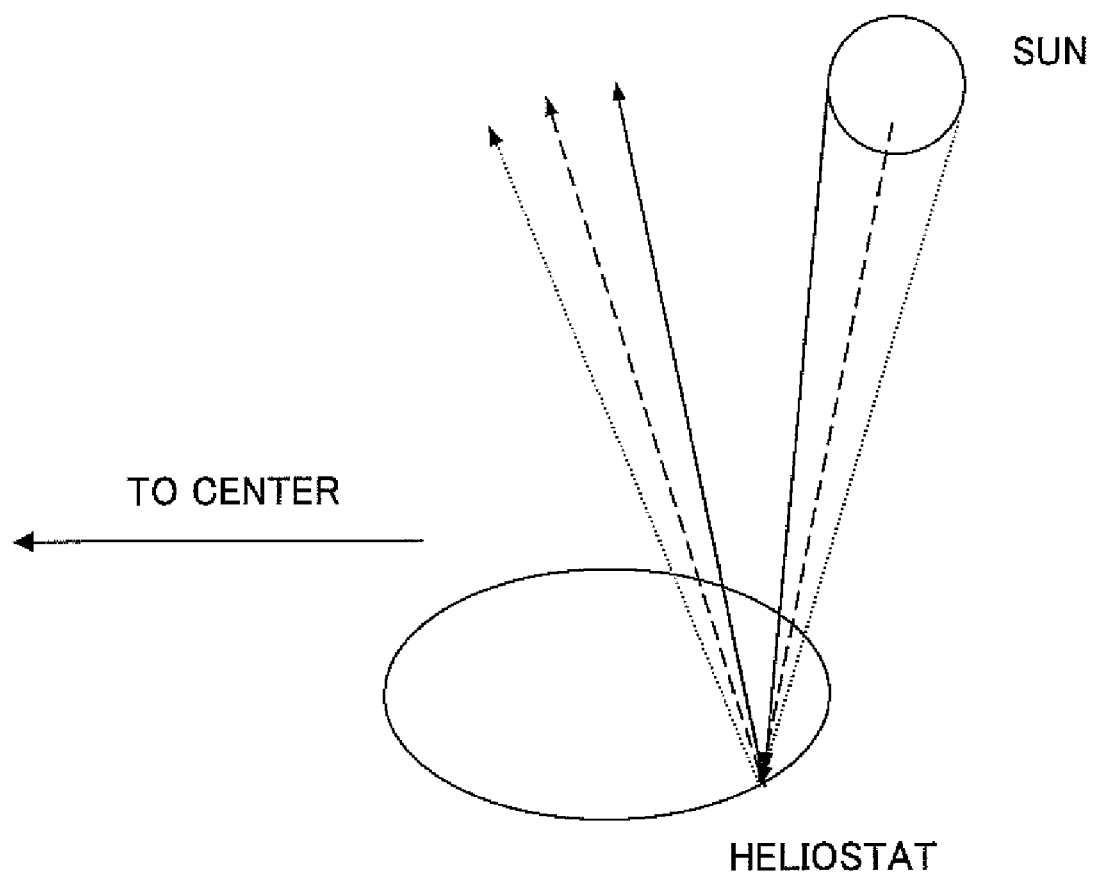
FIG. 15 is a schematic diagram showing that sunlight which converges on a light collecting surface spreads caused by a parallactic angle of the sun.

Moreover, the reflecting surfaces 21a, 22a, 23a, 24a, 25a, and 26a of the first reflector segment 21 through the sixth reflector segment 26 may be respectively formed by a portion of the quadric of revolutions HB1, HB2, HB3, HB4, HB5, and HB6 or may be formed by a tangential plane of the quadric of revolutions HB1, HB2, HB3, HB4, HB5, and HB6. Here, as shown in FIG. 15, in general, the sunlight which converges on the light collecting surface 3 spreads to a certain extent caused by a parallactic angle (30 minutes) of the sun. Accordingly, in particular, the reflecting surfaces (22a, 23a, 24a, 25a, and 26a) of the reflector segments other than the first reflector segment 21 may be respectively formed by the tangential planes of the quadrics of revolution (HB2, HB3, HB4, HB5, and HB6). Then, it is possible to reduce the spreading of the light on the light collecting surface 13 caused by the parallactic angle (30 minutes) of the sun and the heliostats 12 formed in planes so that a light receiving portion of the heat collector can be downsized. In addition, there is an advantage that optimized arrangement of each segment of the first reflector segment 21, the second reflector segment 22, the third reflector segment 23, the fourth reflector segment 24, the fifth reflector segment 25, and the sixth reflector segment 26 equalizes distribution of the collected light heat fluxes on the light collecting surface 13. Moreover, the reflecting surfaces 21a, 22a, 23a, 24a, 25a, and 26a may be formed by curved surfaces which are formed by revolution of line segments about the center line CL. The segment lines may be inclined at a predetermined angle or moved in parallel by a predetermined distance in normal directions with respect to tangent lines of the quadrics of revolution HB1, HB2, HB3, HB4, HB5, and HB6. As a result, the spreading of the light on the light collecting surface 13 can be further reduced. For instance, the reflecting surfaces 21a, 22a, 23a, 24a, 25a, and 26a can be formed by curved surfaces which are respectively formed by revolution of line segments which are inclined at approximately 0-+30 minutes (approximately 0-+30 minutes upward along the center line CL) or preferably approximately +15 minutes with respect to the tangent lines, about the center line CL. Thus, the spreading of the light on the light collecting surface 13 can be reduced. For instance, according to a reflector group with a structure shown in FIGS. 24 and 25, the spreading of the light on the light collecting surface can be reduced to a half.

Moreover, a plurality of reflector units may be arranged on each of the quadrics of revolution HB1, HB2, HB3, HB4, HB5, and HB6 and form each of the reflecting surfaces 21a, 22a, 23a, 24a, 25a, and 26a, respectively. Accordingly, each of the reflecting surfaces 21a, 22a, 23a, 24a, 25a, and 26a may include a set of the plurality of the reflector units, as a whole. Thus, each of the reflector segments may include the set of the reflector units so that it is possible to arbitrarily adjust a shape and a form of each of the first reflector segment 21 through the sixth reflector segment 26. In addition, it is possible to simplify wind resistant design and support structure of each of the reflector segments.

In each of the reflector segments included in the reflector group 11, it is possible to select as needed an arrangement position, a form, an inclination, a curvature radius, and so on of each of the first reflector segment 21 through the sixth reflector segment 26 in accordance with an arrangement position and an arrangement area of a plurality of the heliostats 12, a position of the light collecting point F1, a position and an arrangement direction of the light collecting surface 13, and so on. For instance, when the plurality of the heliostats 12 surround the heat collector and are arranged in a sector, the reflector segments which are included in the reflector group may be formed in a sector in accordance with light paths of the sunlight to be collected. Thus, the sunlight collected by the heliostats 12 can be reflected by the reflector segments so as to converge on the light collecting surface 13 of the heat collector. Moreover, when the plurality of heliostats 12 are arranged along a slope, the light collecting point F1 of the sunlight collected from each of the heliostats 12 is located at a predetermined position in accordance with an inclination angle of the slope. However, the direction, the arrangement position, and so on of each of the reflector segments included in the reflector group 11 can be selected as needed in consideration of the position of the light collecting point F1 and the position of the light collecting surface 13 so as to make the sunlight converge on the light collecting surface 13. Furthermore, when the light collecting surface of the heat collector is inclined at a predetermined angle with respect to a vertical direction depending on an installation site of the heat collector, an installation state of the heat collector in the solar energy utilization system, and so on, the direction and the arrangement position of each of the reflector segments included in the reflector group are adjusted. In addition, the light collecting point F1 of the sunlight collected by the heliostats 12 is adjusted. Accordingly, it is possible to make the sunlight converge on the light collecting surface 13.

In the sunlight collecting reflector, the first reflector segment 21 through the sixth reflector segment cause the sunlight which is reflected on the heliostats 12 to converge on the light collecting surface 13 without leaking so that a light collection efficiency becomes high. Moreover, a space through which wind pass is formed between the first reflector segment 21 and the second reflector segment 22, between the second reflector segment 22 and the third reflector segment 23, between the third reflector segment 23 and the fourth reflector segment 24, between the fourth reflector segment 24 and the fifth reflector segment 25, and between the fifth reflector segment 25 and the sixth reflector segment 26. In addition, each of the reflectors can be small. Thus, a wind pressure which each of the reflectors receives becomes small so that the wind resistant design becomes simple. Moreover, the support structure of each of the reflectors can be simplified so that cost of construction can be reduced by 50% in comparison with a case where the reflector is formed by an only curved surface along a hyperboloid of revolution. Moreover, the spreading of the light receiving surface in the heat collector decreases so that solar energy can be collected to a heat collector which is smaller than conventional one. In addition, incident light heat fluxes on the light receiving surface are controlled so that energy can be smoothed with equal heat fluxes.

In the fifth embodiment, description has been given to an example where six reflector segments (the first reflector segment 21-the sixth reflector segment 26) are arranged. However, in the sunlight collecting reflector according to the invention, a plurality of reflector segments are preferably arranged without limitation in the number of the reflector segments which are arranged between the first reflector segment 21 and the light collecting surface 13 of the heat collector. As a result, there is an advantage that size and weight of each of the reflector segments, spreading of light on the light collecting surface 13, and so on can be reduced. The number of the installed reflector segments is not limited to the number in the embodiment. A required number of the reflector segments to be arranged is determined as needed in accordance with the number of the installed heliostats 12, a height of the first reflector segment 21 which is placed in the highest place, an allowable value of the spreading of the light on the light collecting surface 13, and so on. For instance, when the first reflector segment 21 is located in a high place, the radius of the circular ring which forms a reflector segment (the reflector segment located in the lowest place along the center line CL) located in the outermost periphery becomes small. Accordingly, the required number of the reflector segments is small.

Moreover, in the sunlight collecting reflector according to the invention, the first reflector segment 21 and the second reflector segment 22 through the sixth reflector segment 26 are arranged without overlapping each other on the light paths of the sunlight to be collected to the light collecting point F1 by the plurality of the heliostats (first reflectors) 12. For this purpose, there are considered the light paths of the sunlight which is collected to the reflecting surface of each of the reflector segments from the heliostats 12 and reflected by the outside edge of the reflector segment. Thus, the size, the shape, the curvature radius of the quadric of revolution, the arrangement position, and so on of the second reflector segment 22 through the sixth reflector segment 26 are determined so that the light paths of the sunlight reflected by each of the reflector segments do not intersect with the light paths of the sunlight reflected by the rest of the reflector segments.

In the fifth embodiment, description has been given to an example where the reflecting surfaces of the reflector segments are arranged along the quadrics of revolution. However, the reflecting surfaces of the reflector segments used in the invention are not especially limited, and may be arranged along any kinds of curved surfaces as long as the curved surfaces can reflect the sunlight which is collected to the light collecting point by the plurality of the first reflectors and make the reflected sunlight converge on the light collecting surface. Moreover, at least one kind of curved surface is selected from a hyperboloid of revolution and an ellipsoid of revolution as the quadric of revolution which is described in the embodiment as a concrete example of the curved surfaces on which the reflecting surfaces are arranged. All of the reflecting surfaces of the reflector segments may be arranged along the hyperboloids of revolution or the ellipsoids of revolution. Meanwhile, a part of the reflecting surfaces may be arranged along the hyperboloids of revolution, and the rest of the reflecting surfaces may be arranged along the ellipsoids of revolution. Moreover, when each of the reflector segments includes the set of the plurality of the reflector units, the reflector units included in the set may be arranged along at least one kind of curved surface selected from the hyperboloid of revolution and the ellipsoid of revolution. In addition, the reflector group including the reflector segments whose reflecting surfaces are arranged along the hyperboloid of revolution has a feature that the lights path from each of the heliostats to the light collecting point (the upper focus of the hyperboloid of revolution) and the light paths from the light collecting point to the light collecting surface are comparatively short. The feature is preferably used in a large-scale solar energy utilization system in which a lot of heliostats are arranged over a wide area and the reflector group is placed in the high place. Moreover, a reflector group including the reflector segments whose reflecting surfaces are arranged along the ellipsoid of revolution has a feature that the light paths from each of the heliostats to the light collecting point (the upper focus of the ellipsoid of revolution) and the light paths from the light collecting point to the light collecting surface (the lower focus of the ellipsoid of revolution) are relatively long. The feature is preferably used in a small-scale solar energy utilization system in which the reflector group is placed in the low place.

Sixth Embodiment

Figure 16:
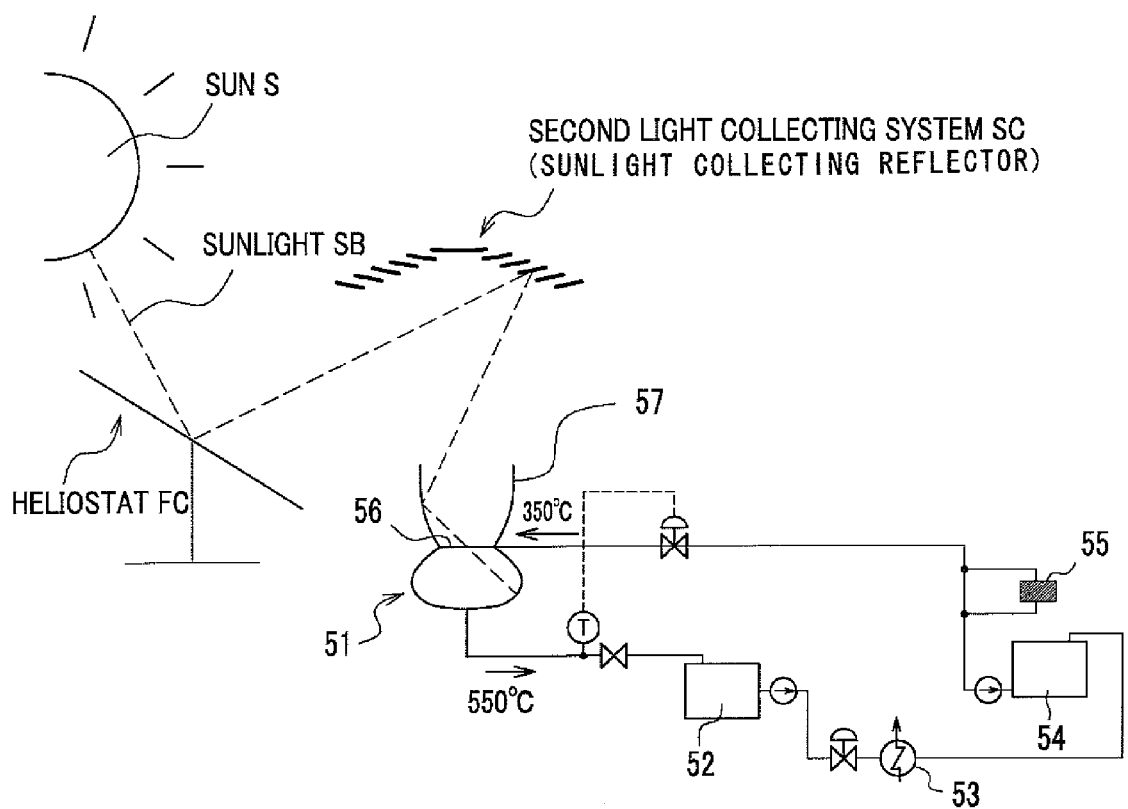
FIG. 16 is a schematic diagram showing a structure example of a solar energy utilization system according to a sixth embodiment of the invention.

Next, FIG. 16 is a schematic diagram showing an example of a solar energy utilization system according to a sixth embodiment, which uses the sunlight collecting reflector according to the fifth embodiment of the invention.

The solar energy utilization system shown in FIG. 16 includes a heliostat (a first light collecting system) FC, a second light collecting system SC, a third light collecting system (CPC) 57, a solar heat collector 51, a high-temperature heat exchange medium tank 52, a heat exchanger 53, a low-temperature heat exchange medium tank 54, and a heat exchange medium purification system 55. Moreover, the solar heat collector 51, the high-temperature heat exchange medium tank 52, the heat exchanger 53, the low-temperature heat exchange medium tank 54, and the heat exchange medium purification system 55 are connected with each other by flow paths through which heat exchange medium circulates. In addition, valves, pumps, and so on are arranged in places.

In the solar energy utilization system, the second light collecting system SC includes the sunlight collecting reflector according to the invention, which includes a reflector group which includes a plurality of reflector segments.

In the solar energy utilization system shown in FIG. 16, the third light collecting system (CPC) 57 which is opened towards the reflector groups may be included above the solar heat collector 51. However, the third light collecting system (CPC) 57 does not need to be included above the solar heat collector 51.

Moreover, in the solar heat collector 51, it is preferred that sunlight irradiates an inner surface of the light receiving surface through an opening which is opened upward.

In the solar heat collector 51, the sunlight is collected by the heliostats FC and reflected by the second light collecting system SC (the sunlight collecting reflector of the invention) so as to converge on the light collecting surface 3. Thus, in the solar heat collector 51, when the third light collecting system (CPC) 57 is included, the light collecting surface 3 is preferably located at the opening of the third light collecting system (CPC) 57. Meanwhile, when the third light collecting system (CPC) 57 is not included, the light collecting surface 3 is preferably located at the opening of the solar heat collector 51.

Moreover, the high-temperature heat exchange medium tank 52, the heat exchanger 53, the low-temperature heat exchange medium tank 54, and the heat exchange medium purification system 55 are not especially limited and can be selected in accordance with heat exchange medium to be used, capacity, purity requirement of the heat exchange medium, and so on, as needed.

In the solar energy utilization system, the sunlight SB from the sun S is collected by the first light collecting system FC to the sunlight collecting reflector SC which is the second light collecting system. The collected sunlight SB is further collected to the solar heat collector 51 by the sunlight collecting reflector SC and introduced through the sunlight inlet 56 of the solar heat collector 51. The introduced sunlight SB irradiates the light receiving surface of the solar heat collector 51.

Thus, the heat exchange medium which is placed on the light receiving surface is heated. Then, the heated heat exchange medium which stores thermal energy is sent out through the heat exchange medium outlet in the lower portion of the heat collecting element 51. The heat exchange medium sent out through the heat exchange medium outlet is sent to the high-temperature heat exchange medium tank 52 through the flow path. Then, the heat exchange medium sent to the high-temperature heat exchange medium tank 52 is supplied to the heat exchanger 53 to supply the thermal energy to a heat utilization facility which is connected with the heat exchanger 53. For instance, the heat utilization facility performs steam turbine power generation, pyrolysis of hydrocarbon, production of liquid fuel from natural gas and coals, or the like.

A part of the thermal energy of the heat exchange medium is exchanged by the heat exchanger 53 to lower a temperature of the heat exchange medium. Then, the heat exchange medium is sent to and temporarily stored in the low-temperature heat exchange medium tank 54. And, the heat exchange medium with a low temperature which is temporarily stored in the low-temperature heat exchange medium tank 54 is purified by the heat exchange medium purification system 55 and supplied to the solar heat collector 51, again.

Moreover, in a case of using the thermal energy of the sunlight obtained by the sunlight collecting reflector of the invention for a reforming reactor, to be specific, in a case of applying the thermal energy to a process for producing synthesis gases (CO and $H_2$) by reaction of methane $CH_4$ with water $H_2O$, the reforming reactor is replaced in the same position with the solar heat collector 51. In this case, when incident light heat fluxes on the light receiving surface can be controlled to smooth energy with equal heat fluxes, the thermal energy is effective for use in the reforming reactor.

Seventh Embodiment

Next, a seventh embodiment of the invention will be described in detail referring to the accompanying drawings as needed. In the following seventh embodiment, a case will be described in which a light collecting system in a tower method is installed in the northern hemisphere. In the light collecting system, a heat collector is placed at a light collecting point. In a case where the sunlight collecting system is installed in the southern hemisphere, first heliostats and second heliostats are arranged reversely in the north-south direction to the heliostats in the seventh embodiment described below. Moreover, in a beam-down light collecting system, a light collecting reflector is placed near the light collecting point. Then, the light collecting reflector reflects sunlight downward to the ground and collects the reflected sunlight to the heat collector near the ground. Besides, the beam-down light collecting system has the same structure with the following seventh embodiment, and therefore will not be discussed.

Figure 17:
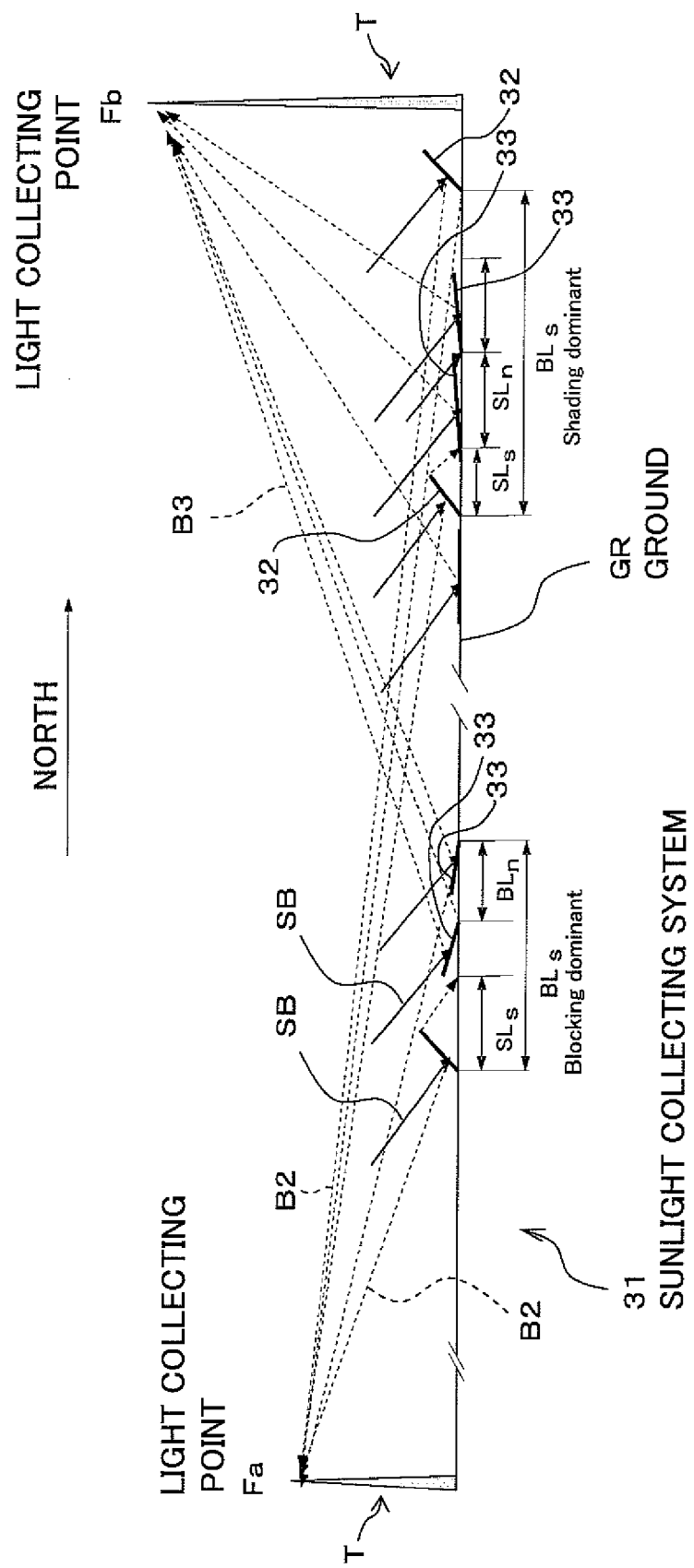
FIG. 17 is a schematic diagram showing a sunlight collecting system according to a seventh embodiment of the invention.

FIG. 17 is a schematic diagram showing a sunlight collecting system according to the seventh embodiment of the invention.

The sunlight collecting system 31 includes a heliostat group A and a heliostat group B.

The heliostat group A includes a plurality of first heliostats 32 which collect sunlight SB to a light collecting point Fa. Moreover, the heliostat group B includes a plurality of second heliostats 33 which collect the sunlight SB to a light collecting point Fb located on a north side of the light collecting point Fa. The first heliostats 32 and the second heliostats 33 are arranged so that light paths of reflected light B2 by the plurality of the first heliostats 32 included in the heliostat group A and light paths of reflected light B3 by the plurality of the second heliostats 33 included in the heliostat group B are formed respectively toward the light collecting points Fa and Fb of the heliostat groups to which the first and second heliostats belong.

Figure 18:
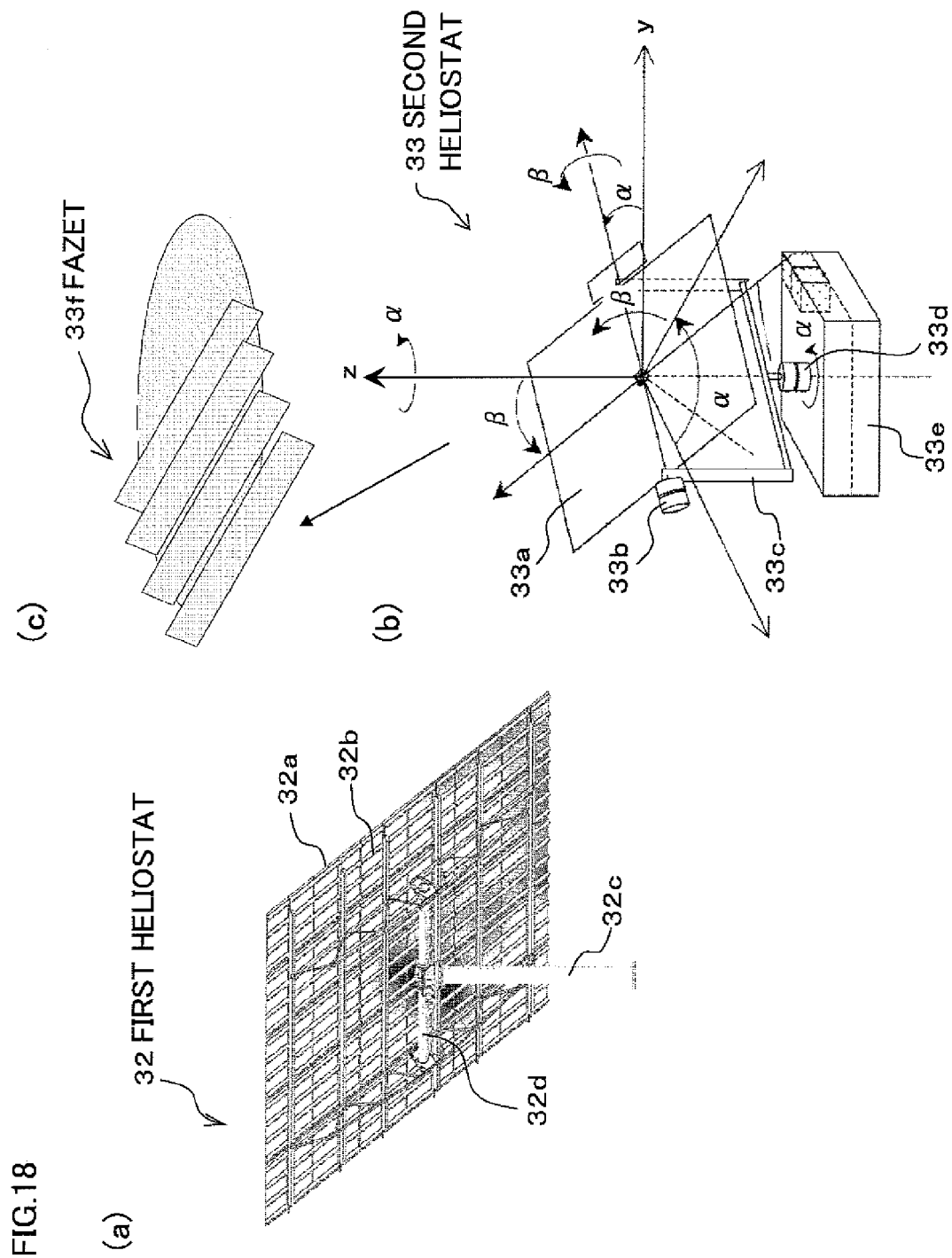
FIG. 18($a$) is a perspective view showing a first heliostat.

The first heliostats 32 are arranged fixedly on the ground so that reflecting surfaces 2a shown in FIG. 18 (a) are directed to face the sun and the light collecting point Fa. In other words, in the first heliostat 2, direction of the reflecting surface 2a is adjusted so that the incident sunlight is symmetry with the reflected light which reaches the light collecting point Fa, about a normal line of the reflecting surface 2a.

For instance, as shown in FIG. 18(a), the first heliostat 32 includes the reflecting surface 32a, a frame 32b which has the reflecting surface 32a on one side, a support column 32c which is erected on the ground to support the frame 32b. For instance, metal may be evaporated on a side of a transparent substrate made of glass, transparent plastic, and so on to form a reflective film. Thus, the reflecting surface 32a may be formed by a reflecting element including the reflective film to have a required shape and area.

In the first heliostat 32, the reflecting surface 32a can follow the sun in accordance with changes in a day and seasonal changes in sun elevation, so as to be directed to face the sun and the light collecting point Fa. For instance, a support axis 32d which is supported by the support column 32c to span the frame 32b may freely rotate in an axial direction and a direction perpendicular to the axial direction. Moreover, the first heliostat 32 may include a solar battery which accompanies the reflecting surface 32a. Then, the solar battery can supply power to rotate the frame 32b and cause the reflecting surface to follow the sun.

The second heliostats 33 are arranged so that the reflecting surfaces 33a are directed to face the sun and the light collecting point Fb. In other words, in the second heliostat 33, direction of the reflecting surface 33a is adjusted so that the incident sunlight SB is symmetry with the reflected light RB3 which reaches the light collecting point Fb, about a normal line of the reflecting surface 33a.

As shown in FIG. 18(b), the second heliostat 33 includes a reflecting surface 33a, a rotation axis 33b by which the reflecting surface 33a is rotatably pivoted, a support frame 33c which is transversely spanned by the rotation axis 33b, a rotation support 33d which pivots the support frame 33c, and a base 33e which supports the rotation support 33d.

In the second heliostat 33, the reflecting surface 33d is rotated about the rotation axis 33b as a center axis in order to adjust an angle β of the reflecting surface 33a in the vertical direction. Moreover, the rotation support 33d is rotated in order to adjust an angle α of the reflecting surface 33a in the horizontal direction. A drive motor and so on not shown in the figure may drive the rotation axis 33b and the rotation support 33d.

The second heliostat 33 may include a running drive means such as a moving wheel in a lower portion of the base 33e. Then, the second heliostat 33 itself can autonomously move to a required position with the running drive means. Accordingly, the second heliostat can autonomously move to a position to avoid shadows made by the first heliostat 32, in accordance with changes in a day and seasonal changes in the sun elevation. In addition, the angle α and the angle β of the reflecting surface 33a are adjusted by the rotation axis 33b and the rotation support 33d so that the sunlight can be reflected and collected to the light collecting point Fb. The second heliostat 33 also may include a solar battery similarly to the first heliostat 32. Thus, the solar battery can supply power to drive the rotation axis 33b, the rotation support 33d, and the running drive means.

The second heliostats 33 are arranged in places where none of the first heliostats 32 is placed and the sunlight irradiates the ground. Accordingly, the second heliostats can eliminate places where the sunlight irradiates the ground between the plurality of the first heliostats 32 included in the heliostat group A, that is to say, blocking. Therefore, the second heliostats 33 are arranged between the first heliostats 32. Thus, there are no more regions where the ground is irradiated by the sunlight which is unused due to the blocking. Consequently, almost all of the sunlight which irradiates a region where the heliostats are arranged is collected to a plurality of the light collecting points so that energy of the collected sunlight can be collected. As a result, a field efficiency, which is a ratio of a light quantity of the sunlight which can be used as energy, becomes almost 100% with respect to a total light quantity of the sunlight which irradiates the region where the heliostats are arranged.

Moreover, the second heliostats 33 are arranged nearer to the ground than the first heliostats 32. Here, the second heliostats 33 being arranged in the positions nearer to the ground than the first heliostats 32 means that the reflecting surfaces 33a of the second heliostats 33 are installed in lower positions and nearer to the ground, comparing with the reflecting surfaces of the first heliostats 32. Accordingly, the second heliostat 33 can be densely arranged in regions where the ground is irradiated by sunlight which is unused due to the blocking. Therefore, there are no more regions where the ground is irradiated by sunlight which is unused due to the blocking. Thus, almost all of the sunlight which irradiates the region where the heliostats are arranged can be collected to the plurality of the light collecting points. As a result, it is possible to improve a light collection efficiency of the entire light collecting system.

Figure 19:
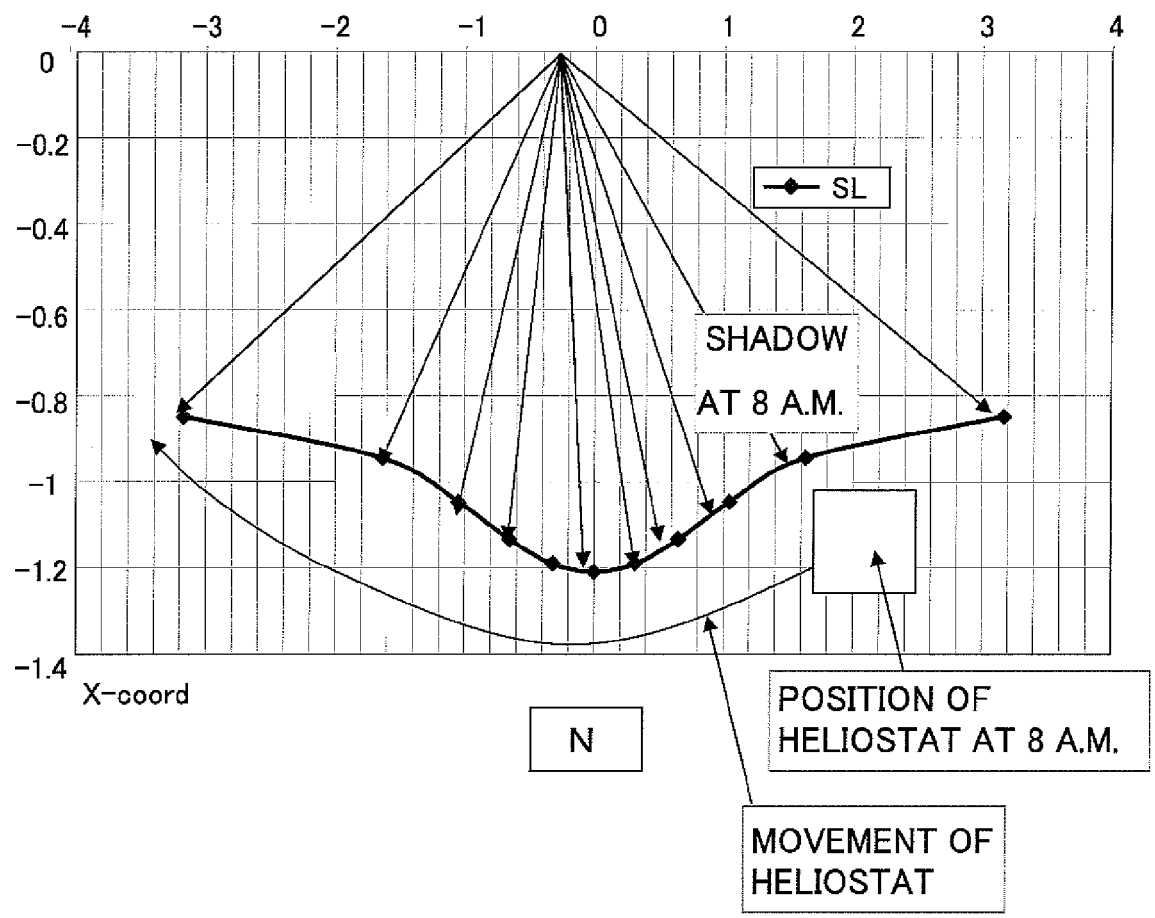
FIG. 19 is a diagram showing results of simulating temporal changes in a shadow length and a direction of the first heliostat and movement of the second heliostat.

As shown in FIG. 18(c), the plurality of the heliostats 33 are arranged in series and parallel in the places where the sunlight irradiates the ground, to cover the places. In each of the second heliostats 33, it is possible to adjust the angles α and β of the reflecting surface 33a in the vertical and horizontal directions in accordance with changes in the sun elevation. In addition, the second heliostat 33 can move using the running drive means in the lower portion of the base 33e so as to avoid the shadows of the first heliostats 32 and the adjacent second heliostat 33. Thus, the second heliostat 33 can change a position and move the reflecting surface 33a of the second heliostat 33 itself in order to follow the sun in accordance with a time during a daytime and a season, so as to receive the maximum sunlight. Therefore, the second heliostat can move to a position where shadows which are made by the first heliostats and hourly change with changes in elevation of the sun during a day and seasonally. As a result, the light collection efficiency can be improved. FIG. 19 shows results of simulating hourly changes of the shadow of the first heliostat 32 and movement of the second heliostat 33 when the second heliostat 33 moves to the position to avoid shadows of the first heliostats, which hourly change with changes in elevation of the sun during a day and seasonally. Thus, the second heliostat 33 can move so as to avoid the shadows of the first heliostats 32 to collect the sunlight. Therefore, the second heliostat is effective to improve the light collection efficiency.

Here will be discussed arrangement of the second heliostats 33 in the sunlight collecting system 1 which has two light collecting points Fa and Fb shown in FIG. 17.

Figure 20:
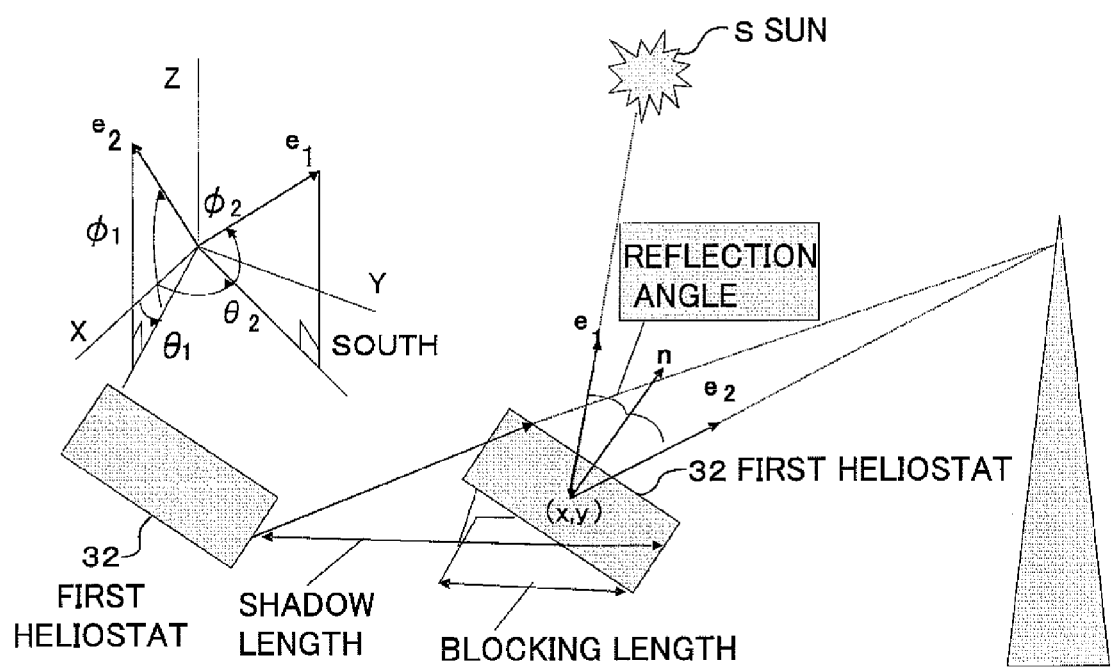
FIG. 20 is a diagram showing relationship among incident light from the sun, reflected light to the tower, and a shadow and interference (blocking) of the reflected light caused by the first heliostat.

FIG. 20 illustrates relationship between incident light and reflected light from the sun S to a tower T (a triangular pole on the right) and concepts of a shadow and interference of the reflected light (blocking) caused by the first heliostat 32. In the FIG. 20, it is assumed that each of the heliostats is formed by a mirror, for simplicity. In FIG. 20, unit vectors e1, e2, and n are respectively a sun direction vector, a tower direction vector, and an outward normal vector of the heliostat. A length of shadow (a shadow length) and a length of blocking (a blocking length) can be obtained by calculation using these vectors and lengths of sides of the heliostats. Here, the blocking length is a distance between two arranged first heliostats when light which is reflected by a lower end of a first heliostat 32 further from the tower passes an upper end of a first heliostat 32 nearer to the tower, on the way to travel towards the tower T. When the both heliostats are arranged being separated from each other by this distance, no light interference occurs caused by the blocking.

Figure 21:
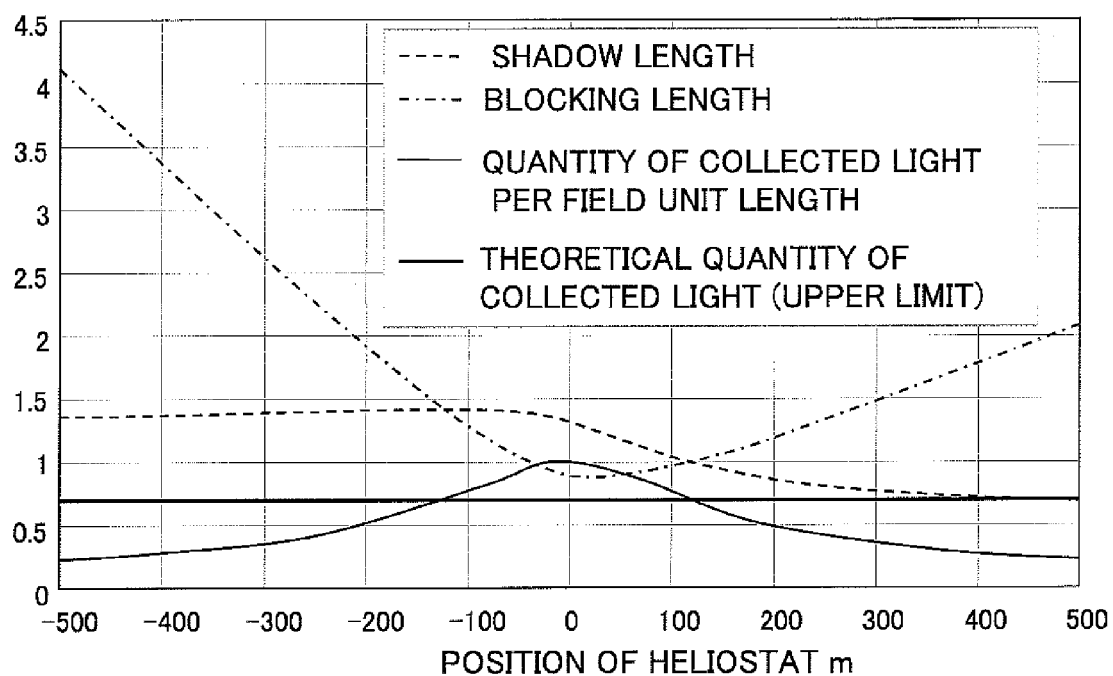
FIG. 21 is a diagram showing distribution in the north-south direction of various parameters related to heliostats when a tower is erected in the center of a field.

FIG. 21 shows relationship among a position and a shadow length of the heliostat, the blocking length, and a light quantity which the heliostat can collect per field unit area, in a case of one tower. A coordinate axis (y) has an origin at the tower T in the north-south direction supposing that a positive direction is south. It is supposed that the sun culminates. In FIG. 21, a height H of the tower (a height of the light collecting point) is 120 m, and a sun elevation φ is 45 degrees.

As shown in FIG. 21, the shadow length (indicated by a dashed line in the figure) is longer than the blocking length (indicated by an alternate long and short dash line in the figure) in a range around the tower T, that is, a range where the following expression is satisfied.

$$|y| < L = H \cot \phi \quad \text{[Expression 1]}$$

On the other hand, the shadow length is shorter than or equal to the blocking length in a region outside the range, that is, in a range where the following expression is satisfied.

$$|y| \geq L = H \cot \phi \quad \text{[Expression 2]}$$

In view of the above, in a range expressed by the following expression, adjacent heliostats in the north-south direction need to be arranged in such a way to be separated from each other by a distance longer than the shadow length to avoid light interference between the heliostats to improve an efficiency of specular surface. On the other hand, in a region outside the range, the adjacent heliostats need to be arranged in such a way to be separated from each other by a distance longer than the blocking length.

$$|y| < H \cot \phi \quad \text{[Expression 3]}$$

Moreover, in the entire field, a distance of the light interference is minimized in a region expressed by the following expression. On the other hand, the blocking length greatly changes depending on the position of the heliostat in a region outside the range.

$$-H \cot \phi < y < 2H \cot \phi \quad \text{[Expression 4]}$$

As shown in FIG. 18(c), these features indicates that the second heliostats 33 which include specular surfaces 33a formed by strip-shaped mirrors (Fazet 33f) arranged with a predetermined intervals are effectively arranged to cover a region expressed by the following expression.

$$|y| < H \cot \phi \quad \text{[Expression 5]}$$

Meanwhile, in a region expressed by the following expression, the blocking length is long and greatly changes depending on the position. Therefore, it is not appropriate to arrange the second heliostats 33 in the region, but it is advantageous to arrange the first heliostats 32 there.

$$y \leq -H \cot \phi \quad \text{[Expression 6]}$$

In consideration of the light collecting system with one tower described above, in the light collecting system with a plurality of towers, the second heliostats are preferably arranged as described below. More specifically, the second heliostats 33 for the second tower are arranged between the first heliostats 32 which collect light to the first tower. In other words, it is advantageous to interplace the second heliostats 33 in a periphery of the tower where the shadow length is longer than the blocking length.

Returning to FIG. 17, it is supposed that an origin of a coordinate axis (y) is positioned at the first tower and L is the shadow length of the tower.

In a region expressed by the following expression, the second heliostats 33 are arranged.

$$-L < y < L'$$ [Expression 7]

In a region expressed by the following expression, at first, the first heliostats 32 are arranged in such a way to be separated from each other by the blocking length. Next, the second heliostats 33 which collect light to the second tower are interplaced between the first heliostats 32 in consideration of the light interference.

$$-4L < y < -L$$ [Expression 8]

In a region expressed by the following expression, the second heliostats 33 which collect light to the second tower are arranged.

$$-4L - L' < y < -L$$ [Expression 9]

In consideration of the number of the heliostats (cost) and the quantity of the collected light, optimal values are selected for a distance 4L between the first tower and the second tower and a distance L' between each of the towers and the north or south end, that is, coordinates for the two towers.

In the light collecting system shown in FIG. 17, the number of the second heliostats which can be arranged between the first heliostats 32 is expressed by the following expression.

$$N_n = N_s \frac{BL_s - SL_s}{\text{Max}(SL_n, BL_n)}$$ [Expression 10]

Here, N is the number of the heliostats per field unit length, BL is the blocking length, and SL is the shadow length. In addition, a subscript n and a subscript s indicate respectively the second heliostat (which collects light to the second tower (on the north side)) and the first heliostat (which collects light to the first tower).

Eighth Embodiment

Next, FIGS. 22(a) and 22(b) are diagrams illustrating arrangement of heliostat groups A and heliostat groups B in a sunlight collecting system according to an eighth embodiment of the invention.

As shown in FIG. 22(a), in the light collecting system, each of light collecting systems includes the heliostat groups A and the heliostat groups B which are arranged so that a plurality of light collecting points F1, F2, F3, ..., and FN are formed and arranged in the north-south direction. A multiple rows of the light collecting systems are arranged with appropriate intervals in the east-west direction.

As shown in FIG. 22(b), in the sunlight collecting system, a heliostat group $B_{h1}$ (h1 is an integer greater than or equal to 1) and a next heliostat group $A_{k1}$ (k1 is an integer greater than or equal to 2) form one light collecting point. Thus, a required number of light collecting points can be formed in series in the north-south direction with almost equal intervals so that the other light collecting point Fb is formed on the north side of the one light collecting point Fa. Therefore, a required quantity of sunlight can be efficiently collected even in a long and slender region regardless of an area of the region where the heliostats are arranged.

In the light collecting system, it is possible to improve an efficiency of light collection in a field in an almost circle or square shape. Moreover, the heliostat groups may be arranged so that a plurality of light collecting points are formed to stagger every row so as to reduce influence of the shadows.

Ninth Embodiment

FIGS. 23(a) and 23(b) are diagrams illustrating arrangement of light collecting points and heliostat groups in a sunlight collecting system according to a ninth embodiment of the invention. As shown in FIG. 23(a), the sunlight collecting system includes a unit 41 which includes regions A2 and A3 (fields) where the heliostat groups including first heliostats are arranged, regions A1 and A4 (fields) where the first heliostats and second heliostats are mixed and arranged. In addition, three light collecting points F1, F2, and F3 are formed by the heliostat groups included in the unit 41 to be located at vertices of a triangle D. The base of the triangle D is a line which connects the light collecting point F2 with the light collecting point F3 and directed in the east-west direction. Moreover, the light collecting point F1 is located at the apex of the triangle D. Since contour lines of a light collection efficiency are formed in similar shapes to an elongate oval in the north-south direction, it is effective for improving the light collection efficiency that the triangle D is an isosceles triangle whose base is directed in the east-west direction.

In the light collecting system, the first heliostats are arranged to select the light collecting point to maximize a quantity of collected light. Then, the second heliostats are arranged in the regions where the blocking occurs. Thus, light can be collected to the light collecting point which maximizes the quantity of the collected light on the north side of the heliostats. As a result, the second heliostats can form an optimal light collecting point at any time in accordance with changes during a day and seasonal changes in an irradiation angle of the sunlight. Consequently, the quantity of the collected light in a year can be maximized comparing with the light collecting system where heliostats are fixed.

Moreover, as shown FIG. 23 (b), the units each of which forms the three light collecting points F1, F2, and F3 may be arranged in a triangular lattice in the east-west direction and the north-south direction. Thus, it is possible to construct a large-scale light collecting system. In the sunlight collecting system shown in FIG. 23(b), since the units are arranged in the triangular lattice in the east-west direction and the north-south direction, it is possible to improve an efficiency of the light collection in a field in an almost circle or square shape. Moreover, when the towers are arranged to stagger every row, influence of the shadows can be reduced. In such a structure, the arrangement can be optimized as needed in accordance with geographical conditions such as an area, an inclination, and a shape of a place where the first heliostats, the second heliostats, and heat collectors or light collecting reflectors are installed. Therefore, the structure is effective in a case of constructing a highly flexible and commercially large-scale sunlight collecting system.

The seventh embodiment, the eighth embodiment, and the ninth embodiment described above are examples where the first heliostat and the second heliostat have different forms. However, in a sunlight collecting system according to the invention, a first heliostat and a second heliostat may have the identical form. For instance, the first heliostat and the second heliostat may have a form shown in FIG. 18(a) to form a heliostat group. In other words, a plurality of heliostats with the form shown in FIG. 18(a) may be arranged to form a heliostat group A. Thus, at first, sunlight is collected to a light collecting point Fa. Then, another heliostat group B may include another plurality of heliostats with the form shown in FIG. 18(a), each of which turns a reflecting surface in a direction different from the above-mentioned arranged heliostats. The other heliostat group B may be formed in a place where the sunlight irradiates the ground between the arranged heliostats with the form shown in FIG. 18(a), so that the sunlight is collected to another light collecting point Fb. Thus, a light collecting system can be formed. Similarly, heliostats with the form shown in the FIG. 18(b) may be used as a first heliostat and a second heliostat to form a plurality of heliostat groups.

In the sunlight collecting systems of the invention described above, a heat collector or a light collecting reflector may be placed at each of the light collecting points formed by the plurality of heliostat groups in the sunlight collecting system. Then, energy of collected sunlight can be collected by the heat collector or a heat collector under the light collecting reflector. Accordingly, it is possible to collect with a high field efficiency the sunlight which irradiates the region where the heliostats are installed and highly efficiently use thermal energy of the collected sunlight. For instance, it is possible to construct a solar energy utilization system which includes a sunlight collecting system, a solar heat collector, a high-temperature heat exchange medium tank, a heat exchanger, a low-temperature heat exchange medium tank, and a heat exchange medium purification system. Then, the sunlight collecting system according to the invention may be used as the sunlight collecting system.

In the solar energy utilization system, sunlight is collected by the sunlight collecting system, and the collected sunlight is further collected by the solar heat collector so that energy of the sunlight is collected. The energy of the sunlight heats heat exchange medium in the solar heat collector and is collected in the heated heat exchange medium which stores thermal energy. Then, the heat exchange medium is supplied to the heat exchanger and supplies thermal energy to a heat utilization facility which is connected with the heat exchanger. For instance, the heat utilization facility performs steam turbine power generation, pyrolysis of hydrocarbon, production of liquid fuel from natural gas and coals, or the like.

For a solar energy utilization system according to the invention, there may be various forms of embodiments. For instance, the solar heat collector according to the first or third embodiment may be used as a solar heat collector. Accordingly, the solar heat collector of the first or third embodiment is used as the heat collector to highly efficiently collect energy of the sunlight which is collected with a high field efficiency by the heliostat groups. As a result, the thermal energy of the sunlight can be highly efficiently used.

Moreover, the sunlight collecting reflector according to the fifth embodiment of may be used as a sunlight collecting reflector in the solar energy utilization system. As a result, the sunlight is collected with a high field efficiency by the plurality of heliostat groups including a plurality of first reflectors. Then, the sunlight collecting reflector makes the collected sunlight efficiently converge on the heat collector so that the thermal energy of the sunlight can be highly efficiently used.

Moreover, in the solar energy utilization system, the solar heat collector according to the first or third embodiment may be used as the solar heat collector, and the sunlight collecting reflector according to the fifth embodiment may be used as the sunlight collecting reflector. Thus, sunlight reflected by a plurality of first reflectors to a light collecting point can be efficiently collected to the heat collector by the sunlight collecting reflector. In addition, the collected sunlight can converge on the solar heat collector according to the first aspect A of the present invention. Accordingly, energy of the converging sunlight is highly efficiently stored in the heat exchange medium, and the stored thermal energy can be used.

Furthermore, in the solar energy utilization system, any forms of systems such as a Rankin cycle type system which uses a steam turbine, an open Brayton cycle system which uses a gas turbine, and so on are applicable to a power generation system using solar energy. The power generation system can be selected as needed in accordance with various conditions such as an entire structure of the solar energy utilization system, a purpose to use the solar energy, and geographical conditions. For instance, in a system whose main purpose is power generation, all of the thermal energy of the sunlight stored in the heat exchange medium by the solar heat collector can be used as energy to drive a power generator. Moreover, in a case of a multiple system which is a combination of the power generation system and at least one other system such as a chemical plant or the like, the energy of the sunlight can be shared between the power generation system and the other system in consideration of how to use energy, a temperature of the heat exchange medium, and so on so that the thermal energy of the sunlight can be efficiently used.

Next, a concrete example of a power generation system using solar energy will be described as a solar energy utilization system.

Figure 24:
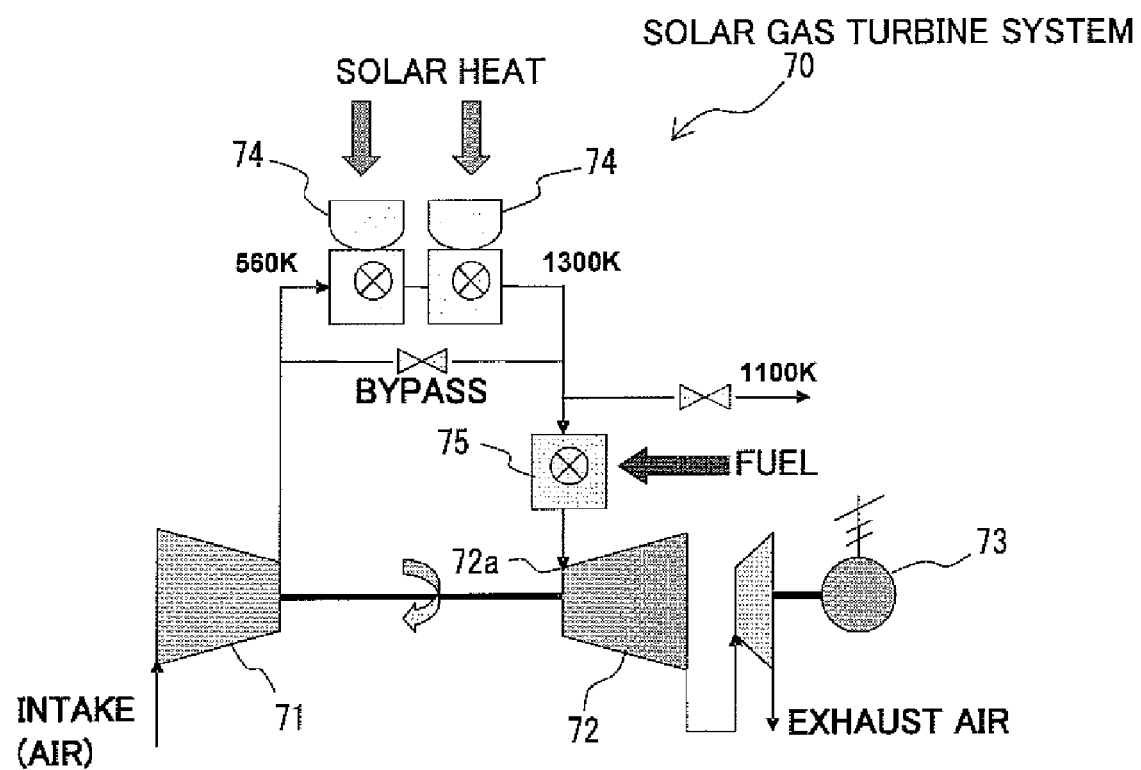
FIG. 24 is a schematic diagram showing a concrete example of an open Brayton cycle power generation system.

FIG. 24 shows a concrete example of an open Brayton cycle power generation system (a solar gas turbine system) which uses solar energy as a thermal energy source of the power plant including a gas turbine (Sinai, J. et al., "Adaptation and modification of gas turbines for solar energy applications", GT 2005-68122, proc. ASME Turbo Expo 2005, 2005). When air as working medium can be heated to a sufficiently high temperature, the solar gas turbine system can achieve a higher power generation efficiency than that in the Rankine cycle system which uses the steam turbine as a working medium.

A solar gas turbine system 70 shown in FIG. 24 includes a compressor 71 which intakes and compresses the outside air, and a turbine 72 and a power generator 73 which perform expansion work. Moreover, sunlight is reflected by a plurality of reflectors (heliostats: not shown) arranged on a surface of the ground and collected to a photoreceptor 74 (a receiver) on a top of the tower. Heat of the collected sunlight directly heats high-pressure air supplied from the compressor 71 to the photoreceptor 74 to generate high-temperature and high-pressure air. The generated high-temperature and high-pressure air is introduced into the turbine 72, and performs the expansion work so that power is generated by the power generator 73 directly connected with an axis of the turbine 72.

In the solar gas turbine system 70, three fifths of the expansion work of the high-temperature and high-pressure air in the turbine 72 is consumed as a shaft power output of the compressor 71. Therefore, the generated power output is (the shaft power output of the turbine)−(the required shaft power output of the compressor). In a case of the simplest cycle, exhaust air from the turbine is diffused into the air after the turbine has ended the expansion work.

In the solar gas turbine system 70, a temperature of the high-temperature and high-pressure air is 1000° C. or higher in an inlet 72a of the turbine. Therefore, for instance, the heat exchange material included in the photoreceptor 74 is preferably heat resistant alloy. Moreover, the working medium (air) of the turbine is directly heated by the heat of the collected sunlight to operate the turbine. Accordingly, it is preferred that not only during daytime when the sunlight irradiates, but even during nighttime, the thermal energy of the sunlight stored in the heat exchange medium during daytime or energy in a combustor 75 shown in FIG. 24 is used to heat the working medium and the heated working medium is supplied to the turbine. Here, a bypass isolates the system in emergency to stop supply of heat or controls the temperature of the working medium in the inlet 72a of the gas turbine.

Figure 25:
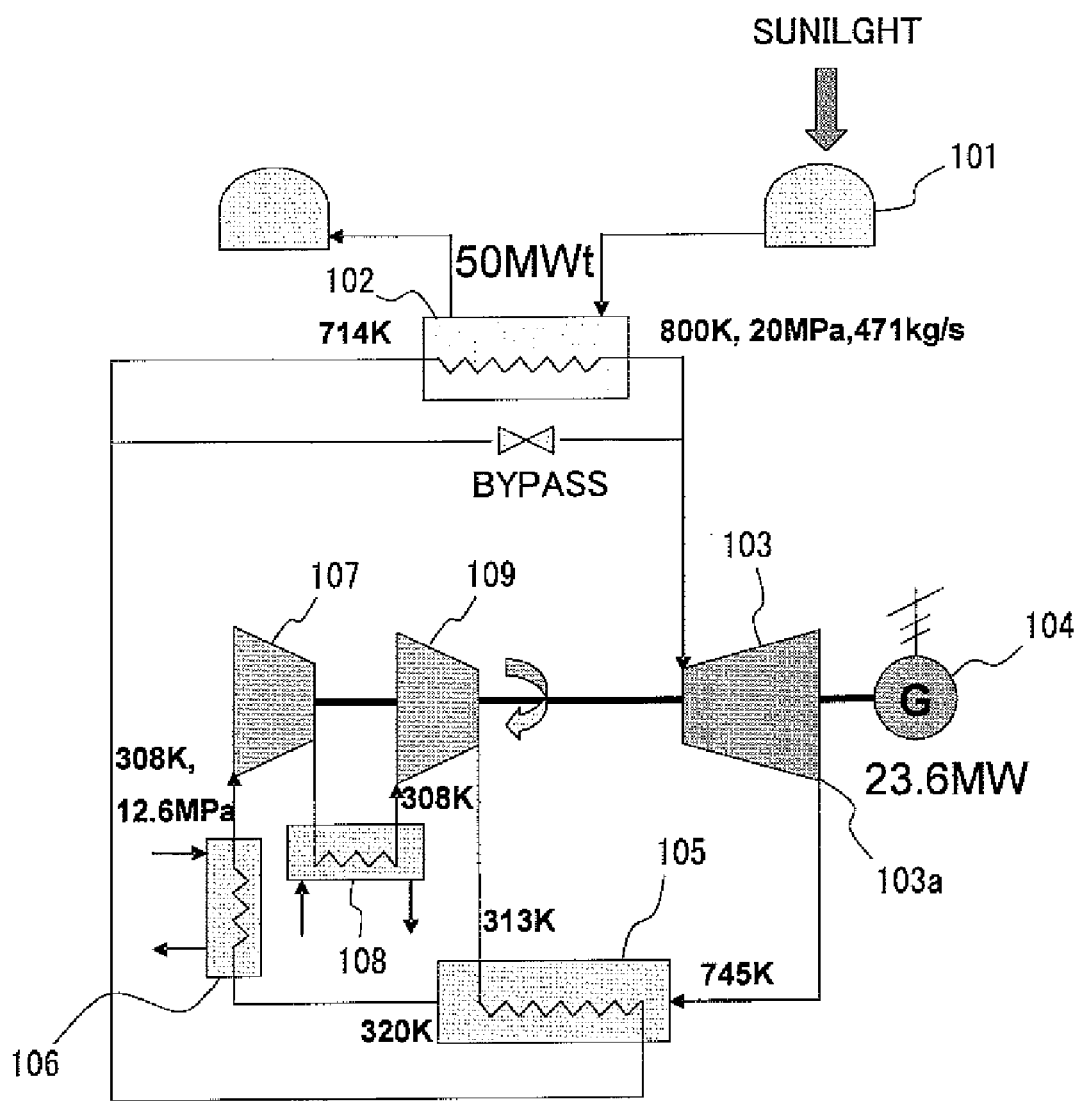
FIG. 25 is a schematic diagram showing a concrete example of a gas turbine power generation system.

In a gas turbine power generation system 100 shown in FIG. 25, to cut off consumption of fossil fuel during nighttime, and operate 24 hour power generation only with solar thermal energy, sunlight collected by sunlight collecting reflectors converges on a solar heat collector. Then, energy of the converging sunlight is stored in heat exchange medium as thermal energy.

Thus, carbon dioxide in a supercritical state is used as working medium to supply a part of the stored thermal energy to a gas turbine power plant to generate power.

The gas turbine power generation system 100 shown in FIG. 25 includes a solar heat collector 101, a molten salt heat exchanger 102, a turbine 103, and a power generator 104. In addition, the gas turbine power generation system 100 further includes a regenerative cycle including a regenerative heat exchanger 105, a precooler 106, a low-pressure compressor 107, an intercooler 108, and a high-pressure compressor 109 between an exit 103a of the turbine 103 and an inlet 102a of the molten salt heat exchanger 102.

In the gas turbine power generation system 100, in a solar heat collector 101, thermal energy of sunlight stored in molten salt is used as a heat source to drive a gas turbine cycle. In the gas turbine power generation system 100, carbon dioxide (working medium) is cooled close to a critical temperature by the precooler 106 and then compressed by the low-pressure compressor 107. The working medium (the carbon dioxide) whose temperature becomes high is cooled again close to the critical temperature by the intercooler 108 and then compressed by the high-pressure compressor 109 to be in a supercritical state. After that, exhaust heat of exhaust gas purged from the exit 103a of the turbine 103 is collected in the regenerative heat exchanger 105 and raises the temperature of the working medium (the carbon dioxide in the supercritical state). Thus, in the molten salt heat exchanger 102, the working medium takes the thermal energy of the sunlight stored in the molten salt in the solar heat collector 101. Therefore, the temperature of the working medium is further raised. Then, the working medium is introduced into the turbine 103 to perform expansion work so that the temperature of the working medium falls. The working medium exhausted from the exit 103a of the turbine 103 transfers the thermal energy of the exhausted air to the gas purged from the exit of the high-pressure compressor 109 in the regenerative heat exchanger 105. Afterwards, the working medium is cooled close to the critical temperature in the precooler 106, and supplied again to the low-pressure compressor 107. Through a circulation cycle of the working medium (the carbon dioxide), the expansion work of the working medium by the thermal energy of the sunlight drives the turbine to generate power in the power generator 104. By the way, "the carbon dioxide in the supercritical state" in the invention means carbon dioxide in a state with a pressure higher than or equal to a critical pressure (7.375 MPa).

In the gas turbine power generation system 100, the intercooler 108 lowers the temperature of the working medium in the inlet of the high-pressure compressor 109 so as to reduce compression work in the high-pressure compressor 109.

Moreover, in the regenerative heat exchanger 105, the thermal energy of the exhaust gas with a high temperature from the turbine 103 is collected within the cycle to save a quantity of supplied heat so that a thermal efficiency of the gas turbine cycle is improved.

Thus, through the circulation cycle, the thermal efficiency of the gas turbine cycle is maximized when a pressure ratio in the high-pressure compressor 109 is small. Therefore, there is an advantage that a pressure resistant design of the gas turbine becomes simple.

In the gas turbine power generation system 100, the thermal energy of the sunlight which is collected in the solar heat collector 101 is stored in the heat storage medium. In addition, a part of the thermal energy is used to generate power in the gas turbine power generation system 100 through the molten salt heat exchanger 102. Therefore, the system can generate power for 24 hours at a constant output regardless of daily changes in quantity of solar radiation. In this case, the closed gas turbine cycle in which the carbon dioxide in the supercritical state is used as the working medium is effective for the gas turbine cycle which is more efficient than the steam turbine and is operated within a temperature range (a middle temperature<1000° C.) within which the working medium is usable.

In the gas turbine cycle, a reason why the carbon dioxide in the supercritical state is used as the working medium is described below.

In general, compression/expansion work of gas is expressed by the following expression.

[Expression 11]

$$W = \int V dp = \int zRT dp/p \tag{1}$$

Moreover, there is an advantage that power requirement of the compressor can be greatly reduced using a feature that compressibility coefficient z of carbon dioxide suddenly drops (⅕ of ideal gas at most) near a critical point as described below. In addition, critical conditions (31° C. and 7.4 MPa) of carbon dioxide are near a normal temperature. Therefore, there is an advantage that it is possible to form a cycle which has a higher thermal efficiency at a lower temperature than a Brayton cycle.

Moreover, when a regenerative cycle is employed, a pressure is higher than the Brayton cycle, but a maximum of the thermal efficiency of the gas turbine cycle shifts to a lower pressure ratio side so that it is possible to design the cycle.

In addition, in the regenerative cycle of the working medium in the gas turbine power generation system 100, the thermal efficiency value of the cycle is significantly dependent on a temperature efficiency of the regenerative heat exchanger 105. In particular, it is possible to achieve a high cycle thermal efficiency in which the temperature efficiency is higher than or equal to 0.95. Accordingly, a PCHE (Printed Circuit Heat Exchanger), which is a kind of heat exchanger, is preferably used as the regenerative heat exchanger. In the PCHE, the temperature efficiency, which is approximately 0.85 in a common heat exchanger due to an economical restriction, can increase to 0.95 or higher. Moreover, the PCHE can be a compact heat exchanger, effective for cost reduction, and highly pressure resistant. In addition, the PCHE, which has features of high heat transfer performance and a low pressure loss, may be used as the intermediate heat exchanger 108 or the regenerative heat exchanger 105 so as to achieve highly efficient heat transfer at low-cost. In particular, the higher, the temperature efficiency of the regenerative heat exchanger 105 is, the higher the cycle thermal efficiency is. The regenerative heat exchanger 105 with the temperature efficiency of 95% can surpass a conventional solar gas turbine (an open Brayton cycle). The temperature efficiency of the regenerative heat exchanger 105 is preferably 98%.

Either one of an axial-flow type and a centrifugal type may be used as the compressor (the low-pressure compressor 107 or the high-pressure compressor 109). However, in the axial-flow compressor, an adiabatic efficiency is high, but force which presses a wing is large since density of the working medium is high. Therefore, the axial-flow compressor might not be allowed in view of mechanical strength. On the other hand, the compressors (the low-pressure compressor 107 and the high-pressure compressor 109) which use the carbon dioxide as the working medium are operated in a range where a compressibility coefficient is small so that work of the compressors is small. Therefore, the adiabatic efficiency of the compressor only a little influences the cycle thermal efficiency. In view of above, the centrifugal compressor, which is robust in mechanical strength, is preferably used as the compressor.

Furthermore, an axial-flow turbine, which generates a large amount of work, is preferably used as the turbine 103.

Moreover, work required to drive the compressors (the low-pressure compressor 107 and the high-pressure compressor 109) of the gas turbine system is provided by a part of the expansion work of the working medium in the turbine 103. Therefore, a generated power output Q of the power generator 104 is calculated by subtraction of work $W_C$ of the compressors (the low-pressure compressor 107 and the high-pressure compressor 109) from expansion work $W_T$ in the turbine 103, as expressed by the following expression.

[Expression 12]

$$Q = W_T - W_C \quad (2)$$

In a case where the working medium is ideal gas, $W_C$ is as much as ⅔ of $W_T$.

Therefore, a smaller amount of $W_C$ increases the generated power output Q and improves the thermal efficiency.

Figure 26:
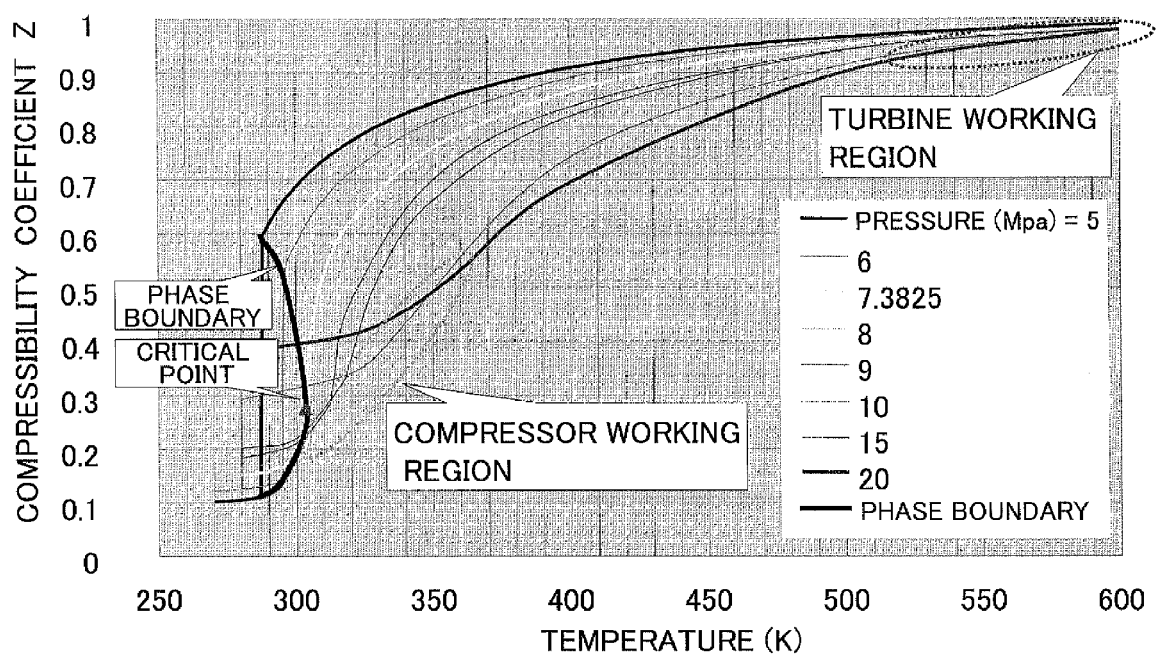
FIG. 26 is a diagram showing how a compressibility coefficient z of carbon dioxide is dependent on a temperature and a pressure.

Here, physical properties of the carbon dioxide near the critical state are discussed. First of all, FIG. 26 shows how a compressibility coefficient z of the carbon dioxide is dependent on a temperature and pressure. In FIG. 26, a triangular mark shows the critical point.

As shown in FIG. 26, there is a region where the value of the compressibility coefficient z is small near the normal temperature of 300K, while the value is asymptotic to 1, which is the value for ideal gas, near 500K. Therefore, there is a tendency that z is significantly dependent on the pressure near the normal temperature while z is only a little dependent on the pressure at a high temperature. By the way, supposing that the temperatures of the working medium in the inlets of the compressors (the low-pressure compressor 107 and the high-pressure compressor 109) is 35 degree (308K), the pressure of 9-10 MPa minimizes the value of z. Therefore, the pressure of the working medium in the compressor inlet can be selected near the range of the pressure of 9-10 MPa. On the other hand, the expansion work in the turbine 103 is better to be large. Therefore, a temperature of the working medium is set to 500K or higher in the inlet of the turbine 103. FIG. 26 shows preferable operating regions of the compressors (the low-pressure compressor 107 and the high-pressure compressor 109) and the turbine 103. It is understood that improvement of the efficiency of the gas turbine can be expected in consideration of the expression (1) and the expression (2). Here, a value inversely calculated from an optimal pressure ratio of the regenerative cycle and a pressure of the working medium in the inlet of the compressors (the low-pressure compressor 107 and the high-pressure compressor 109) is used as the pressure of the working medium in the inlet of the turbine 103. Thus, it is possible to form the cycle to optimize an inlet pressure and temperature conditions of the gas turbine component.

In FIG. 25, there is shown an example of provisional estimations of thermal balance in the gas turbine power generation system including the intermediate heat exchanger 108 and the regenerative heat exchanger 105. In other words, it is supposed that values shown in FIG. 25 are respectively a quantity of exchanged heat in the molten salt heat exchanger 102, temperatures of the working medium in the inlets of the low-pressure compressor 107 and the high-pressure compressor 109, and a temperature and pressure of the working medium in the inlet of the turbine 103. Then, an adiabatic efficiency of the compressor and the turbine 103 are respectively supposed to be fixed to 0.9 and 0.93. In addition, a temperature efficiency of the regenerative heat exchanger 105 is supposed to be fixed to 98%. Thus, the expansion ratio of the turbine is used as a parameter to calculate the thermal balance. In the example of provisional estimations, when input heat to the working medium from the molten salt heat exchanger 102 is 50 MW, a power output is 23.6 MW. Therefore, the cycle thermal efficiency is 47.2% so as to exceed a cycle efficiency (33%) of the Brayton cycle shown in FIG. 24 as well as an efficiency (39%) of a conventional steam turbine.

Figure 27:
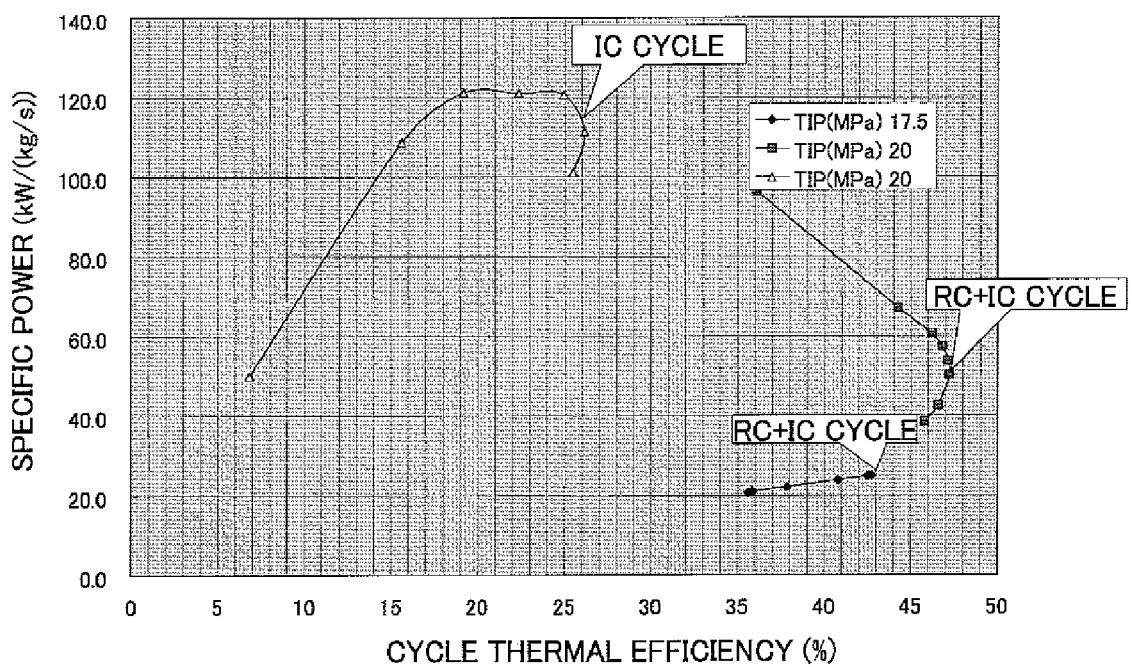
FIG. 27 is a diagram showing relationship of specific power-cycle thermal efficiency between the gas turbine power generation system shown in FIG. 25 which includes a regenerative heat exchanger and an intermediate heat exchanger 108, and a gas turbine power generation system which has no regenerative cycle.

Moreover, FIG. 27 is a diagram showing a relationship of specific power-cycle thermal efficiency in the gas turbine power generation system (RC+IC cycle in FIG. 27) which is shown in FIG. 25 including the regenerative heat exchanger and the intermediate heat exchanger 108 and the gas turbine power generation system (IC cycle in FIG. 27) which does not include the regenerative cycle, under a condition where the temperature of the working fluid in the inlet of the turbine is 800K (527° C.). As shown in FIG. 27, in the gas turbine power generation system (IC cycle in FIG. 27) which does not include the regenerative cycle, when the expansion coefficient of the turbine 103 is 20, the thermal efficiency is maximized (26%), and the specific power is also large. However, when the working medium is the carbon dioxide, such a large expansion coefficient makes a pressure of the system so high that it is difficult to realize the system. On the contrary, it is understood that the cycle thermal efficiency is improved and increased to 47% at the maximum in the gas turbine power generation system (RC+IC cycle in FIG. 27) which includes the regenerative heat exchanger 105. Thus, in the regenerative cycle, even when the temperature in the inlet of the turbine is lower than the open Brayton cycle shown in FIG. 24, it is possible to achieve a high cycle thermal efficiency. FIG. 25 referred above shows the heat balance diagram under the optimal conditions.

Figure 28:
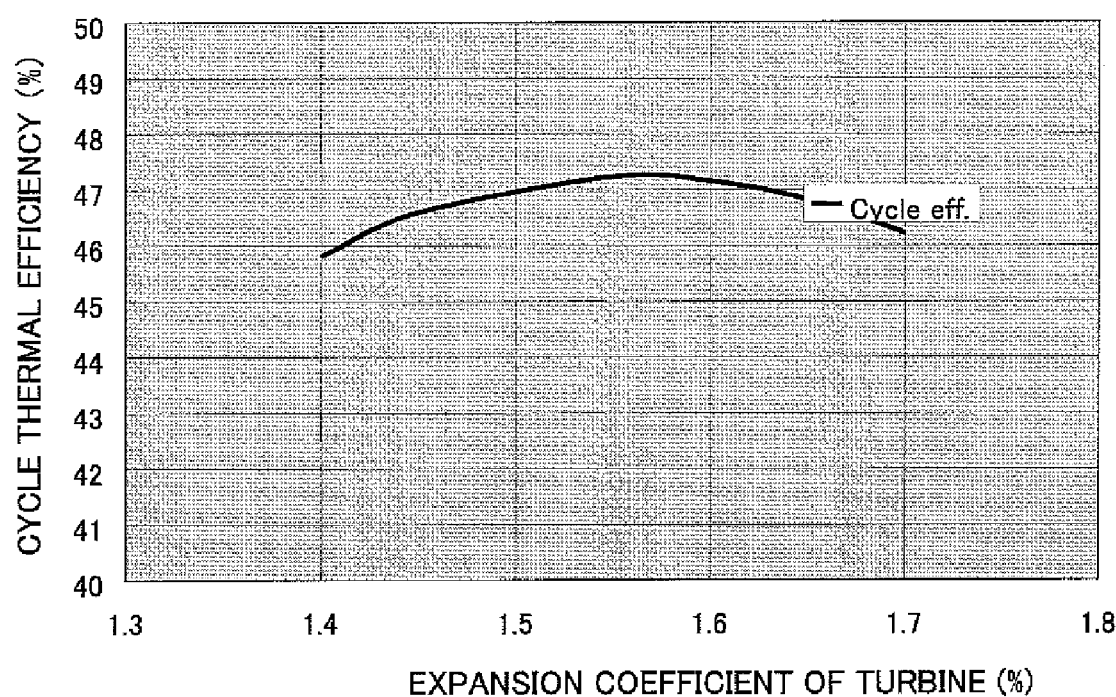
FIG. 28 is a diagram showing how the cycle thermal efficiency is dependent on an expansion ratio.

Next, FIG. 28 shows how the cycle thermal efficiency is dependent on an expansion ratio. As shown in FIG. 28, the expansion coefficient which maximizes the thermal efficiency is 1.55. Therefore, it is enough possible to produce a turbine with such an expansion coefficient. However, the specific power decreases to about 50% of the IC cycle. Therefore, the gas turbine power generation system is appropriate for a gas turbine whose generated power output is small or medium scale and preferably applied for solar utilization. It is understood that the pressure of the working medium in the inlet of the turbine 103 is optimized near 20 MPa.

Figure 29:
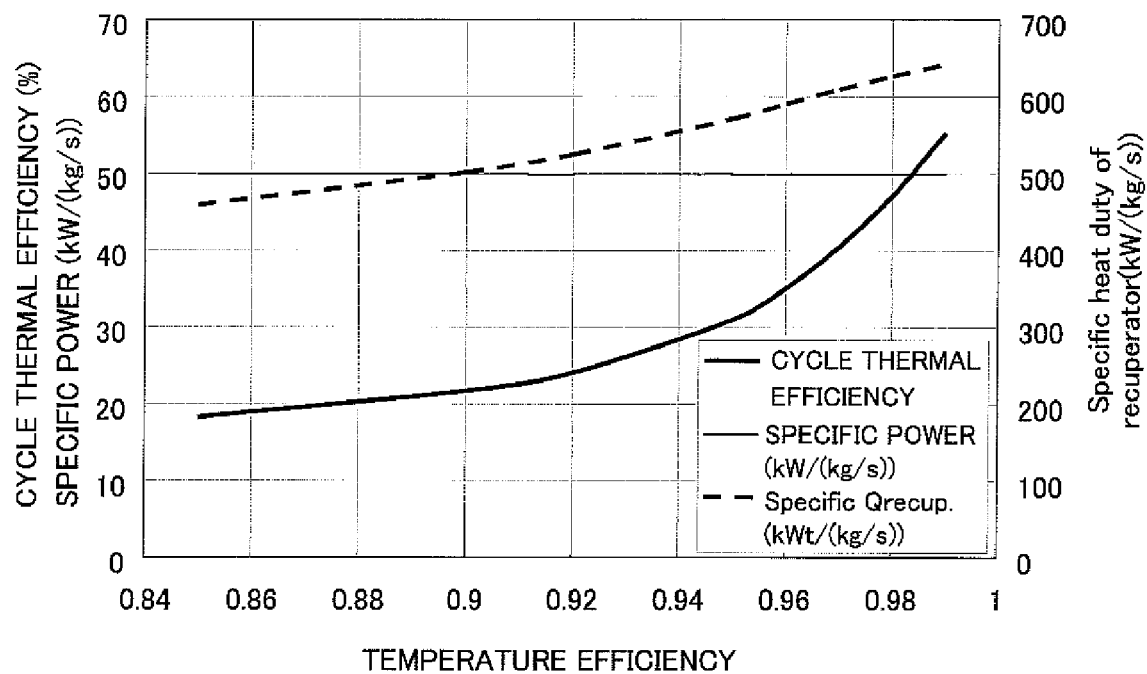
FIG. 29 is a diagram showing how an efficiency of the regenerative heat exchanger influences the cycle thermal efficiency.

FIG. 29 is a diagram showing how the temperature efficiency of the regenerative heat exchanger influences the cycle thermal efficiency. Here, Specific heat duty of recuperator beside the right ordinate axis in FIG. 29 and Specific Qrecup in the diagram indicates specific heat load of the regenerative heat exchanger. When the specific heat load is large, the regenerative heat exchanger can be small to achieve a required heat exchange.

As shown in FIG. 29, it is understood that when temperature efficiency of a usual heat exchanger is approximately 85%, the cycle thermal efficiency is only about 20%, but when the temperature efficiency is approximately 98%, the cycle thermal efficiency is 47%. In particular, when the temperature efficiency is 95% or more, sensitivity is large. Accordingly, it is understood that the gas turbine power generation system can realize the features of the gas turbine power generation system (RC+IC cycle in FIG. 27) which includes the regenerative heat exchanger 105, in combination with a highly efficient regenerative heat exchanger.

Thus, the PCHE (Printed Circuit Heat Exchanger) which is excellent in pressure and heat resistance is most appropriate in consideration of temperature and pressure ranges of the working fluid. In the case shown in FIG. 26, a total capacity of a shell-and-tube heat exchanger is 125 m$^3$, while a total capacity of a PCHE is 10 m$^3$, that is, $1/12$ of the shell-and-tube heat exchanger. Therefore, the PCHE is advantageous in both sides of a space for installing equipments and cost. As for the PCHE, flow paths with a hydraulic diameter of approximately 0.6 mm are cut by an etching process on a metallic plate with a thickness of 1 mm. Then, a lot of the metallic plates are diffusion-bonded so that high-temperature side flow paths and low-temperature side flow paths are alternately stacked. The PCHE is thus formed heat exchanger. The PCHE has high heat and pressure resistance, and is preferably used in a supercritical $CO_2$ gas turbine cycle system which operates in a high temperature and pressure.

Therefore, in the gas turbine power generation system 100, the thermal energy of the sunlight which is stored in the molten salt is once stored in the heat storage medium in the solar heat collector 101. Then, a part of the thermal energy is supplied to a gas turbine power plant to continuously generate power for 24 hours. Moreover, the gas turbine cycle is a regenerative cycle which includes the intermediate heat exchanger 108 and uses the carbon dioxide in the supercritical state as the working medium. As a result, the system can operate within an operating temperature range (a middle temperature) of the heat storage medium to obtain a higher power generation efficiency than that of the Rankine cycle. The gas turbine solar thermal power generation system with such features can construct a power generation system which is competitive against existing power supplies which generate no carbon dioxide.

Figure 30:
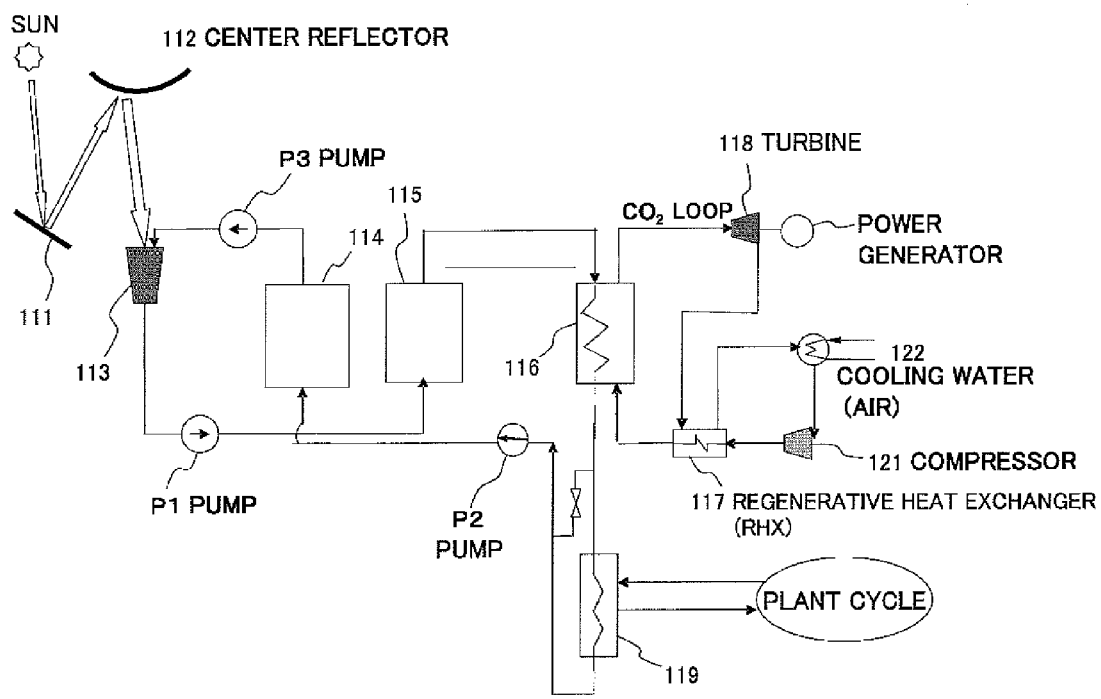
FIG. 30 is a schematic diagram showing a concrete example of a solar energy multiple utilization system.

Next, FIG. 30 shows a concrete example of a solar energy multiple utilization system which combines a gas turbine power generation system with a chemical plant.

In the solar energy multiple utilization system 110 shown in FIG. 30, a heliostat 111 reflects sunlight energy. And, a center reflector 112 collects the reflected sunlight. Then, a solar heat collector 113 receives the collected sunlight. After that, thermal energy of the received sunlight is stored in molten salt, and energy is supplied to the gas turbine power generation system and the chemical plant. Thus, the solar energy multiple utilization system performs power generation and chemical processes. By the way, FIG. 30 shows a system including the center reflector 112. However, in a case where there is no center reflector, a tower-up method, in which the solar heat collector is located in a high place, may be employed instead.

In the solar energy multiple utilization system 110, heat storage material such as the molten salt is supplied from a low-temperature heat storage container 114 to a solar heat collector 113 by a pump P3. After that, the heat storage material absorbs the thermal energy of the sunlight received by the solar heat collector 113 so as to have high temperature and then is supplied and stored in a high-temperature heat storage container 115 by a pump P1. Moreover, the heat storage material with the high temperature is supplied to a first heat storage material heat exchanger 116 and supplies thermal energy to carbon dioxide which has collected waste heat of exhaust gas from a turbine 118 through a regenerative heat exchanger 117. In addition, in a second heat storage material heat exchanger 119, the heat storage material supplies the thermal energy to a chemical plant cycle which supplies heat to a chemical process, seawater desalination, or the like. After that, the heat storage material with a predetermined temperature returns to the low-temperature heat storage container 114.

The carbon dioxide heated in the first heat storage material heat exchanger 116 performs expansion work in the turbine 118. Then, the power generator 120 converts a part of or almost all of the expansion work into electric energy. In the regenerative heat exchanger 117, the exhaust gas (the working fluid) which has finished the expansion work in the turbine 118 supplies a part of the thermal energy to the working medium compressed by a compressor 121. After that, the exhaust gas is cooled to a predetermined temperature in a cooler 122, and introduced into the compressor 121. The working medium, which is compressed by the compressor 121 and heated by the regenerative heat exchanger 117, is introduced into the first heat storage material heat exchanger 116, and heated by the solar thermal energy so that a gas turbine power generation cycle comes back around. In the power generation cycle, the compressor 121 is preferred to be an intercooling (IC) cycle including the low-pressure compressor 107, the intermediate heat exchanger 108, and the high-pressure compressor 109 shown in FIG. 25 in order to improve specific power. Or, a part of the working medium cooled by the cooler may be branched to a third compressor. Then, compressed working medium may be introduced to the regenerative heat exchanger. In the solar energy multiple utilization system 110, the thermal energy supplied from the high-temperature heat storage container 115 to the first heat storage material heat exchanger 116 is controlled to supply a predetermined quantity of thermal energy to the first heat storage material heat exchanger 116 for 24 hours. Therefore, power can be generated to output constant power even during a nighttime. The fossil fuel is combusted to heat the working medium (the carbon dioxide) in the first heat storage material heat exchanger 116 to auxially supply heat. Concrete examples of the chemical plant include a plant which heats and vaporizes CMM (slurry) in a coal gasification process, or seawater desalination which generates steam with heat. The thermal energy can be used as a heat source for these chemical plants. Moreover, when temperature of steam is high, a Rankine cycle can be constructed as a power generation system.

In these gas turbine power generation systems and solar energy multiple utilization systems, the heat storage medium is preferably alkali nitrate (for instance, equimol solution of $NaNO_3$ and $KNO_3$) at an operating temperature of 600° C. or lower. Moreover, metallic sodium may be used as the heat storage medium at an operating temperature of 600° C. or higher. A melting point and boiling point of the metallic sodium are, respectively, approximately 80° C. and 850° C. so as to remain liquid in a wide temperature range. In addition, thermal conductivity of the metallic sodium is extremely high. Therefore, the metallic sodium is appropriate for the heat transfer medium. Moreover, the metallic sodium can be used at a higher temperature than the molten salt. Accordingly, there is a feature that cycle thermal efficiency of the gas turbine cycle is higher comparing with a case of using molten salt nitrate. Furthermore, chemical reaction of the metallic sodium with carbon dioxide occurs slowly. Thus, even if the sodium directly contact with the carbon dioxide, no explosion occurs or no high heat is generated so that the metallic sodium is safe.

EXAMPLES

Next, examples of the invention will be shown to describe the present invention more specifically. However, the present invention is not limited to these examples.

Example 1

Figure 31:
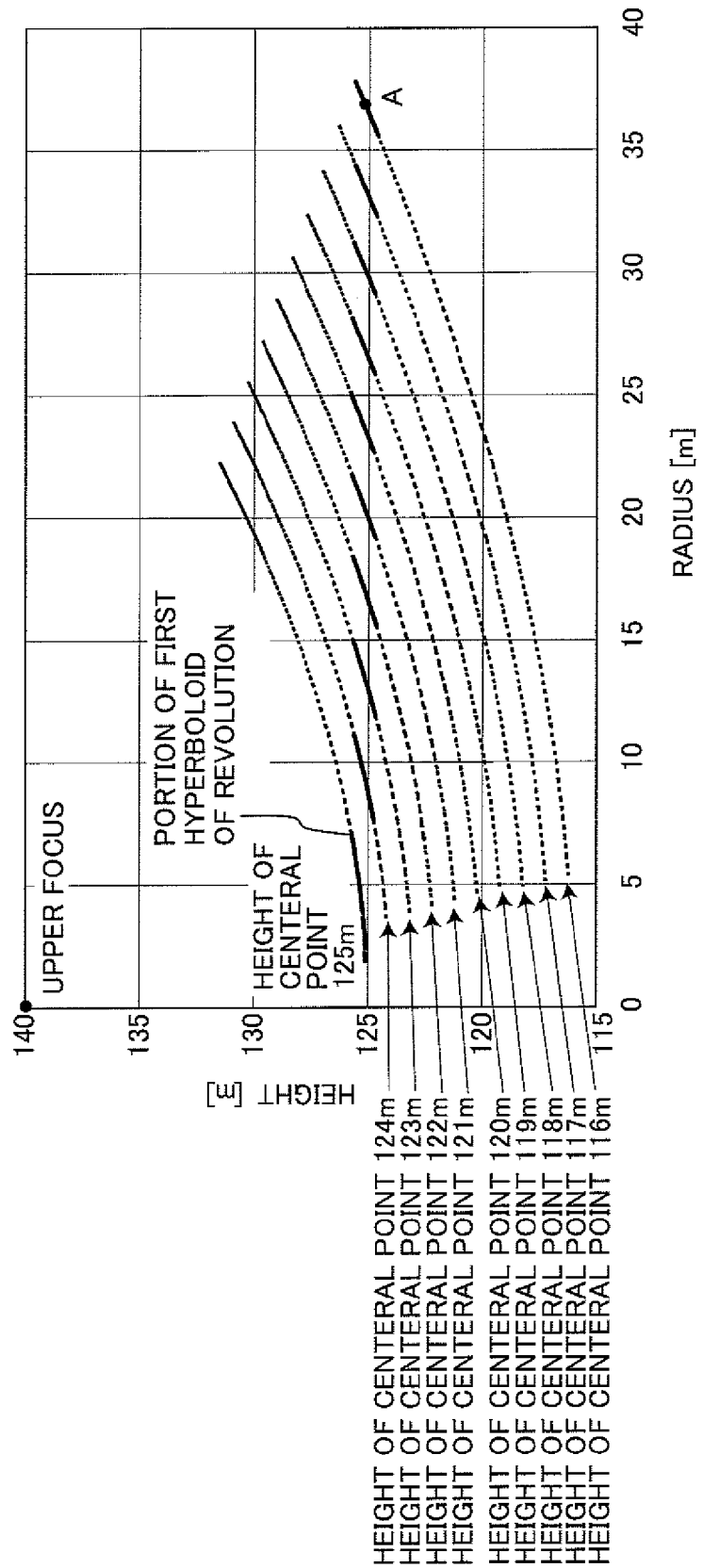
FIG. 31 is a diagram illustrating a structure example of a reflector group in a sunlight collecting reflector of the invention.

Table 1, shows main parameters in a commercial-scale light collecting system (for a practical use) for solar energy utilization and a light collecting system (for an experiment) which performs a demonstration test of commercial-scale solar energy utilization. Moreover, FIG. 31 shows hyperboloids of revolution (as shown by a dashed line in a diagram) and a structure example of reflector segments which are arranged along the hyperboloids of revolution in the light collecting system for a practical use.
[Table 1]

TABLE 1

PARAMETERS USED FOR CALCULATION IN LIGHT COLLECTING SYSTEM

|  |  | EXPERIMENT | PRACTICAL USE |
|---|---|---|---|
| HELIOSTAT | SHAPE | SQUARE | |
|  | SIZE | 0.63 m × 0.63 m | |
|  | NUMBER OF SEGMENTS | 36 | |
|  | CIRCUMFERENCE | 4.8 m | |
|  | NUMBER | 2,011 | 18,600 |
| REFLECTOR SEGMENT | SHAPE | HYPERBOLOID OF REVOLUTION | HYPERBOLOID OF REVOLUTION |
|  | HEIGHT OF UPPER FOCUS (LIGHT COLLECTING POINT) FROM THE GROUND | 45 m | 140 m |
|  | HEIGHT OF LOWER FOCUS (LIGHT COLLECTING SURFACE) FROM THE GROUND | 10 m | 25 m |
| PLACE FOR INSTALLING HELIOSTATS (CIRCLE) | OUTER DIAMETER | 123 m | 370 m |
|  | INTERNAL DIAMETER | 18 m | 25 m |
| HEAT OUTPUT |  | 10.9 MW | 100 MW |

There are an unlimited number of hyperboloids of revolution which meet a condition that heights of an upper focus and a lower focus are respectively 140 m and 25 m. Here, as shown in FIG. 31, there was examined a case where a reflector is formed by portions (portions indicated by a heavy line) of ten hyperboloids of revolution whose center point heights are from 116 m to 125 m with intervals of 1 m.

In a hyperboloid of revolution at 116 m in height, the most outside (right) portion is used. Here, point A is a point irradiated on the hyperboloid of revolution by a light beam which comes from the center of the sun and is reflected on the center of the fifth heliostat (a serial number 67: see an abscissa axis in FIG. 32) from the outside.

Figure 32:
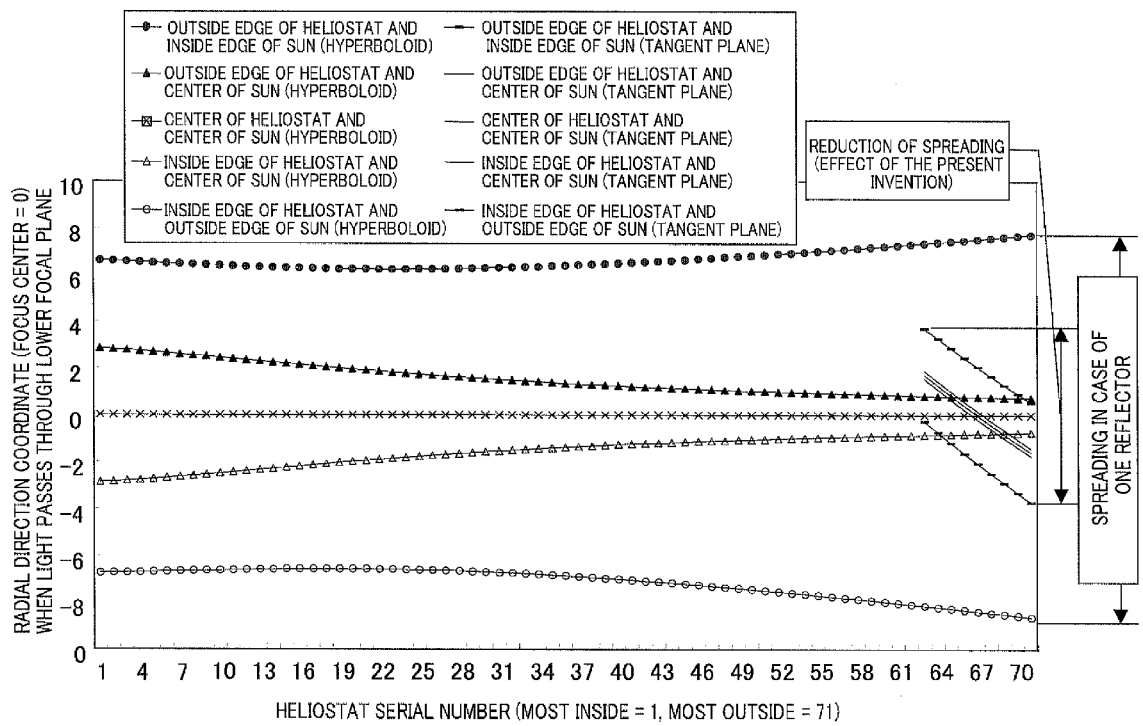
FIG. 32 is a diagram showing how light spreads on a light collecting surface.

Next, in the structure of the reflector group, there will be considered a curved surface (the shape is a truncated cone) which is formed by revolution of a tangent of the hyperboloid of revolution at the point A about a center line CL. The center line CL connects a light collecting point with a center of the light collecting surface. FIG. 32 shows radial direction coordinates when light beams from the heliostats with serial numbers 63-71 (see the abscissa axis in FIG. 32) are reflected on the truncated cone surface and pass through the lower focal plane (the light collecting surface).

"OUTSIDE EDGE OF HELIOSTAT-INSIDE EDGE OF SUN" in FIG. 32 means sunlight which is reflected by an outside edge of a heliostat. The sunlight in this case shifts most outside from the center. On the contrary, a light beam in a case of "INSIDE EDGE OF HELIOSTAT-OUTSIDE EDGE OF SUN" shifts most inside.

As shown in FIG. 32, in a second reflector including a reflector group constituted of a plurality of reflector segments, spreading of light on the light collecting surface is smaller comparing with a second reflector including one reflector formed along a hyperboloid of revolution. The second reflector segment reflects sunlight collected by heliostats (first reflectors) and makes the reflected sunlight converge on the light collecting surface.

Figure 33:
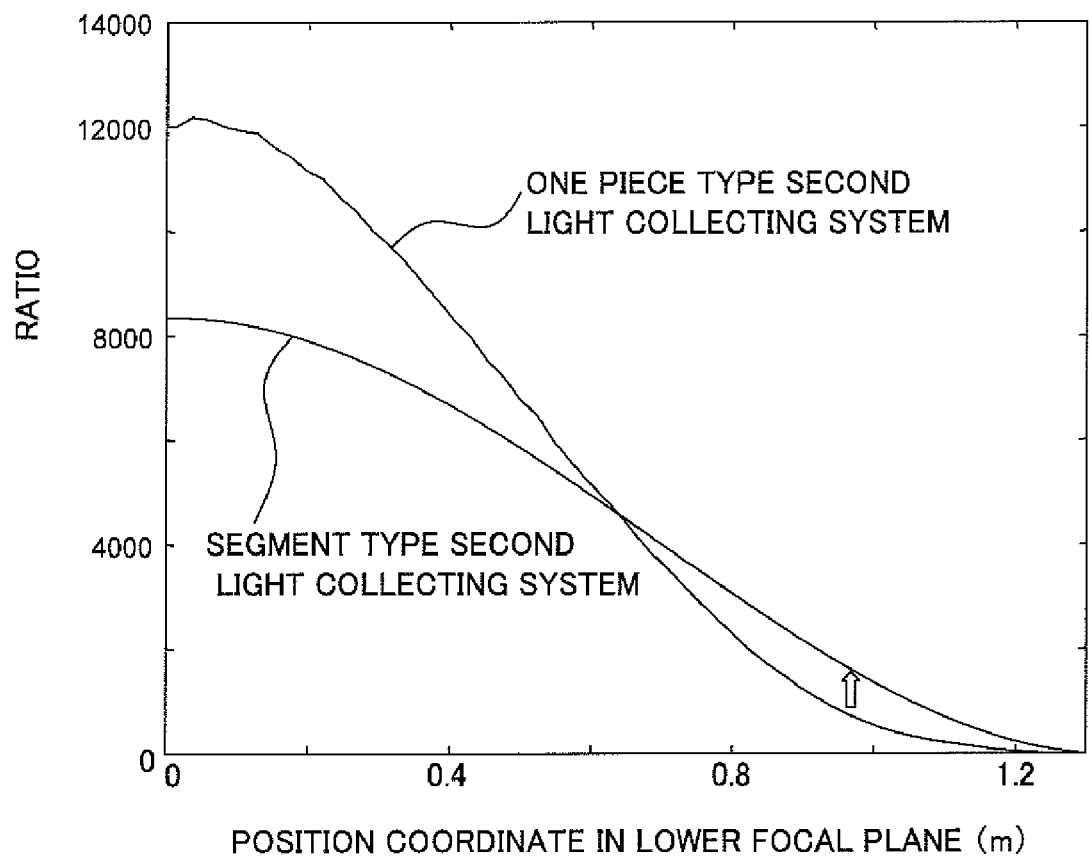
FIG. 33 is a diagram showing that distribution of heat fluxes becomes flat when a plurality of reflector segments are used.

FIG. 33 shows radial distribution of heat fluxes on the light collecting surface in a case of using a sunlight collecting reflector according to the invention in comparison with a conventional case. As shown in FIG. 33, in the radial distribution of the heat fluxes on the light collecting surface, a light collecting power in a case of using the sunlight collecting reflector according to the invention comparatively decreases in the center. On the other hand, the light collecting power comparatively increases on the periphery (a region where a position coordinate in a lower focal plane is large: a portion from the center of the light collecting surface to the outside). The equalized heat fluxes shown in the distribution are preferably used as energy of a reforming reactor and the like. The distribution has a feature of heat fluxes to realize a spatially equal distribution of temperatures.

Example 2

Figure 34:
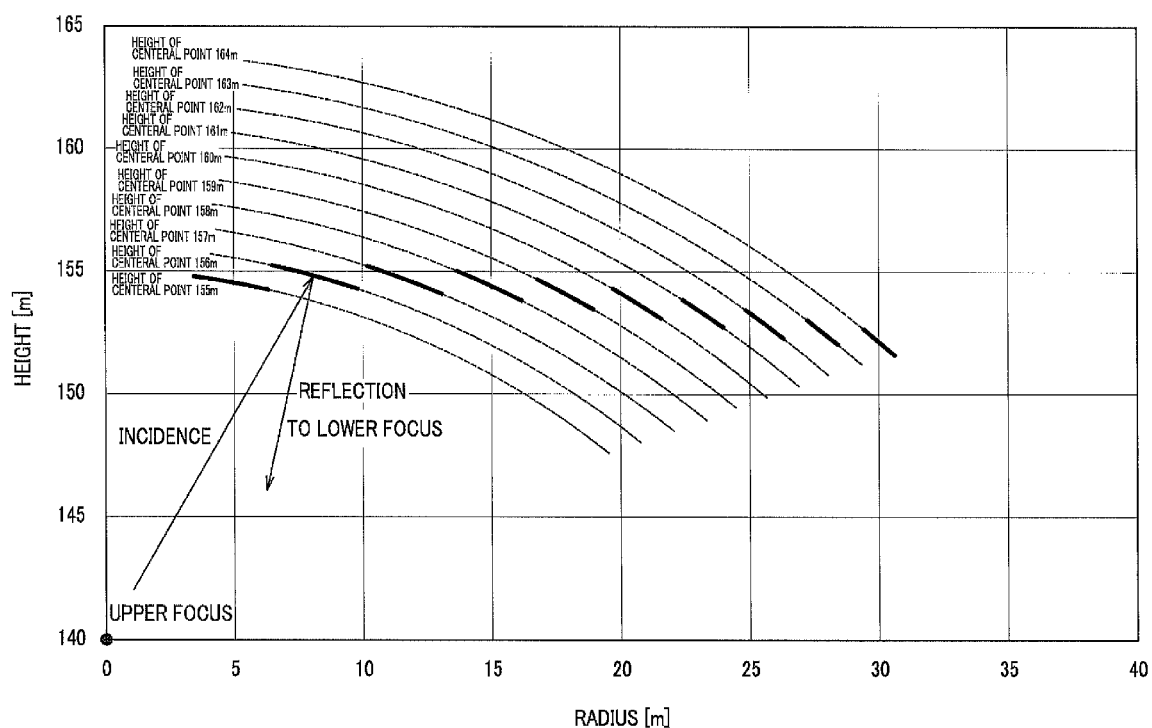
FIG. 34 is a diagram showing an example of a reflector group in which each of reflector segments includes a spheroidal surface.

FIG. 34 shows a structure example of a reflector group including reflector segments formed along ellipsoids of revolution which meet a condition that heights of an upper focus and a lower focus are respectively 140 m and 25 m. The reflector group shown in FIG. 34 shows an example where portions (portions indicated by heavy lines) of ten ellipsoids of revolution are respectively used to form the reflector segments. The ten ellipsoids of revolution whose central point heights are from 164 m to 155 m with intervals of 1 m have different curvature radiuses.

In the sunlight collecting reflector including the reflector group, sunlight collected by heliostats to the upper focus of the ellipsoids of revolution is reflected by the reflector segments. Then, the reflected sunlight converges on the lower focus (the light collecting surface) of the ellipsoids of revolution to spread to an extent (spreading of light shown in FIG. 32) similar to the example 1.

Next, there will be considered a case where a tower with a height H=120 m is placed in a center of one square kilometer of plain for a sunlight collecting system. Moreover, light is collected to a heat collector on a top of the tower from the first heliostats arranged around the single tower. Here, when a sun elevation is supposed to be 45 degrees, energy which directly reaches the area from the sun is about 700 MW.

Example 3

Figure 35:
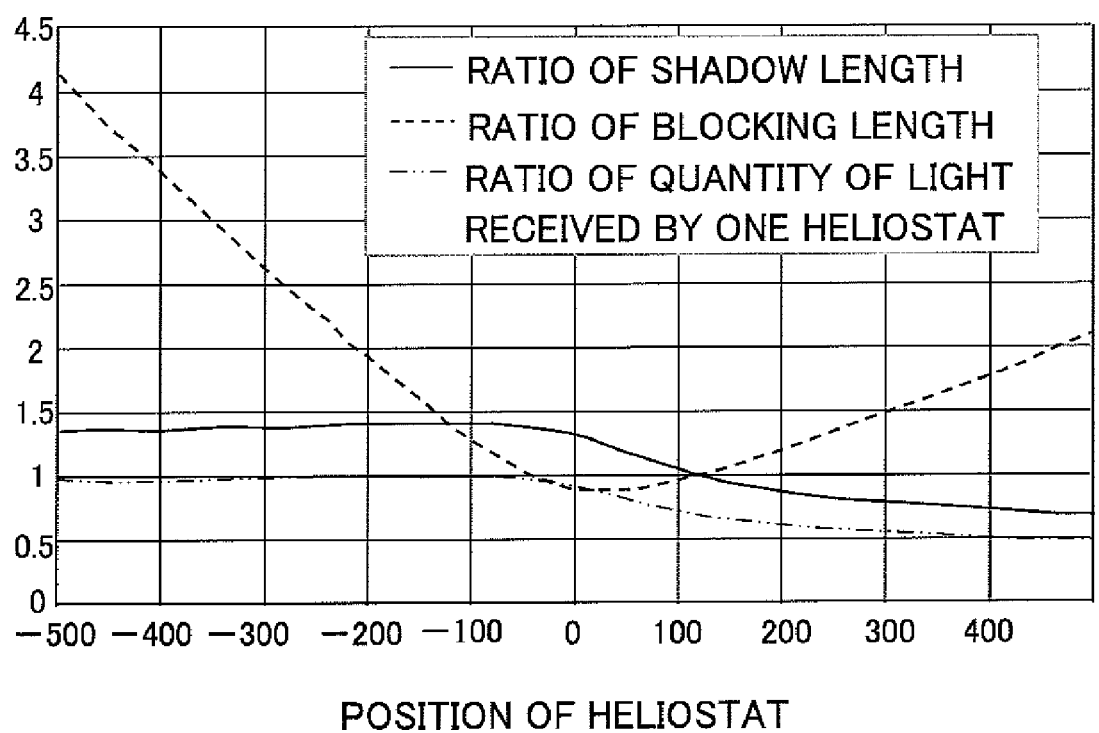
FIG. 35 is a diagram showing distribution of various parameters in the north-south direction when light is collected from a lot of first heliostats arranged around a tower (a light collecting point) to a heat collector placed on the top of the tower in a sunlight collecting system.

FIG. 35 shows results of obtaining distribution of various parameters in the north-south direction including the tower when a coordinate origin (0, 0) is positioned at the tower. Here, the heliostats are most densely arranged within a range where no light interference occurs between each other (to avoid blocking and shadows).

In FIG. 35, the abscissa axis represents a position of the first heliostat in the north-south direction. Meanwhile the ordinate axis represents a shadow and blocking lengths using a ratio with respect to a size of the first heliostat and a quantity of received light using a ratio with respect to a quantity of collected light $p_{max}$ in a case where the first heliostat faces the sun.

From the results shown in FIG. 35, the quantity of received light and a shadow and blocking lengths of the first heliostat are all prominent on the north side of the tower. Moreover, it is understood that the shadow length is longer in a range expressed by the following expression while the blocking length is longer in the rest of the range.

$$|y| < H/\tan(\phi) = 120/\tan(45) = 120 \quad \text{[Expression 13]}$$

An interval between the arranged first heliostats is determined in accordance with a longer one between the shadow length and the blocking length. Therefore, in consideration of the results shown in FIG. 35, to most densely arrange the heliostats with avoiding light interference, the first heliostats whose quantities of received light are large are sparsely arranged on the north side while the first heliostats whose quantities of received light are small are densely arranged on the south side. The quantity of received light of the heliostat is large on the north side and small on the south side. Accordingly, in a case of one tower, it is advantageous that a position of the tower shifts to the south from the field center in order to obtain a maximum quantity of received light with a minimum number of heliostats.

Moreover, the blocking length at a position 4H on the north side is four times of the length of the first heliostat. Thus, it is understood that in the blocking length, a length of a portion where the ground is bright is as long as 2.6H (a difference obtained by subtraction of the shadow length from the blocking length).

Figure 36:
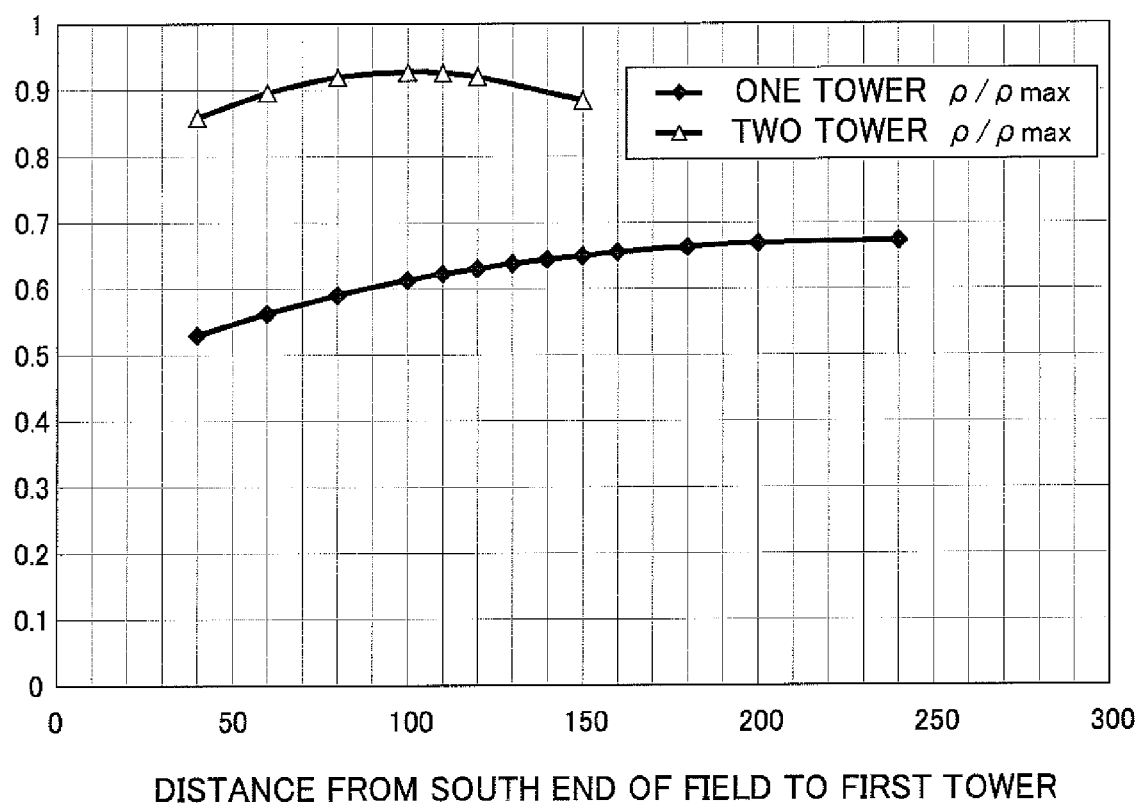
FIG. 36 is a diagram showing field mean values of light collection densities (quantities of light which can be collected per unit length in the north-south direction) when a position of the tower is variable in a case where the invention is applied to a sunlight collecting system with two towers (light collecting points).

Next, FIG. 36 shows field mean values of light collection densities (quantities of light which can be collected per field unit length in the north-south direction) using ratios with respect to theoretical values in a case where the invention is applied to a sunlight collecting system with two towers (light collecting points). Here, a height of the tower (the light collecting point) is H=60 m, a length of the field in the north-south direction is 8H=480 m, and a field center is located at a position of 240 m from the south end. This is a ½ scale of the light collecting system shown in FIG. 35. The abscissa axis in FIG. 36 shows coordinates of the tower on the south side.

In the light collecting system, the tower on the north side is located at a position which is point-symmetric with the tower on the south side about the origin (the field center).

As shown in FIG. 36, it is understood that comparing with a case of one tower (light collecting point), field efficiency of the light collecting system with two towers to which the invention is applied is obviously higher and maximized near a position 2H from the south end.

At the position, it is understood that the efficiency is improved to 1.5 times comparing with the case of the conventional light collecting system with one light collecting point.

In view of geometrical similarity relationship, it is considered that the same results are derived at positions in the north-south direction whose coordinates are the same ratios with respect to the height of the tower. Then, the above-mentioned results are extended to show that an optimal position is located near 2H=240 m in the field of H=120 m in a field whose length in the north-south direction is 960 m (an example mode shown in FIG. 35).

Figure 37:
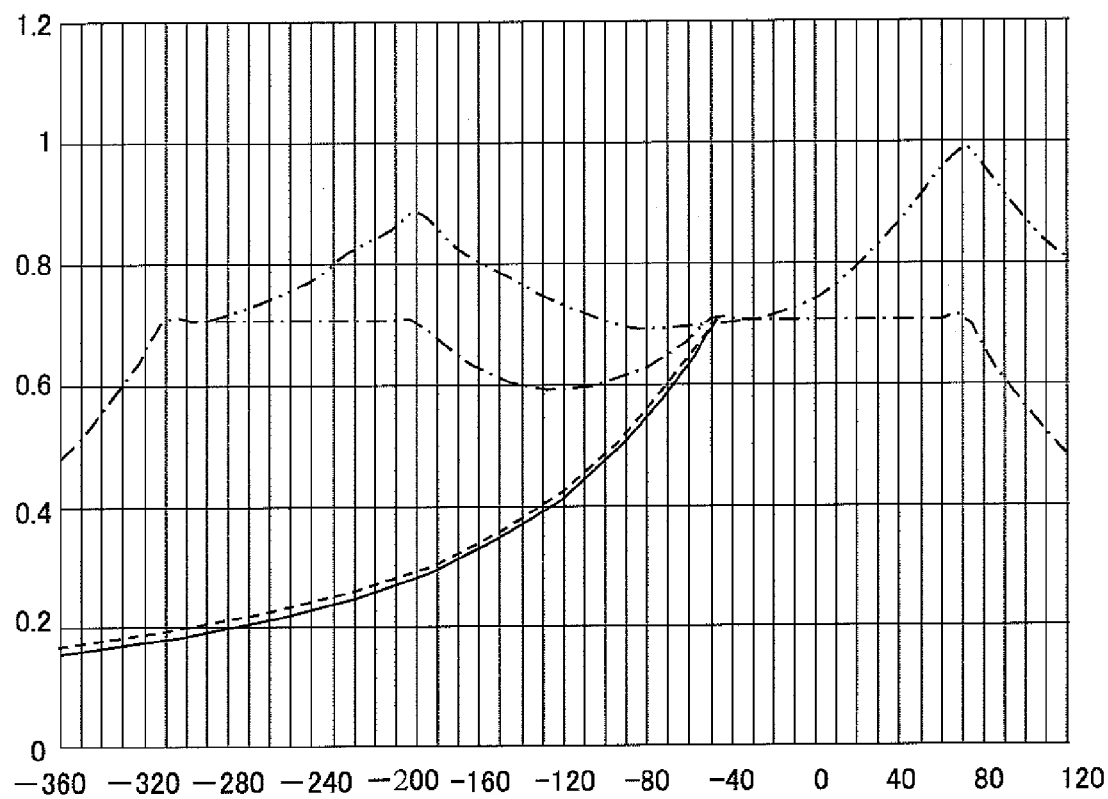
FIG. 37 is a diagram showing results of calculating various parameters at an optimal light collecting point in a light collecting system of the invention, which has two light collecting points (towers).

FIG. 37 shows results of calculating light collection densities, number densities of south-facing heliostats (the first heliostats), total number densities of the first heliostats and the second heliostats, and total light collection densities, as parameters at the optimal position of the tower. The second heliostats are mixed and arranged with the first heliostats in a region where abscissa axis <−50 m. Moreover, the number of the second heliostats corresponds to a difference between ordinate values of a dashed line (a number density of the south-facing heliostats (the first heliostats)) and an alternate long and two short dashes line (a total number density of the first heliostats and the second heliostats).

As shown in FIG. 37, it is understood that a theoretical light collection density=0.707 in a case where the sun elevation is 45 degrees can be realized in a region (50% of the entire) within 60 m from each of the towers at the center.

Figure 38:
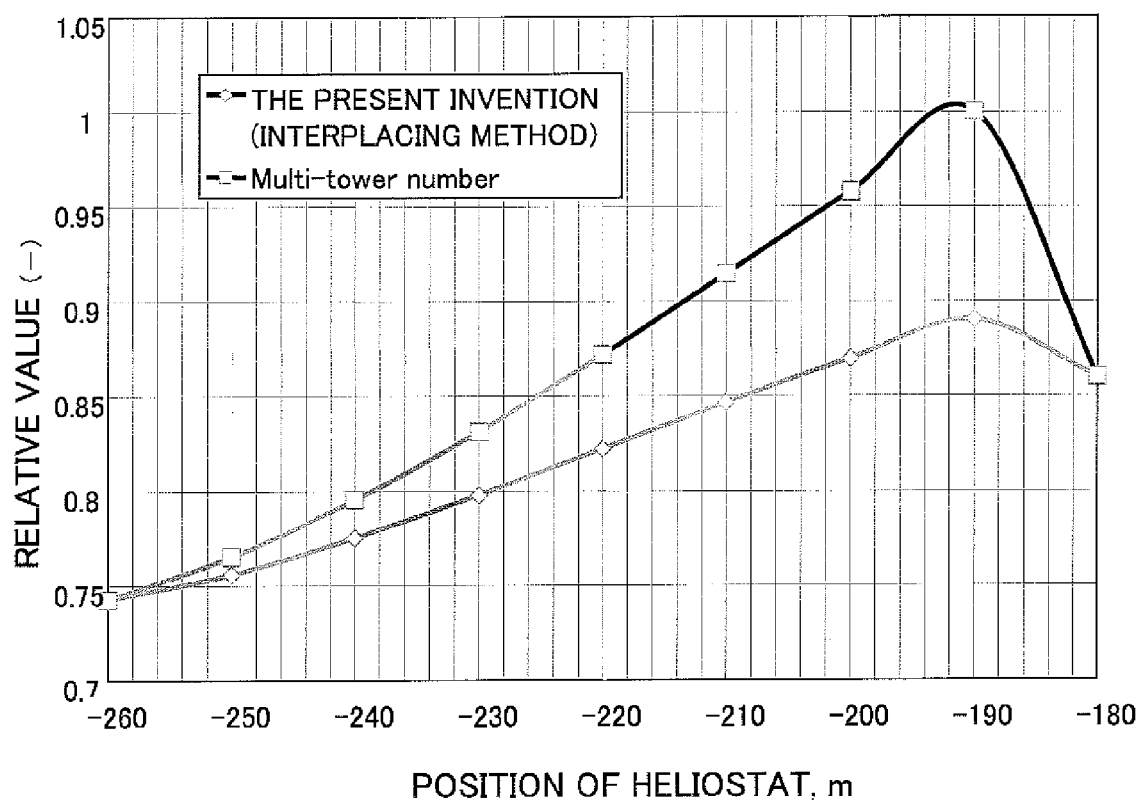
FIG. 38 is a diagram showing that the number of heliostats necessary to obtain the same light quantity in a light collecting system of the invention is smaller as for the light collecting system which has two light collecting points (towers).

FIG. 38 shows comparison of numbers of required heliostats in a region (−260<y<−180) where a theoretical light collection density is realized in a case of a light collecting system which collects light to the tower (the second tower) on the north side without interplacing heliostats and a case of the light collecting system of the invention (where the first heliostats and the second heliostats are mixed and arranged). It is obviously understood that the number of installed heliostats is smaller in the case of the invention. In other words, there is an advantage that the number of heliostats required to obtain a required quantity of collected light can be small in a method of the invention where the heliostats are interplaced. In this case, it is understood that the number of heliostats decreases by 5%.

Optimal Arrangement of Heliostats

Next, there will be discussed arrangement of heliostats on a line where the sun and the tower are seen in the same direction.

Figure 39:
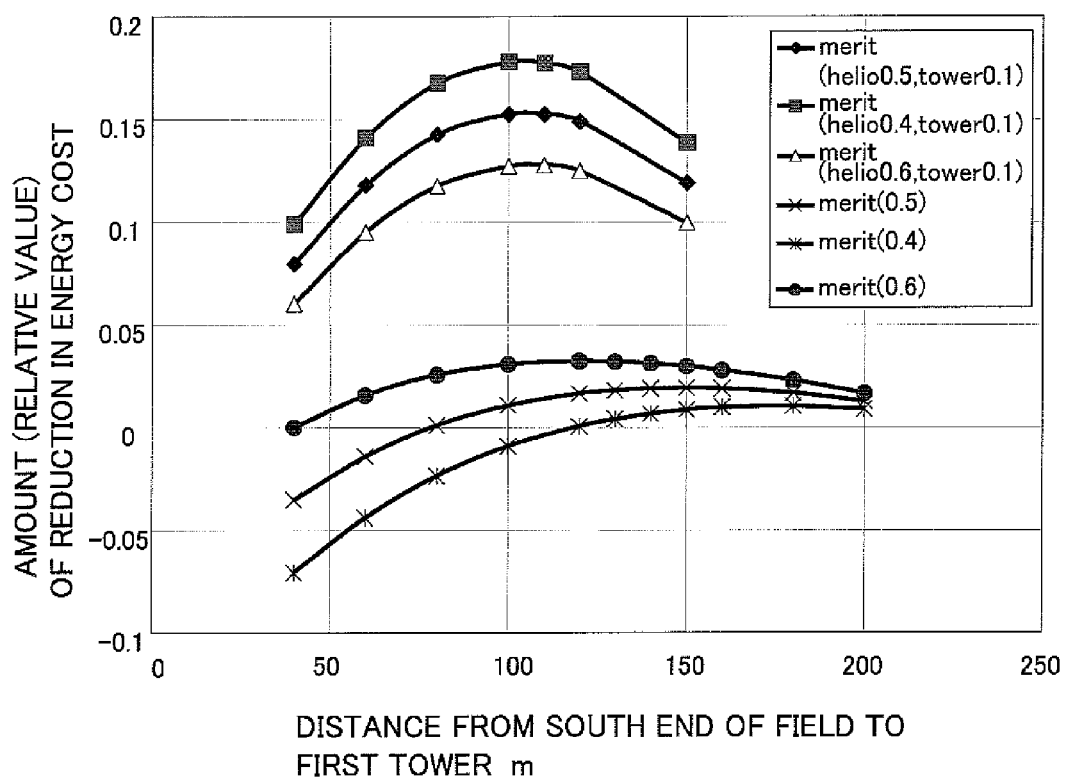
FIG. 39 is a diagram showing results of calculating an optimal arrangement of heliostats in a case where sun elevation is 45 degrees.
Figure 40:
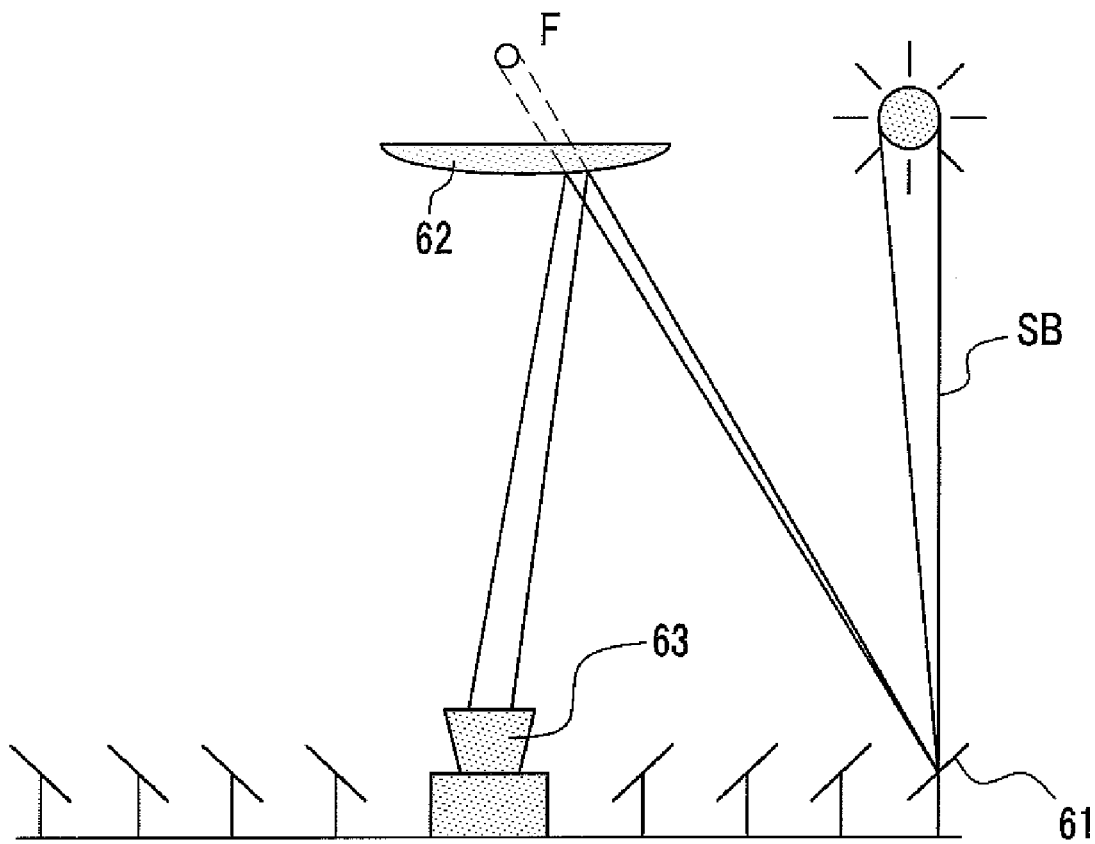
FIG. 40 is a schematic diagram showing an example of a conventional beam-down sunlight collecting system.

First of all, supposing that a height of the tower is 60 m, in consideration of light collection in a region of 480 m in radius around the tower as the center, relative merits are calculated. Here, a parameter is a ratio of a heliostat related cost with respect to an equipment cost. FIG. 39 shows calculation results in a case where a sun elevation is 45 degrees. The merit is calculated with respect to a value in a reference case where one tower is located in the center of the region.

As shown in FIG. 39, in the case of one tower, it is understood that when equipment cost ratios of the heliostats with respect to the entire construction cost are 0.6, 0.5, and 0.4 and the tower is located at optimal positions 120 m, 150 m, and 180 m respectively from the south end, the merits are maximized. In general, in a case where the sun elevation is 45 degrees, the optimal positions can be expressed by 2H, 2.5H, and 3H where the height of the tower is H.

The reason is because in the northern hemisphere, the quantity of collected light by the heliostats tends to be large on the north side of the tower while the number per unit area (the number density) of the second heliostats which can be arranged with avoiding light interference (shadow and interference of reflected light) with adjacent heliostats tends to be large on the south side. However, in the light collecting system with one tower, the merit after optimization is about 2% at most comparing with the case where the one tower is located at the field center when the equipment cost ratio of the heliostats is 0.5. Moreover, a vast land is required to obtain the required quantity of collected light. Therefore, a length of a light path from the heliostat to the tower (the light collecting point) becomes long. As a result, there is a negative effect that light spreads (dilution) on a focal plane so that a receiver needs to be large.

On the other hand, as shown in FIG. 17, there will be discussed a case where second heliostats are interplaced in a light collecting system with two light collecting points (towers).

In the light collecting system, on the north side of the tower, an interval between the arranged first heliostats is determined in accordance with a shadow length in a case of L>H or interference (a blocking length) in a case of L<H. In a region where the blocking occurs, there is a place where sunlight irradiates the ground so that field efficiency decreases. In the place, the second heliostats which face the north are arranged to collect light to the second tower. As for the second heliostats, since light paths are directed in the opposite direction and a distance to the tower is short, only a little light interference occurs. As a result, the second heliostats can be efficiently arranged.

Moreover, in a case of L=H, since the interval between the second heliostats is also determined in accordance with a shadow, there is no more irradiated ground, and the field efficiency becomes 100%. Hereafter, this arrangement is referred to as complete covering (see FIG. 22). Two towers are arranged away from both of the north and south ends respectively by the same distance which is a variable. A parameter is an equipment cost ratio of the heliostats. Moreover, an equipment cost ratio of the towers is assumed to be 10%/tower. In this case, optimal positions of the towers where a merit is maximized are located at approximately L=100–110 m=1.7–1.8H away from the north and south ends. Therefore, the towers (light collecting points) are located a little nearer to the ends comparing with the case of one tower. Moreover, it is understood that the optimal position is only a little dependent on the equipment cost ratio of the heliostats. Comparing with the reference case, a quantity of collected light increases by 38% (benefit increases), the number of the heliostats increases by 25%, and the number of the towers increases by one (cost increases). As a result, comparing with the case where one tower is placed in the field center, the merit is improved to as much as 15.5% (=38−0.5*25−10) when a ratio of equipment cost of all heliostats with respect to an entire equipment cost, that is, an equipment cost ratio of all heliostats is 0.5. A cost for energy decreases by 13.5% (=15.5−2) comparing with the case where one tower is located at the optimized position.

INDUSTRIAL APPLICABILITY

Solar heat collectors according to the first aspects A and B of the present invention highly efficiently use solar energy. Therefore, thermal energy stored in heat exchange medium in the solar heat collectors is preferably used as heat sources for various kinds of systems and processes such as power generation systems, chemical reaction processes, seawater desalination facilities, and so on.

Moreover, in the solar heat collector of the first aspect A of the present invention, heat loss caused by reflected light and heat convection and by thermal radiation generated from a light receiving surface with a high temperature is reduced. Moreover, a pipe is helically bent to form a heat collecting element. Therefore, comparing with a heat collecting element whose flow path of the heat exchange medium is formed by combined metal plates, thermal stress is reduced. There are also advantages of structural strength and easy production.

Moreover, in the solar heat collector of the first aspect B of the present invention, similarly to the first aspect A of the present invention, heat loss caused by reflected light and heat convection and by thermal radiation generated from a light receiving surface with a high temperature is reduced. In addition, sunlight directly heats heat exchange medium which forms a liquid film. Therefore, it is possible to simplify heat resistance design and downsize a heat collecting element. Moreover, no long flow path is necessary so that it is possible to reduce pump power required to send heat exchange medium.

In addition, in the solar energy utilization system according to the second aspect of the present invention, it is possible to efficiently use thermal energy which is highly efficiently stored in heat exchange medium by the solar heat collector.

A sunlight collecting reflector according to the third aspect of the present invention can make sunlight which is collected by first reflectors efficiently converge on a heat collector. Moreover, each of reflector segments can be so small as not to receive strong wind pressure. Therefore, it is possible to prevent wind pulsation from shifting a position of the reflector segment and transforming the reflector segment itself, so as not to decrease accuracy in light collection. In addition, a structure of each of the reflector segments can be so small as to relatively simplify a support structure, facilitate wind resistant design, and reduce construction cost. Moreover, the sunlight collecting reflector can prevent light from spreading on a light receiving surface in the heat collector to collect solar energy to the heat collector which is smaller than a conventional heat collector. Furthermore, it is possible to control incident light heat fluxes on the light receiving surface so as to equalize energy with equal heat fluxes.

Moreover, the sunlight can converge on a smaller area on the heat collector. Accordingly, even if a diameter of an opening of a light collecting inlet of the heat collector is small, light can be collected so efficiently that the heat collector can be downsized.

Moreover, a solar energy utilization system according to the fourth aspect of the present invention can collect sunlight which irradiates an area of tens or hundreds of meters in radius. Then, thermal energy of the collected sunlight can be used as a heat source for power generation, synthetic fuel production, various chemical processes, a seawater desalination facility, or the like. In particular, since energy is equalized with equal heat fluxes, the solar energy utilization system is effective as a system which supplies thermal energy to a reforming reactor for chemical reaction which generates hydrogen from natural gas, or the like.

In the solar energy utilization system, the solar heat collector according to the first aspect A or B of the present invention is used as a heat collector so that sunlight collected by a first reflector can efficiently converge on a heat collector. In addition, energy of the converging sunlight is highly efficiently stored in heat exchange medium, and the stored thermal energy can be used.

Moreover, a sunlight collecting system according to the fifth aspect of the present invention can collect sunlight which irradiates a vast area with a radius of hundreds meters-several kilometers. In other words, the sunlight collecting system can solve a problem that there is an unused bright ground which is irradiated by the sunlight and in which no heliostats to reflect the sunlight can be arranged, and therefore only a part of the sunlight which irradiates on the ground can be used. Thus, the sunlight can be efficiently collected with keeping a high energy from a limited region with a minimum number of heliostats to collect necessary solar heat. As a result, the following effects can be obtained.

(1) A light collecting power is high, and energy of the sunlight can be collected at a high temperature. In a conventional light collecting system which forms only one light collecting point, energy cost can be improved by approximately 2% at most even when heliostats are optimally arranged. However, in the light collecting system according to the invention, for instance, energy cost can be improved by 13% when two light collecting points are formed, and the field efficiency can be also improved.

(2) A length of a light path of reflected light from the heliostat to the heat collector or the light collecting reflector can be shortened. In addition, it is possible to keep a light collecting power constant regardless of a scale of light collection.

(3) Heliostat groups can be arranged so that the light collecting points are formed in a series in the north-south direction. Accordingly, the sunlight can be efficiently collected even in a long and narrow land.

(4) The heliostat groups can be combined and arranged so that the light collecting points are formed in the north-south direction and the east-west direction. Thus, the sunlight can be efficiently collected in accordance with a vast land and any shape of land.

(5) The heliostat groups can be arranged so that three light collecting points formed by three heliostat groups are located at vertices of a triangle whose base is directed in the east-west direction. Thus, the second heliostat can always select an optimal light collecting point in accordance with changes in an irradiation angle of the sunlight seasonally and during a day. As a result, quantities of collected light during a day and a year can be maximized comparing with a light collecting system in which heliostats are fixedly installed.

(6) When the second heliostats can move to always avoid shadows made by the first heliostats, the light collection efficiency can be further improved. Moreover, the second heliostat can change a position and move the reflecting surface of the second heliostat itself in order to follow the sun in accordance with a time during a daytime and a season, so as to receive the maximum sunlight on the reflecting surface. Accordingly, the second heliostat can move to a position to avoid shadows which are made by the first heliostats and hourly change with changes in elevation of the sun during a day and seasonally. As a result, the light collection efficiency can be improved.

Moreover, according to a solar energy utilization system of the sixth aspect of the present invention, sunlight highly efficiently collected by a sunlight collecting system can be used as a heat source for power generation, synthetic fuel production, and various chemical processes.

In the solar energy utilization system, the solar heat collector according to the first aspect A or B of the present invention is used as a heat collector, and the sunlight collecting reflector according to the third aspect of the present invention is used as a sunlight collecting reflector. As a result, sunlight collected by first reflectors can efficiently converge on the heat collector. In addition, energy of the converging sunlight is highly efficiently stored in heat exchange medium, and the stored thermal energy can be used.

EXPLANATIONS OF LETTERS OR NUMERALS

1 SOLAR HEAT COLLECTOR
2 LIGHT RECEIVING SURFACE
3 HEAT COLLECTING ELEMENT
4 SUNLIGHT INLET
5 HEAT EXCHANGE MEDIUM INLET
6 HEAT EXCHANGE MEDIUM OUTLET
7 HEAT EXCHANGE MEDIUM CIRCULATION PIPE
11 REFLECTOR GROUP
12 HELIOSTAT (FIRST REFLECTOR)
13 LIGHT COLLECTING SURFACE (HEAT COLLECTOR)
21 FIRST REFLECTOR SEGMENT
22 SECOND REFLECTOR SEGMENT
23 THIRD REFLECTOR SEGMENT
24 FOURTH REFLECTOR SEGMENT
25 FIFTH REFLECTOR SEGMENT
26 SIXTH REFLECTOR SEGMENT
21a, 22a, 23a, 24a, 25a, and 26a REFLECTING SURFACE
31 SUNLIGHT COLLECTING SYSTEM
32 FIRST HELIOSTAT
33 SECOND HELIOSTAT

What is claimed is:
1. A sunlight collecting reflector comprising:
a plurality of first reflectors on which sunlight is reflected towards an upper light collecting point; and
a reflector group constituted by a plurality of reflector segments on which the reflected sunlight on the plurality of first reflectors is reflected to a lower light collecting point in a heat collector, wherein
each of the plurality of reflector segments has reflecting surfaces which make the sunlight converge on the lower light collecting point, and
the reflecting surfaces of the reflector segments comprised in the reflector group are arranged along quadrics of revolution whose confocus is located at the lower light collecting point of the sunlight and whose curvature radiuses are different;
the sunlight collecting reflector wherein the reflector group comprises a number n (n is an integer greater than or equal to 2) of the reflector segments which are arranged along a direction from the light collecting point to the heat collector, and wherein there is a relationship of $R_k < R_{k+1}$ between a curvature radius $R_k$ of a quadric of revolution along which a reflecting surface of a k-th (k is an integer and $1 < k <= n-1$) nearest reflector segment $S_k$ to the upper light collecting point is placed and a curvature radius $R_{k+1}$ of a quadric of revolution along which a reflecting surface of a k+1-th nearest reflector segment $S_{k+1}$ is placed.

2. The sunlight collecting reflector as claimed in claim 1, wherein the reflecting surfaces of the reflector segment comprise a set of reflector units each of which is formed by the portion or the tangential plane of the quadric of revolution.

3. The sunlight collecting reflector as claimed in claim 1, wherein the quadric of revolution is at least one kind of curved surface selected from a hyperboloid of revolution and an ellipsoid of revolution.

4. The sunlight collecting reflector as claimed in claim 1, wherein the reflecting surfaces of the plurality of the reflector segments are arranged without overlapping between light paths of the sunlight collected to the upper light collecting point.

5. The sunlight collecting reflector as claimed in claim 1, wherein the reflecting surface of the reflector segment is formed in a ring shape around a central axis which is a center line connecting the upper light collecting point of the sunlight with a center of a light collecting surface of the heat collector, along the quadric of revolution.

6. A solar energy utilization system comprising a sunlight collecting reflector as claimed in claim 1.

* * * * *